US012809197B2

(12) United States Patent
Menard et al.

(10) Patent No.: US 12,809,197 B2
(45) Date of Patent: Nov. 24, 2026

(54) STRUCTURES AND METHODS FOR PHASE SHIFTING IN OPTICAL DEVICES

(71) Applicants: Francois Menard, Trois-Rivieres (CA); Martin Berard, Ste-Catherine-de-la-Jacques-Cartier (CA); Pierre Pottier, Montreal (CA); Justin Alexander, Gatineau (CA); Bruno Lee Sang, Saint-Hubert (CA); Cedrik Coia, Greenfield Park (CA)

(72) Inventors: Francois Menard, Trois-Rivieres (CA); Martin Berard, Ste-Catherine-de-la-Jacques-Cartier (CA); Pierre Pottier, Montreal (CA); Justin Alexander, Gatineau (CA); Bruno Lee Sang, Saint-Hubert (CA); Cedrik Coia, Greenfield Park (CA)

( * ) Notice: Subject to any disclaimer, the term of this patent is extended or adjusted under 35 U.S.C. 154(b) by 304 days.

(21) Appl. No.: 18/699,984

(22) PCT Filed: Nov. 7, 2022

(86) PCT No.: PCT/CA2022/051642
§ 371 (c)(1),
(2) Date: Apr. 10, 2024

(87) PCT Pub. No.: WO2023/077241
PCT Pub. Date: May 11, 2023

(65) Prior Publication Data

US 2025/0013081 A1 Jan. 9, 2025

Related U.S. Application Data

(60) Provisional application No. 63/276,052, filed on Nov. 5, 2021.

(51) Int. Cl.
*G02F 1/01* (2006.01)
*G02B 26/06* (2006.01)

(52) U.S. Cl.
CPC ........... *G02F 1/0147* (2013.01); *G02B 26/06* (2013.01); *G02F 1/011* (2013.01)

(58) Field of Classification Search
CPC ..................................................... G02F 1/0147
See application file for complete search history.

(56) References Cited

U.S. PATENT DOCUMENTS 6,430,322 B1 * 8/2002 Al-hemyari ............ G02B 6/122 385/16
6,522,801 B1 * 2/2003 Aksyuk ............... B81C 1/00666 385/16

(Continued)

*Primary Examiner* — Lisa M Caputo
(74) *Attorney, Agent, or Firm* — Rosenberg, Klein & Lee

(57) ABSTRACT

Within integrated photonic circuits the ability to induce an optical phase shift allows multiple circuit elements to be implemented including, for example, modulators and optical switches. It is beneficial to achieve lower power consumption for these phase shift elements to reduce overall power consumption of the photonic circuits and their associated drive circuits. Exploiting processing techniques for micro-electromechanical systems (MEMS) designs are outlined for high efficiency thermo-optic phase shifter elements with suspended elements that improve thermal isolation and counteract stress induced phase shifts that reduce the thermal induced phase shift. MEMS based spring structures provide both mechanical support and thermal pathways for improved responsivity. Other designs employ direct MEMS based modification of the waveguide path length without exploiting thermal based index changes.

20 Claims, 32 Drawing Sheets

200A

200B

(56) References Cited

U.S. PATENT DOCUMENTS

| | | | | |
|---|---|---|---|---|
| 9,341,644 | B2 | 5/2016 | Hutchison et al. | |
| 10,884,313 | B2 | 1/2021 | Gould | |
| 2020/0116930 | A1 * | 4/2020 | Kannan .................. | G02B 6/122 |

* cited by examiner

700B

700C

4300

4350

STRUCTURES AND METHODS FOR PHASE SHIFTING IN OPTICAL DEVICES

CROSS-REFERENCE TO RELATED APPLICATIONS

This patent application claims the benefit of priority as a 371 National Phase entry application of PCT/CA2022/051642 filed Nov. 7, 2022; which itself claims the benefit of priority from U.S. Provisional Patent Application 63/276,052 filed Nov. 5, 2021.

FIELD OF THE INVENTION

This invention is directed to optical devices and more particularly to structures and methods for implementing phase shifting elements within optical devices including thermo-optical phase shifter elements, electrostatically actuated microelectromechanical systems (MEMS) and thermally actuated MEMS based phase shifting elements.

BACKGROUND OF THE INVENTION

Optical networking is a means of communication that uses signals encoded in light to transmit information in various types of telecommunications networks. These include limited range local-area networks (LAN) or wide-area networks (WAN), which cross metropolitan and regional areas as well as long-distance national, international and transoceanic networks. Optical networks typically employ optical amplifiers, lasers, modulators, optical switches and wavelength division multiplexing (WDM) to transmit large quantities of data, generally across fiber-optic cables. Because it is capable of achieving extremely high bandwidth, it is an enabling technology for the Internet and telecommunication networks that transmit the vast majority of all human and machine-to-machine information today. Optical networks are also employed in other applications such as storage area networks and data centers.

Silicon photonics is a promising technology for reducing the cost structure of various optical components employed within optical networks by leveraging the economies of scale of the microelectronics industry. In the same way as silicon CMOS circuits can be packaged using multiple dies, then in principle so can silicon photonics devices. In order to provide active components either to adjust/correct for manufacturing tolerances or implement components such as reconfigurable optical add-drop multiplexers, optical switches, tunable filters etc. it is necessary to adjust the optical phase of signals propagating within the silicon photonic waveguides. Within the prior art focus has centered upon establishing high frequency interactions through effects such as carrier injection for modulators. However, low frequency or DC control of phase within optical waveguides is important for optical switching, tunable filters, etc. as well as tuning to correct for static phase offsets arising through manufacturing tolerances etc. Accordingly, such phase shifts must be induced and kept (e.g. tuning out fabrication effects and/or environmental variations), maintained and then periodically adjusted (e.g. only when a switch, router, add-drop multiplexer reconfigures or an attenuator is adjusted). Accordingly, there is a requirement for DC or quasi-DC phase tuning of silicon photonic devices.

Accordingly, the inventors have established phase shifting (or phase tuning) elements exploiting, discretely or in combination, phase shift induced through the thermo-optic effect, thermally induced optical path length variations, and microelectromechanical systems (MEMS) induced optical path length variations.

Silicon microelectromechanical systems (MEMS) are small integrated devices or systems that combine electrical inducing magnetic field and/or thermal deformation with mechanical components within a single silicon die, although other material systems may be employed. MEMS devices have leveraged and extended the fabrication techniques developed for the silicon integrated circuit industry, namely lithography, doping, deposition, etching, etc. to add mechanical elements such as beams, gears, diaphragms, and springs to silicon circuits either as discrete devices or in combination with silicon electronics. Accordingly, the manufacturing processes for silicon photonics and MEMS can be combined in what the inventors refer to as integrated optical microelectromechanical systems which combine MEMS elements with optical waveguides.

Accordingly, it would be beneficial to combine a MEMS element within a silicon photonic waveguide to provide a phase tuning element without requiring complex additional processing (e.g. forming p-doped and n-doped regions vertically and/or laterally for carrier injection). It would be further beneficial to combine silicon MEMS based micro-actuators with silicon CMOS control and drive circuits. Accordingly, the inventors have established phase shifter elements for integration within optical devices exploiting MEMS induced optical path length variations Further, the processing techniques for MEMS have been further exploited to provide high efficiency thermo-optic or thermally induced optical path length variation based phase shifter elements whereby the optical waveguide is supported upon a platform or beam which is isolated from the substrate to improve thermal isolation. However, MEMS based spring structures are employed to provide both support and thermal paths to improve the responsivity of the thermally based phase shifter elements.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations in the prior art relating to optical devices and more particularly to structures and methods for implementing phase shifting elements within optical devices including thermo-optical phase shifter elements, electrostatically actuated microelectromechanical systems (MEMS) and thermo-actuated MEMS based phase shifting elements.

In accordance with an embodiment of the invention there is provided a phase shifter element for an optical device comprising:

- an optical waveguide comprising:
  - a first non-suspended portion; and
  - a first suspended portion; and
- an actuator inducing a phase shift in optical signals propagating within the optical waveguide.

In accordance with an embodiment of the invention there is provided a phase shifter element for an optical device comprising:

- a first optical waveguide comprising a first non-suspended portion, a second non-suspended portion and a first suspended portion disposed between the first non-suspended portion and the second suspended portion;

a second optical waveguide comprising a third non-suspended portion, a fourth non-suspended portion and a second suspended portion disposed between the first non-suspended portion and the second suspended portion;

a microelectromechanical systems (MEMS) actuator comprising a fixed portion, a movable portion, and an arm mechanically coupled to the movable portion; wherein the arm is coupled is mechanically coupled to the first suspended portion of the first optical waveguide and the second suspended portion of the second optical waveguide; and actuation of the MEMS actuator results in movement of the movable portion and arm such that the first suspended portion of the first optical waveguide and the second suspended portion of the second optical waveguide are each deflected.

In accordance with an embodiment of the invention there is provided a phase shifter element for an optical device comprising:

an optical waveguide comprising:

a first non-suspended portion;

a second non-suspended portion; and a first suspended portion disposed between the first non-suspended portion and the second suspended portion;

a mass; and an arm mechanically coupled to the mass and the suspended portion of the optical waveguide; wherein movement of the mass results in movement of the arm such that the first suspended portion of the optical waveguide is deflected in dependence upon the movement of the mass.

In accordance with an embodiment of the invention there is provided a phase shifter element for an optical device comprising:

an input waveguide;

a plurality of output waveguides;

a plurality of waveguides;

a first free propagation zone coupled at a first end to the input waveguide and at a second distal end to a first end of each waveguide of the plurality of waveguides;

a second free propagation zone coupled at a first end to the plurality of output waveguides and at a second distal end to a second distal end of each waveguide of the plurality of waveguides;

one or more microelectromechanical systems (MEMS) actuators each comprising a fixed portion, a movable portion and an arm mechanically coupled to the movable portion; wherein the plurality of waveguides are suspended waveguides;

the arm of each MEMS actuator of the one or more MEMS actuators is mechanically coupled to a predetermined subset of the plurality of optical waveguides; and actuation of the each MEMS actuator of the one or more MEMS actuators results in movement of the movable portion and arm of that MEMS actuator of the one or more MEMS actuators such that predetermined subset of the plurality of optical waveguides mechanically coupled to the arm of that MEMS actuator of the one or more MEMS actuators are deflected.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1A:
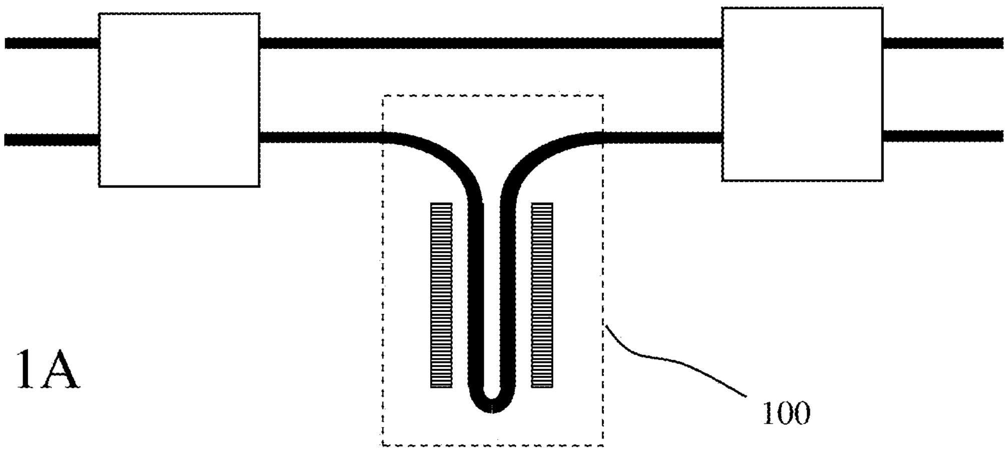
FIG. 1A depicts an exemplary configuration of a 2×2 Mach-Zehnder interferometer (MZI) according to an embodiment of the invention exploiting a thermo-optic phase shift according to an embodiment of the invention.

The present invention is directed to optical devices and more particularly to structures and methods for implementing phase shifting elements within optical devices including thermo-optical phase shifter elements, electrostatically actuated microelectromechanical systems (MEMS) and thermos actuated MEMS based phase shifting elements. The ensuing description provides representative embodiment(s) only, and is not intended to limit the scope, applicability, or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional elements.

A "two-dimensional" waveguide, also referred to as a 2D waveguide, a slab waveguide or a planar waveguide as used herein may refer to, but is not limited to, an optical waveguide supporting propagation of optical signals within a predetermined wavelength range which does not guide the optical signals laterally relative to the propagation direction of the optical signals.

A "three-dimensional" waveguide, also referred to as a 3D waveguide or a channel waveguide as used herein may refer to, but is not limited to, an optical waveguide supporting propagation of optical signals within a predetermined wavelength range which guides the optical signals laterally relative to the propagation direction of the optical signals.

A "microelectromechanical system" or "microelectromechanical systems" (MEMS) as used herein may refer to, but is not limited to, a miniaturized mechanical, thermo-mechanical and electro-mechanical element which is manufactured using techniques of microfabrication. For example, the MEMS may be implemented in silicon.

A "wavelength division demultiplexer" (WDM DMUX) as used herein may refer to, but is not limited to, an optical device for splitting multiple optical signals of different wavelengths apart which are received on a common optical waveguide, e.g. a waveguide forming part of a photonic integrated circuit or an optical fiber.

A "wavelength division multiplexer" (WDM MUX) as used herein may refer to, but is not limited to, an optical device for combining multiple optical signals of different wavelengths together onto a common optical waveguide, e.g. a waveguide forming part of a photonic integrated circuit or an optical fiber.

A "Mach-Zehnder interferometer" (MZI) as used herein may refer to, but is not limited to, an optical device exploiting phase balance or imbalance between two arms disposed between an input 1×2 or 2×2 3 dB coupler and an output 2×1 or 2×2 3 dB coupler to provide for programmable modulation, attenuation, optical switching or wavelength filtering functions.

A "multimode interference" (MMI) coupler as used herein may refer to, but is not limited to an optical device exploiting the self-imaging principle wherein N-fold images (copies) of the field at an input plane are formed at the output plane after propagation within a multimode waveguide. An MMI coupler can be used as a coupler within a Mach-Zehnder interferometer (MZI), as an optical splitter or combiner with uniform or arbitrary power splitting ratios, as a 90° hybrid for an optical coherent receiver and as a polarization beam splitter/combiner.

As noted above silicon photonics is a promising technology for reducing the cost structure of various optical components employed within optical networks by leveraging the economies of scale of the microelectronics industry. In the same way as silicon CMOS circuits can be packaged using multiple dies, then in principle so can silicon photonics devices. In order to provide active components either to adjust/correct for manufacturing tolerances or implement components such as reconfigurable optical add-drop multiplexers, optical switches, tunable filters etc. it is necessary to adjust the optical phase of signal propagating within the silicon photonic waveguides. Within the prior art focus has centered upon establishing high frequency interactions through effects such as carrier injection for modulators. However, low frequency or DC control of phase within optical waveguides is important for optical switching, tunable filters, etc. as well as tuning to correct for static phase offsets arising through manufacturing tolerances etc. Accordingly, such phase shifts must be induced and kept (e.g. tuning out fabrication effects) or induced, maintained and then periodically adjusted (e.g. only when a switch, router, add-drop multiplexer reconfigures or an attenuator adjusted). Accordingly, there is a requirement for DC or quasi-DC phase tuning of silicon photonic devices.

Silicon photonics is one of a series of integrated photonic circuit technologies that support optical functions such as modulation, switching, filtering, etc. Within the prior art integrated optical circuits have exploited thermo-optic or electro-optic phase shifter elements. These, however, result in issues such as thermal management of multiple thermo-optic elements within a single integrated optical circuit or power consumption problems due to these elements being power hungry and/or continuously operated.

As also noted above silicon microelectromechanical systems (MEMS) are small integrated devices or systems that combine electrical and mechanical components within a single silicon die, although other material systems may be employed. MEMS devices have leveraged and extended the fabrication techniques developed for the silicon integrated circuit industry, namely lithography, doping, deposition, etching, etc. to add mechanical elements such as beams, gears, diaphragms, and springs to silicon circuits either as discrete devices or in combination with silicon electronics. Accordingly, the manufacturing processes for silicon photonics and MEMS can be combined in what the inventors refer to as integrated optical microelectromechanical systems which combine MEMS elements with optical waveguides.

A: Background

As outlined above a design element of optical devices exploiting optical waveguides and/or silicon photonics is a phase shifter allowing for tuning and control of optical elements. In many instances the number of phase shifter elements is low, e.g. one or two in a Mach-Zehnder based optical protection switch, or moderate. In these instances, the power dissipation of the individual phase shifter elements is not critical to the overall performance of the optical device and/or the optical equipment the optical devices are integrated within.

However, in modern data centers, evolving requirements for dynamic optical resource allocation, configuration and/or reconfiguration require implementation of high-density optical switches. As the number of nodes (e.g. servers) to which these optical resources are connected can be in the thousands, tens of thousands to hundreds of thousands then the overall functionality of the optical switching within the data center can rapidly evolve to a distributed network of optical switch matrices, e.g. 8×8, 16×16, 32×32, etc. optical switch matrices, where the number of optical switch matrices may be hundreds, thousands or tens of thousands. Consequently, it is desirable for these optical switch matrices to have small footprint, be energy efficient and low cost which is a competitive advantage of optical waveguide based switching over free space optical switches.

The overall power consumption of an optical switch matrix is a direct function of both the number of individual 2×2 cells used to implement it and the power consumption of each switch element within the optical switch matrix. The number of optical switches within an optical switch matrix can itself be a function of both size of the optical switch matrix, e.g. N×M where N and M may be 8, 16, 32, 64, etc., and the degree of blocking of the optical switch matrix, e.g. strictly non-blocking or re-arrangeably non-blocking, where different design methodologies can be employed to reduce the overall number of switches from that of a strictly non-blocking switch matrix. For example, a strictly non-blocking switch employs $N^2$ switches whilst a re-arrangeably non-blocking Benes switch uses $N \log_2(N)-(N/2)$ switches with other architectures such as Clos networks between these limits. For N=32 the number of 2×2 switches is therefore 1,024 in the strictly non-blocking switch and 144 in the Benes switch.

Accordingly, within a data center the number of 2×2 optical switch elements may easily exceed tens of thousands or hundreds of thousands with lager data centers potentially requiring millions of 2×2 switch elements. With prior art thermo-optic (TO) phase shifters typically consuming several at least ten milliwatts in "hero" experiments to tens or hundreds of milliwatts typically these devices would lead to an unacceptable level of power consumption overall for the data center.

Further, within a 2×2 optical switch (cell) exploiting a Mach-Zehnder architecture typical geometries are several millimeters in length to accumulate the required 180 degrees (TE radians) of phase shift for enacting the transition from the cross state of the optical switch to the bar state (or vice versa). Such geometries are typically not compact enough to enable matrices incorporating tens if not hundreds of 2×2 cells to be integrated within an acceptable chip die size suitable for implementing cost effective 8×8 or 16×16 or 32×32 optical switches in a single die.

Accordingly, minimizing the footprint and the power consumption of a 2×2 cell directly impacts both the carbon footprint and the overall power consumption of a data center potentially making use of many optical switches, each containing a plurality of 2×2 cells.

Within optical waveguides a variety of effects can be employed according to the material system exploited, e.g. electro-optic effect, magneto-optic effect, thermo-optic effect. It is widely recognized that the thermo-optic effect can be utilized to implement a compact and low-power 2×2 cell with a low insertion loss by way of an interferometer embodiment such as a Mach-Zehnder interferometer (MZI), not foregoing other possible embodiments exploiting other functional elements such ring resonators, etc. Within optical waveguides such as those exploiting silicon (commonly referred to as silicon photonics), the thermo-optic effect is widely accepted as the result of a change in the effective index upon varying temperature, which directly affects the group velocity experienced by different optical modes propagating within the waveguides as a function of their various many possible geometries.

Accordingly, it would be beneficial to improve the efficiency of the thermo-optic effect within a 2×2 optical switch cell to lower the power consumption of the 2×2 switch cells from tens of milliwatts per 2×2 cell to single digit milliwatts or below into hundreds of microwatts per 2×2 cell.

B: Thermal Delays, Phase Shifter Structures and Methods

During experiments performed on optical waveguides employing a silicon nitride core ($Si_3N_4$) with silicon oxide ($SiO_2$) upper and lower cladding, a $SiO_2$— $Si_3N_4$— $SiO_2$ waveguide structure or what the inventors refer to as an oxide-nitride-oxide (ONO) waveguide, it was established that by applying sufficient power to a thermal heater to change the local temperature in the ONO waveguide that induced local temperature variations from 25° C. to 350° C. could be achieved. In these experiments the inventors established that the transverse electric (TE) optical mode within the ONO waveguide experienced an approximately 0.38% change in effective index, increasing from around 1.690 to approximately 1.697, for optical signals at telecom wavelengths.

Optical material science theory has long established the relationships between a material's coefficients of thermal expansion (CTE), polarizability, and refractive index, and their dependence to temperature. For example, Potter et al. in "Optical Materials" (ISBN 9780128226490, Elsevier, 2021) shows that the effect of temperature on the refractive index at infrared wavelengths depends upon two counteracting phenomena. The first one is the increase in specific volume upon increasing temperature for materials with a positive CTE, which decreases the refractive index. The second one, and generally more dominant contributor, is the increase in polarizability with increasing temperature, which transfers to an increase in refractive index. Accordingly, it is the difference between these two effects which determines the net behavior of the refractive index against temperature for any given material. Equations (1A) to (1C) below describe this relationship between the coefficient of thermal expansion and the polarizability and the resulting variation of the refractive index with temperature where P is the polarizability of the material, Φ the change in polarizability, T temperature, $M_V$ the molar volume, CTE the coefficient of thermal expansion and n the refractive index.

$$\Phi = \frac{1}{P}\left(\frac{dP}{dT}\right) \tag{1A}$$

$$CTE = \frac{1}{M_V}\left(\frac{dM_V}{dT}\right) \tag{1B}$$

$$\frac{dn}{dT} = \frac{(n^2-1)(n^2+2)}{6n}[\Phi - CTE] \tag{1C}$$

At telecom wavelengths of 1260-1650 nm, an increase in temperature will cause an effective index change that is positive both in silicon dioxide and in the much denser silicon nitride because the polarizability of their covalent bonds increases. In contrast, materials such as polymers, with high positive CTE values, will exhibit a negative change in index with increased temperature, since in those cases, the refractive index arising from CTE is the dominant factor.

Following this logic, the inventors ONO waveguides are expected to display a positive change in refractive index with increasing temperature at telecommunications wavelengths of 1250-1650 nm, owing to their low but positive coefficient of thermal expansion (CTE). Indeed the materials employed for these waveguides, silicon dioxide ($SiO_2$) and silicon nitride ($Si_3N_4$) have low, but positive CTE values, of $5.6\times10^{-7}$ and $1.4\times10^{-6}$1.4E-6 respectively. Accordingly, Potter states that in materials with low CTE the increased polarizability at higher temperatures dominates by an order of magnitude the smaller negative component of the refractive index change caused by the volumetric expansion thereby yielding a net positive refractive index increase.

Accordingly, the inventors conclude that the positive refractive index change observed in ONO waveguides could be amplified were it possible to eliminate the small relative decrease in refractive index imparted by the CTE. Such amplification could be further enhanced by waveguide architectures and/or material selections which leverage stress as an adjunct to the thermo-optic effect.

Whilst an overall change in the ambient temperature of the die for an optical waveguide device will induce a thermo-optic effect globally to the entire optical waveguide device, the requirement for discrete phase control of waveguides within each 2×2 optical switch etc. means that is desirable to adjust the phase of optical modes within a specific waveguide without, ideally, affecting other nearby waveguides. It is known in the prior art that employing one or more heaters placed above or in proximity to the core of a given optical waveguide is an effective approach to change the local effective index. This allows for phase shifts to be induced with improved efficiency and spatial selectivity while ensuring that the radiative heat from the heater is "sunk", e.g. into the substrate, before reaching nearby waveguides where it could change their effective index unintentionally. Within a balanced arm 2×2 MZI cell, the thermo-optic effect upon increasing the temperature on one arm of an MZI (or the differential temperature between both arms) can change the effective index enough to achieve the 180-degree (TE radians) phase shift required to effect a change from the default cross state to the bar state (or vice-versa).

Within the context of a 2×2 optical switch cell implemented by way of balanced Mach-Zehnder Interferometer (MZI), the inventors consider two figures of merits for the efficiency of the thermo-optic effect. The first is the overall power consumption of all the thermo-optic phase shifters present within the balanced MZI to bias it into its intended default cross or bar state (Power to the Default State or P-default). This state corresponds to a thermal compensation of any/all offsets imparted by fabrication tolerances. The second is the overall power consumption of all thermo-optic phase shifters present within the balanced MZI to intentionally attain a desired switched state (cross or bar) after imparting a 180-degree (TE radians) phase shift using push, pull or push-pull drive configurations (Power to the Switched State, or P-switched).

Further to this, the notion of overall power consumption in a complete system must necessarily extend to the complexity of the control electronics necessary to drive the thermo-optic phase shifters. This includes monitoring and holding the bias voltages and current levels steady to maintain the P-default and P-switched states across all 2×2 optical switch cells of the entire optical switch system and across the entire temperature range of operation of a complete system.

The power consumption of 2×2 waveguide-based optical switch cells in their switched state has been the subject of significant published research over the last 20 years over multiple platforms including, but not limited to, polymers, lithium niobate, lead zirconate titanate (PZT), silicon, silicon dioxide, silicon nitride, indium phosphide, gallium arsenide and over various control mechanisms including thermo-optics and electro-optics. However, from reviewing this prior art the inventors note that there has been little work on the power consumption of the entire optical switch system that includes control electronics for maintaining the optical switch in either its P-default or P-switched states. The same conclusion is reached concerning the overall driver power consumption to achieve the switching either for discrete switches or across a plurality of switch cells forming an entire optical switch system. Such analysis if it existed, would show an overall system benefit from switch matrices employing SiN waveguides over those using silicon in holding both of the P-default and P-switched states arising from the relaxed tolerances on the precision of the current required to keep the switches in proper bias at their intended state.

Furthermore, the inventors note that the assessment of performance for a complete system should consider additional figures of merit related to the overall insertion and polarization-dependent losses, as well as bandwidth of the optical switch system as these may call for overall design tradeoff, within embodiments of the invention, between optical performance and electrical performance.

Accordingly, the inventors established through their analysis that an appropriate selection of the waveguide materials leads to switch designs with a high efficiency thermo-optic effect for switching state changes but also, and most importantly, with lowered overall power consumption for maintaining the 2×2 optical switch cells in either the P-default or P-switched states. This is in spite of the fact that silicon nitride (SiN) has a lower thermo-optic coefficient than silicon.

Further to this, the inventors have established that through an appropriate selection of the materials employed within the optical waveguides etc. exploiting the thermo-optic effect on a 2×2 optical switch, for example, that mechanical effects can be leveraged in parallel with the thermo-optic effect thereby leading to an improvement of the power consumption figures of merit for the P-default and P-switched states.

Indeed, the inventors, through their experience with microelectromechanical systems (MEMS) process flows and understanding of the power efficiency of stretching suspended silicon-rich or stochiometric silicon nitride waveguides (silicon nitride integrated photonics), have therefore sought to improve of the performance of thermo-optic devices in silicon photonics by exploiting mechanical deformation in parallel to the thermo-optic effect by using electrostatic and/or thermal expansion forces. An exemplary use-case of this enhancement may be found within a Mach-Zehnder Interferometer where it would help to attain the necessary 180 degree (TE radians) phase shift for a change from the cross to the bar state or vice-versa.

Within the following descriptions, embodiments of the invention are presented with respect to silicon nitride being employed as the waveguide core material of a mechanically enhanced thermo-optic phase shifter element within an MZI. However, it would be evident to one of skill in the art that the design processes, design methodologies and designs may be employed with other waveguide geometries and/or material systems in addition to providing phase shifter elements for other optical circuit elements.

As will be presented below in Section C, the inventors have implemented phase shifters elements in an ONO-waveguide-based Mach-Zehnder interferometer (MZI) by suspending and stretching one of the two arms using a MEMS actuator. Accordingly, the inventors are leveraging the impact of physically altering the path length imbalance between the two arms of an MZI as a means to effect a set phase shift as opposed to simply slowing down photons on one arm by way of increasing the temperature of one arm in relation to the other arm. The inventors conclude to the possibility of combining both the effects of physical elongation and of the thermo-optic effect stemming from polarizability on the same arm of an MZI to further reduce the power consumption required relative to a conventional thermo-optic MZI heated up to a set phase shift.

The mechanical enhancement of the thermo-optic effect can also be achieved in silicon nitride waveguide cores clad in compressive silicon dioxide. Refractive index generally increases following compressive stress build up in optical materials. The same trend may be observed upon releasing or counteracting tensile stress. Mechanical enhancement can therefore be engineered by selecting core and clad material couples and their initial state of stress, especially that of the core material, such that CTE mismatch between the core and clad leads to refractive index variations of same sign than the one imparted by the polarizability variation. In the ONO material stack of the inventors, the silicon nitride is initially in a state of medium tensile stress of a few hundreds of MPa while symmetrically clad in approximately 3.2 μm of silicon dioxide. Upon heating, the initially tensile silicon nitride core will try to expand with a rate that is about 3 times larger than the silicon dioxide cladding, gradually being compressed by the latter, hence decreasing its tensile stress.

Following the logic expressed above, the refractive index of the silicon nitride should increase as the tensile stress is being counteracted by the relative compression the silicon dioxide clad exerting upon it. This increase in refractive index is concurrent with the one imparted by the increasing temperature, thereby providing a mechanical, stress-related enhancement to the thermo-optic effect. Unlike, in conventional silicon integrated photonics (silicon photonics) which employs silicon as a waveguide core in silicon nitride integrated photonics, the core of the optical waveguide is usually formed by way of chemical vapor deposition of silicon nitride upon a bottom cladding layer, usually of silicon dioxide, upon a substrate, with subsequent patterning, etching and over cladding. The nature of the silicon nitride core can be silicon rich ($Si_XN_Y$) or stochiometric ($Si_3N_4$). The substrate can be the device layer of a silicon on insulator wafer or a portion (e.g. what is known as the handle portion) of a thermally oxidized bulk silicon wafer.

In order to obtain low optical propagation loss in silicon nitride waveguides, higher tensile stress silicon rich silicon nitride (600 MPa) or ultra-high tensile stress stochiometric Si3N4 (1 GPa) is employed by way of high-temperature deposition processing. The high-temperature process and possible subsequent annealing being employed to reduce the hydrogen present in the process of converting the silane precursor to the silicon nitride film formation as hydrogen is known to severely attenuate optical propagation at telecom wavelengths of interest (e.g. 1260-1650 nm) as defined by the cut-off frequencies of standard silica single mode optical fiber.

When the integrated optics waveguide is released from the substrate, for example from a handle layer (bulk wafer) or device layer (the silicon layer of a silicon-on-insulator (SOI) wafer) through an isotropic etching or any other kind of undermining process the core-clad material couple becomes both mechanically and thermally independent of the silicon allowing for the enhancements mentioned above to be increased. Typically the cladding layer of the optical waveguide is approximately 3.5 microns thick and has the same density as the stoichiometric SiO2 from their formation via tetraethyl orthosilicate (TEOS).

Within embodiments of the invention the optical waveguide stack may be released from the substrate through a sacrificial layer such that the region below the suspended beam and the substrate forms a cavity such as described below. Whilst the descriptions below describe a waveguide core discretely or in combination with an upper cladding atop a lower cladding and/or mechanical support within other embodiments of the invention the mechanical support (e.g. mechanical layer 150 in FIGS. 2A and 2B respectively) may be omitted.

Releasing an arm of a MZI arm, but maintaining a connection between the suspended beam and the substrate by employing a series of springs can improve the performance of the thermo-optic phase shifter by introducing a mechanical component into the thermo-optic phase shifter thereby making the thermo-optic phase shifter more efficient. The springs allowing channeled expansion/contraction of the suspended beam whilst restraining it one or more other axes. Whilst the designs described and depicted are with respect to an ONO waveguide upon silicon the design methodology could be applied in any waveguide material systems exhibiting a tensile stress component within the thermo-optic phase shifter.

The inventors also note that the series of springs designed and implemented into the suspended silicon dioxide membrane supporting the tensile silicon nitride waveguide core, within an arm of an MZI (or both arms), allow heat sinking relative to an isolated suspended beam. Such heat sinking will allow increased dissipation to the substrate upon deactivating the heaters. In this manner, the thermal time constant of the thermo-optic phase shifter is reduced from that where the suspended waveguide and membrane are solely surrounded by air which behaves like an insulator. As such the springs provide a lower thermal resistance path allowing improved heat conduction while maintaining a good degree of thermal insulation compared to a fully anchored design.

Referring to FIG. 1A there is depicted an exemplary configuration of a 2×2 Mach-Zehnder interferometer (MZI) according to an embodiment of the invention exploiting a thermo-optic phase shifter. As depicted a thermo-optic phase shifter (TOPS) element 100 is disposed on one arm of the MZI where it can impart a differential phase shift with respect to the other reference arm.

Within the following FIGS. 1A to 7D the optical waveguides are described and depicted as comprising a lower cladding and a core. Accordingly, within these embodiments of the invention the waveguides exploit an air cladding. However, it would be evident that within other embodiments of the invention the waveguides may exploit an upper cladding such as described above with the ONO waveguide geometry employing a silicon oxide lower cladding, a silicon nitride core and a silicon oxide upper cladding. It would be evident to one of skill in the art the geometry of the optical waveguide may vary according to the material system it is implemented in and the specific materials employed without departing from the scope of the invention as defined by the claims.

Figure 1B:
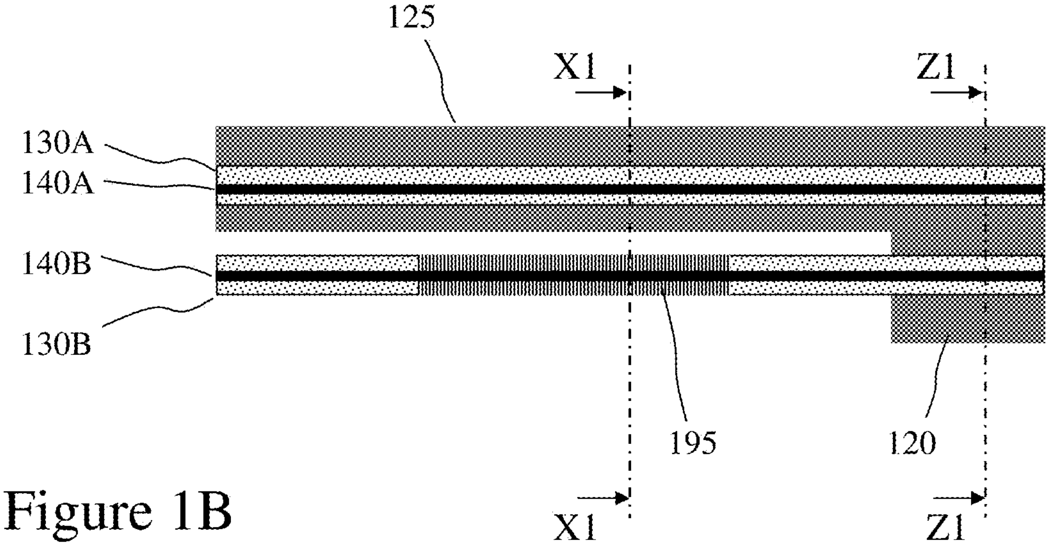
FIGS. 1B and 1C depict designs for the optical waveguides within the reference arm and tuning arm (with thermo-optic phase shifter element) of the 2×2 MZI depicted in FIG. 1A according to embodiments of the invention employing suspended beams.
Figure 1C:
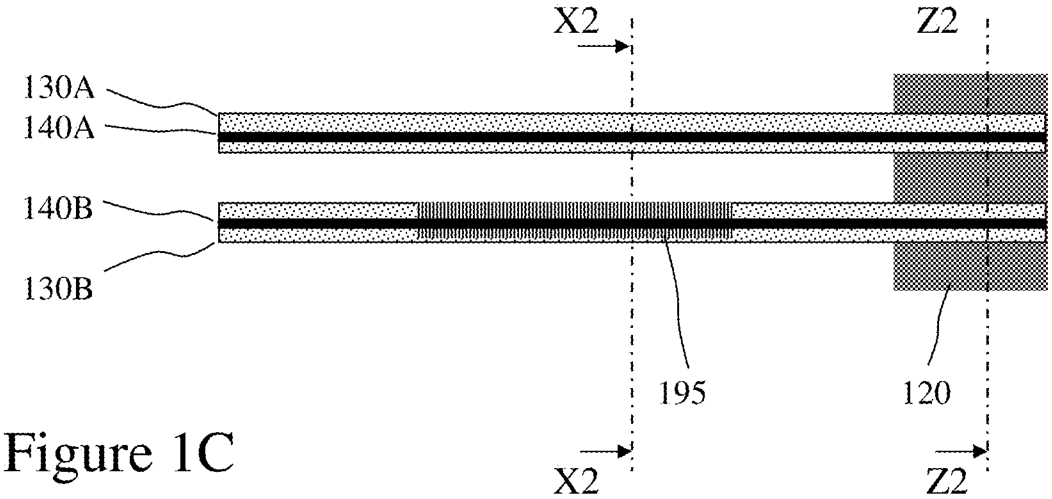

Now referring to FIGS. 1B and 1C there are depicted exemplary designs for the optical waveguides within the reference arm and tuning arm of the MZI, the tuning arm incorporating the TOPS 100. Referring to FIG. 1B a first geometry is depicted from a top view wherein a first waveguide comprising a first core 140A atop a first lower waveguide cladding 130A. The first waveguide runs along a non-suspended portion 125 of the device. This first waveguide forming the reference arm of the 2×2 MZI in FIG. 1, it does not comprise the TOPS 100.

A second waveguide is depicted forming part of the tuned arm of the 2×2 MZI in FIG. 1A with the TOPS 100. The second waveguide comprising a second core 140B atop a second lower waveguide cladding 130B wherein the second (suspended) waveguide runs unsupported from an anchor 120 so that it can expand/contract without additional stress being induced by its being disposed between a pair of anchors 120. As will be evident in subsequent figures the waveguide on the suspended portion with the TOPS 100 is a loop such that optical waveguide can couple at each end to the remainder of the MZI but freely extend. The TOPS within the tuned arm is comprised of one or more heaters 195 disposed upon the second lower waveguide cladding 140B.

Referring to FIG. 1C a second geometry is depicted wherein a first waveguide comprising a first core 140A atop a first lower waveguide cladding 130A which runs along a suspended portion of the device. The first waveguide forming the reference arm of the 2×2 MZI in FIG. 1A without the TOPS 100. A second waveguide is again depicted forming part of the tuned arm of the 2×2 MZI in FIG. 1A with the TOPS 100. The second waveguide comprising a second core 140B atop a second lower waveguide cladding 130B wherein the second (suspended) waveguide runs unsupported from an anchor 120 so that it can expand/contract without additional stress being induced by its being disposed between a pair of anchors 120. As will be evident in subsequent figures the waveguide on the suspended portion with the TOPS 100 is a loop such that optical waveguide can couple at each end to the remainder of the MZI but freely extend. The TOPS within the tuned arm is comprised of one or more heaters 195 disposed upon the second lower waveguide cladding 140B.

Figure 2A:
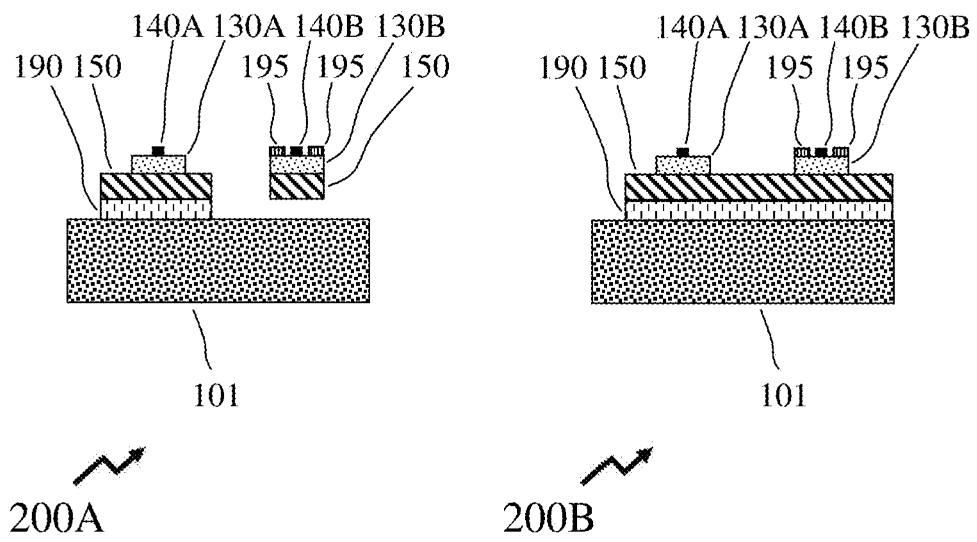
FIGS. 2A and 2B depict the indicated cross-sections of the thermo-optic phase shifter elements according to embodiments of the invention employing suspended beams depicted in FIGS. 1B and 1C respectively.
Figure 2B:
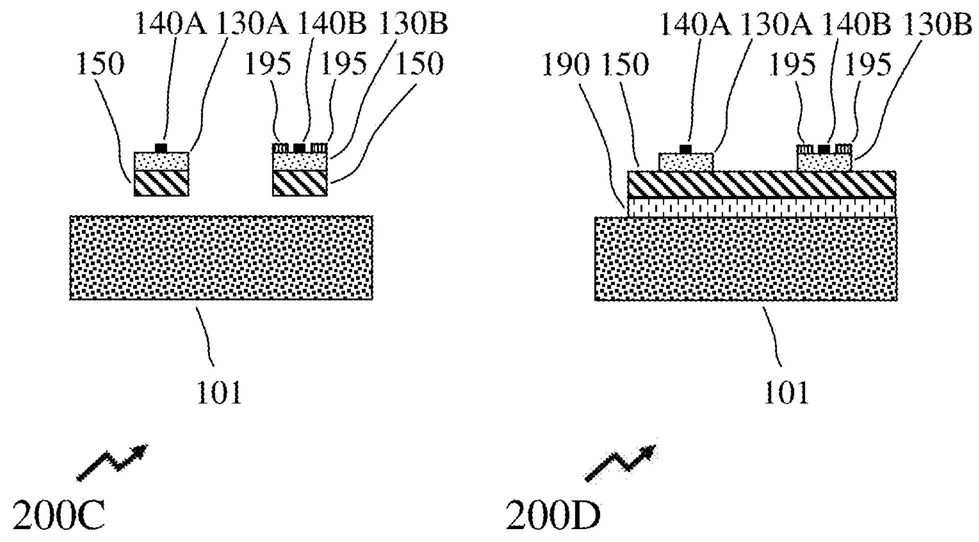

Now referring FIGS. 2A and 2B there are depicted the indicated cross-sections of the thermo-optic phase shifter elements according to embodiments of the invention employing suspended beams depicted in FIGS. 1B and 1C respectively. Referring initially to FIG. 2A there are depicted first and second cross-sections 200A and 200B along sections X1-X1 and Z1-Z1 of the geometry depicted in FIG. 1B. Accordingly, in first cross-section 200A along X1-X1 there is depicted the first waveguide core 140A and first lower waveguide cladding 130A atop a mechanical layer 150 which is coupled to the substrate 101 by layer 190. Accordingly, the layer 190 mechanically supports the mechanical layer 150 such that this portion is the non-suspended portion 125 depicted in FIG. 1B. Also depicted are second waveguide core 140B and second lower waveguide cladding 130B atop the mechanical layer 150 which is now isolated from the substrate 101 thereby forming a suspended waveguide portion depicted in FIG. 1B.

In second cross-section 200B along the section Z1-Z1 the mechanical layer 150 is now continuous between the first and second waveguides and supported by the layer 190 such that both the waveguide portions are non-suspended waveguides at this point. Now referring FIG. 2B there are depicted first and second cross-sections 200C and 200D along sections X2-X2 and Z2-Z2 of the geometry depicted in FIG. 1C. Accordingly, in first cross-section 200C along X2-X2 there is depicted the first waveguide core 140A and first lower waveguide cladding 130A atop a mechanical layer 150 which is not coupled to the substrate 101 by layer 190. Accordingly, the first waveguide is upon a suspended portion of the device as depicted in FIG. 1C. Also depicted are second waveguide core 140B and second lower waveguide cladding 130B atop the mechanical layer 150 which is now isolated from the substrate 101 thereby forming another suspended waveguide portion. In second cross-section 200D along the section Z1-Z1 the mechanical layer 150 is now continuous between the first and second waveguides and supported by the layer 190 such that both the waveguide portions are non-suspended waveguides at this point. The heater is also depicted as comprising two elements one either side of the second waveguide core 140B.

Within embodiments of the invention a heater may be formed beside the waveguide core(s) on the lower cladding, beside the waveguide core(s) on an upper cladding (when implemented), be embedded within the waveguide, be disposed upon the sides of the waveguide and/or mechanical layer, formed upon the bottom of the mechanical layer, formed between the mechanical layer and the lower waveguide cladding or other variants thereof. Within some embodiments of the invention the heater may be formed as part of the optical waveguide by varying an aspect of the waveguide, e.g. doping, material composition. Optionally, depending upon the electrical characteristics of the mechanical layer which may locally varied through doping for example the mechanical layer itself may form the heater(s).

Within the embodiments of the invention depicted in FIGS. 1A to 2B and subsequently in Section C in FIGS. 8A to 9B, a mechanical layer is depicted supporting the lower waveguide cladding, waveguide core, heaters(s) and (if implemented) the upper cladding. This may for example be a silicon layer where the waveguides are formed upon a silicon-on-insulator (SOI) wafer such that the layer 190 is the insulator layer which can be selectively isotropically etched to release the suspended waveguide portions and any MEMS structures formed within the devices. It would be evident to one of skill in the art that, depending upon the mechanical properties of the lower cladding and its geometrical design, with considerations for the core layer and/or an upper cladding layer (when present), the mechanical layer 150 may be omitted within other embodiments of the invention.

Figure 3A:
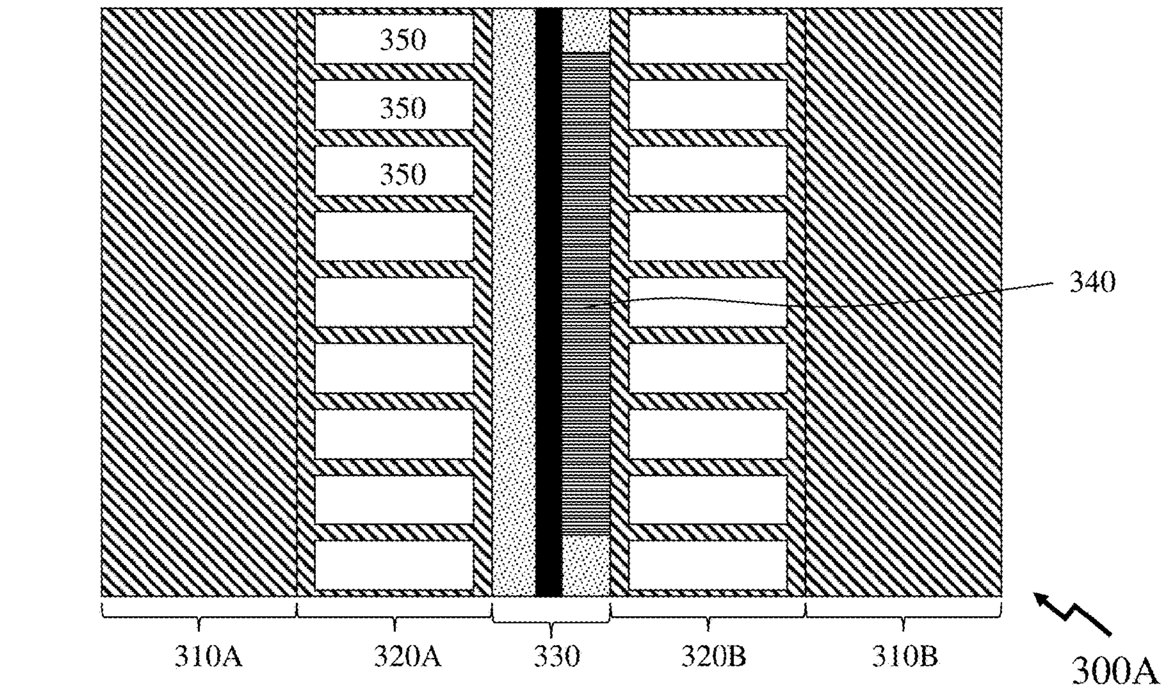
FIGS. 3A and 3B depict thermo-optic phase shifter elements according to embodiments of the invention employing suspended beams with anchored linkages to non-suspended portions of the optical device employing the phase shifter elements.
Figure 3B:
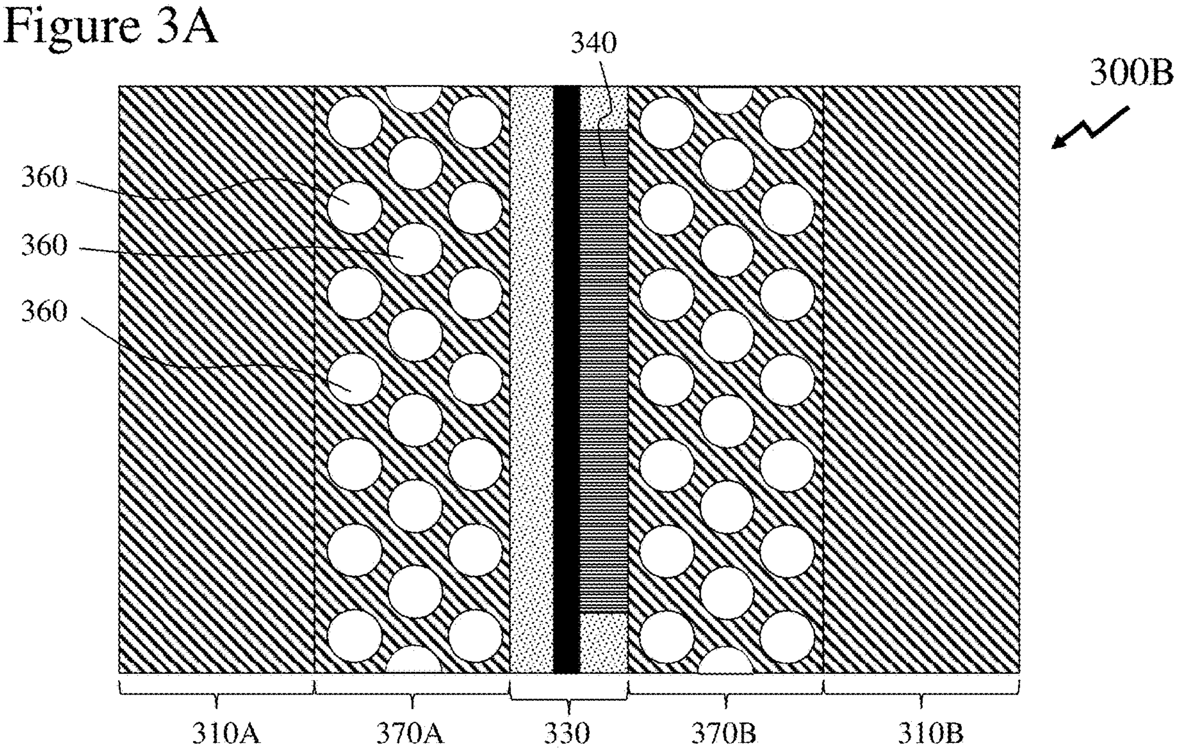

As discussed above the inventors have established that the suspended waveguide portion may, rather than being isolated except at an end from the substrate, be coupled to the substrate through a membrane. Referring to FIGS. 3A and 3B there are depicted thermo-optic phase shifter elements according to embodiments of the invention employing suspended beams with linkages to non-suspended portions of the optical device employing the phase shifter elements. Referring FIG. 3A there is depicted a non-suspended portion of the device 310A, another non-suspended portion of the device 310B and a suspended waveguide portion 330 disposed in between coupled to these via first and second membranes 320A and 320B, whereby holes or voids 350 have been micromachined providing flexures for suspended waveguide portion 330 to move. As noted above, the suspended waveguide portion when isolated in air has a high thermal resistance such that when the heater power is reduced the time constant of the suspended waveguide portion cooling is long. The only path for thermal loss other than through the surrounding air being the small portion of the suspended waveguide portion coupled to the non-suspended portion of the device where typically a narrow thin geometry presents a high thermal resistance as well.

Accordingly, first and second membranes 320A and 320B provide openings through which the underlying layer (e.g. layer 190) is removed through one or more processes according to the material(s) forming the layer 190, including isotropic etching for example, to release the suspended waveguide portion. As depicted these openings provide a series of beams connecting the suspended waveguide portion 330 to the non-suspended portion of the device 310A and another non-suspended portion of the device 310B. The beams acting as flexures allow the suspended waveguide portion 330 to expand longitudinally with respect to the non-suspended portion of the device 310A and another non-suspended portion of the device 310B. The beams may be varied in width to adjust their stiffness. Similarly, where the mechanical layer is provided it may be varied in material, material composition, thickness etc. to also tune the stiffness of the flexures so that they support motion of the suspended waveguide portion without inducing additional mechanical strains, deformations, etc. Disposed upon the suspended waveguide portion 330 is a heater 340.

In FIG. 3B the same basic structure is depicted where the suspended waveguide portion 330 is now connected to the non-suspended portion of the device 310A and another non-suspended portion of the device 310B via first and second membranes 370A and 370B respectively. These first and second membranes 370A and 370B based upon the design and pattern of holes 360 providing flexures for suspended waveguide portion 330 to move but with increased stiffness relative to that of the structure depicted in FIG. 3A. The holes also provide for pathways to isotropically etch of the underlying sacrificial layer (e.g. layer 190) to release the suspended portion(s).

Within FIGS. 3A and 3B where a mechanical layer is provided the membranes may be formed solely within the mechanical layer or they may be formed within the mechanical layer and additional layers, e.g. lower waveguide cladding, etc. Optionally, within embodiments of the invention the membranes may be formed solely within the lower cladding layer or a stack of materials forming the waveguide where either no mechanical layer is implemented or it is also selectively etched.

Figure 4A:
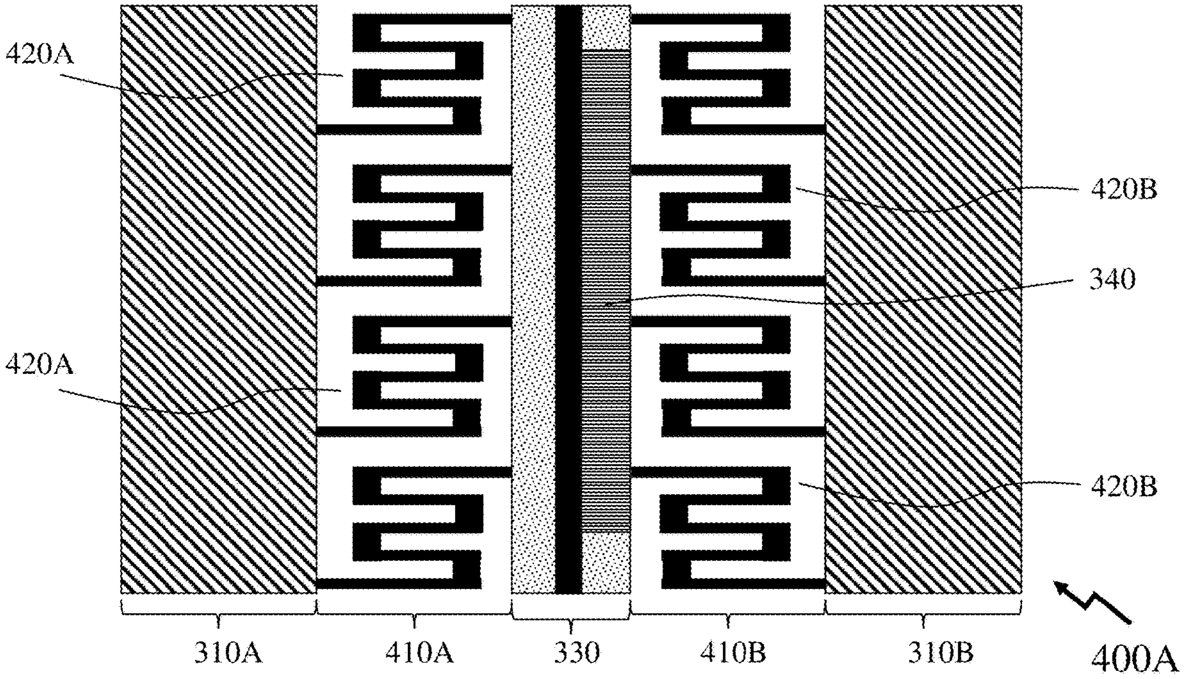
FIGS. 4A and 4B depict thermo-optic phase shifter elements coupled. to an electrothermal MEMS according to embodiments of the invention employing suspended beams employing spring anchored linkages to non-suspended portions of the optical device employing the phase shifter elements.
Figure 4B:
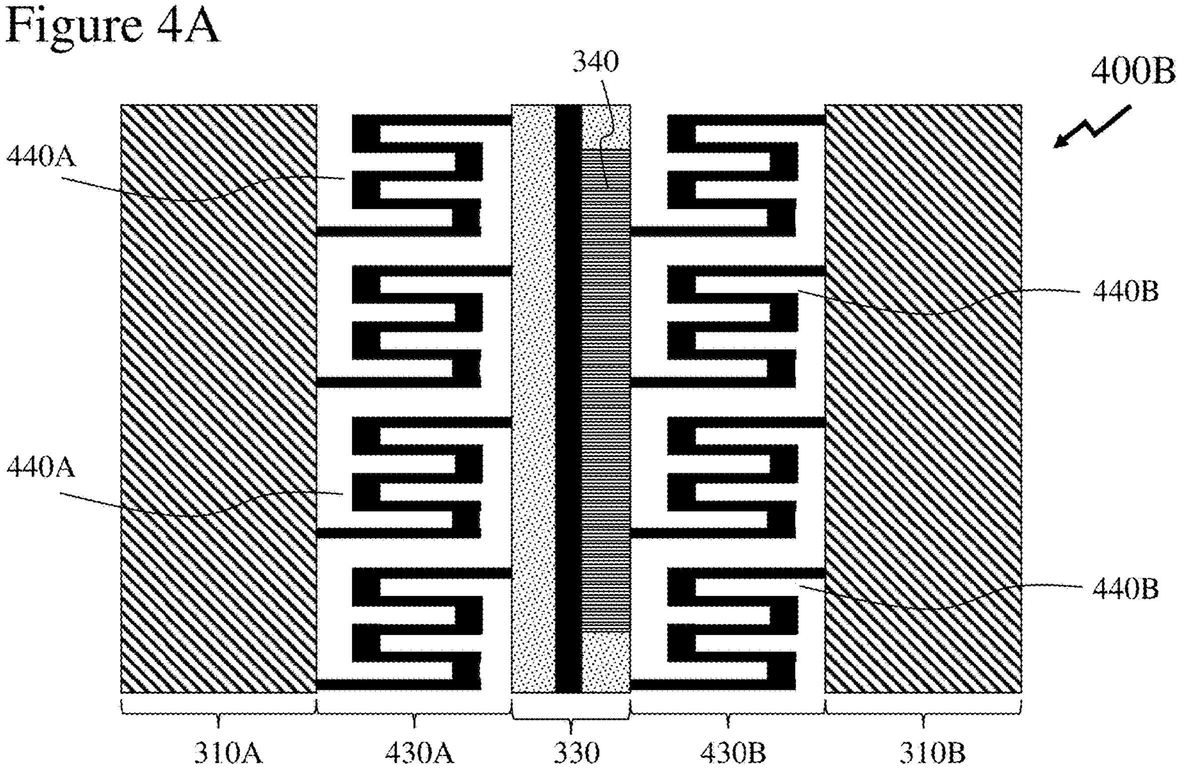

FIGS. 4A and 4B depict thermo-optic phase shifter elements according to embodiments of the invention where suspended beams with phase shifter elements employ spring linkages to non-suspended portions of the optical device. Within each of FIGS. 4A and 4B a non-suspended portion of the device 310A and another non-suspended portion of the device 310B carry a suspended waveguide portion 330 disposed between them where these are coupled via first and second membranes 410A and 410B in FIG. 4A and first and second membranes 430A and 430B in FIG. 4B. In each instance disposed upon the suspended waveguide portion 330 is a heater 340.

Referring to FIG. 4A the first membrane 410A comprises a series of first springs 420A whilst second membrane 410B comprises a series of second springs 420B. The first springs 420A and second springs 420B being mirror images relative to an axis of the suspended waveguide portion. Referring to FIG. 4B the first membrane 430A comprises a series of third springs 440A whilst second membrane 430B comprises a series of fourth springs 440B. The third springs 440A and fourth springs 440B not being mirror images of each other relative to an axis of the suspended waveguide portion.

The beams of the springs may be varied in width to adjust their stiffness. Similarly, where the mechanical layer is provided it may be varied in material, material composition, thickness etc. to also tune the stiffness of the flexures so that they support motion of the suspended waveguide portion without inducing additional mechanical strains, deformations, etc.

Within FIGS. 4A and 4B where a mechanical layer is provided the membranes may be formed solely within the mechanical layer or they may be formed within the mechanical layer and additional layers, e.g. lower waveguide cladding, etc. Optionally, within embodiments of the invention the membranes may be formed solely within the lower cladding layer or a stack of materials forming the waveguide where either no mechanical layer is implemented or it is also selectively etched.

Figure 5:
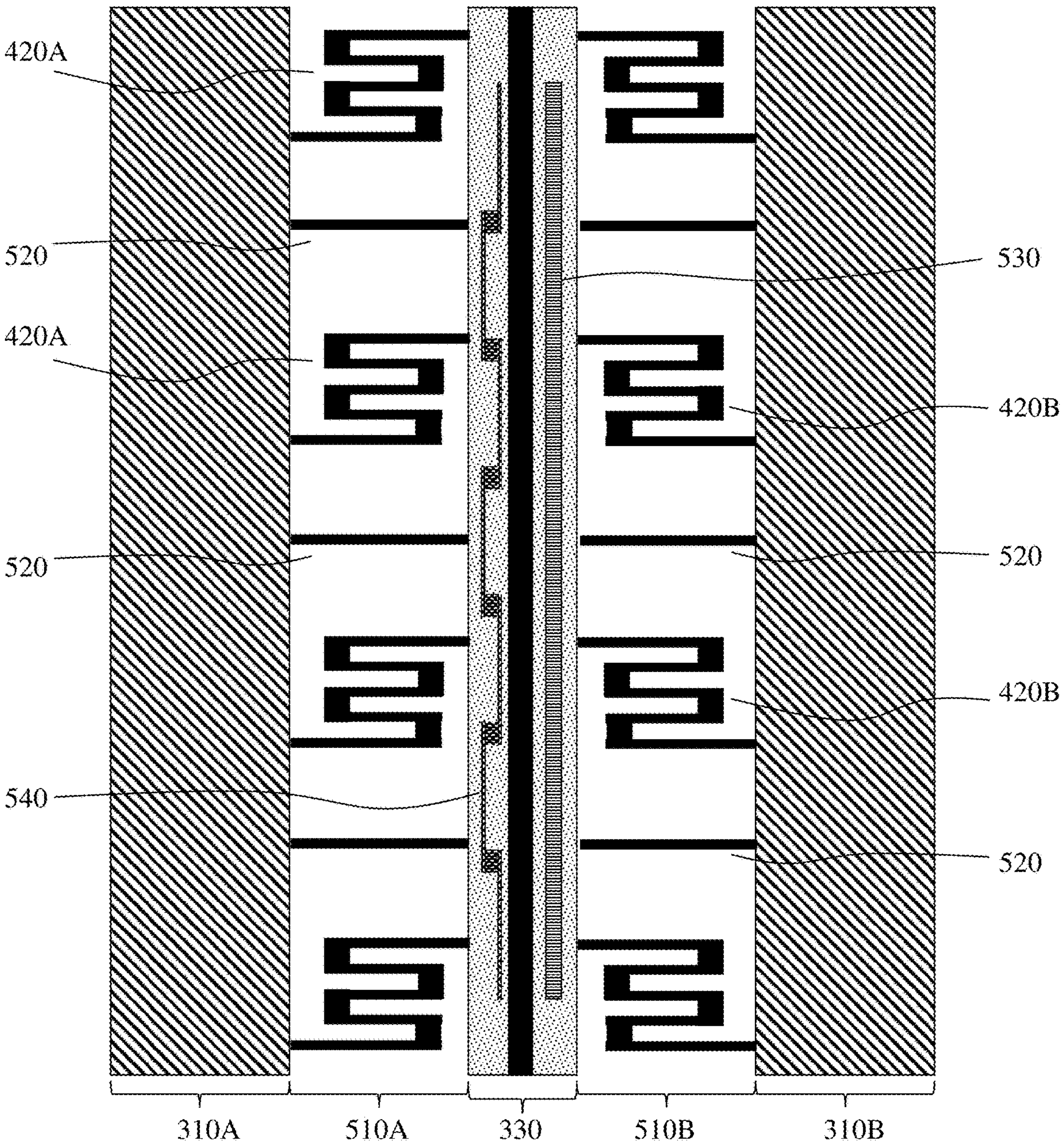
FIG. 5 depicts a thermo-optic phase shifter element coupled to an electrothermal MEMS according to embodiments of the invention employing a suspended beam with spring and non-spring anchored linkages to non-suspended portions of the optical device employing the phase shifter element.

Now referring to FIG. 5 there is depicted a thermo-optic phase shifter element according to embodiments of the invention where a suspended beam with the phase shifter element employ spring and non-spring linkages to non-suspended portions of the optical device. Accordingly there is depicted a non-suspended portion of the device 310A and another non-suspended portion of the device 310B having a suspended waveguide portion 330 disposed between them where these are coupled via first and second membranes 510A and 510B. First membrane 510A comprising a series of first springs 420A and series of non-spring linkages 520. Second membrane 510B comprising a series of second springs 420B and series of non-spring linkages 520. The non-spring linkages provide flexing in the direction of motion of the suspended waveguide portion under thermal expansion but limit lateral movement. The suspended portion is thermally addressed by heaters 530 and 540.

Figure 6:
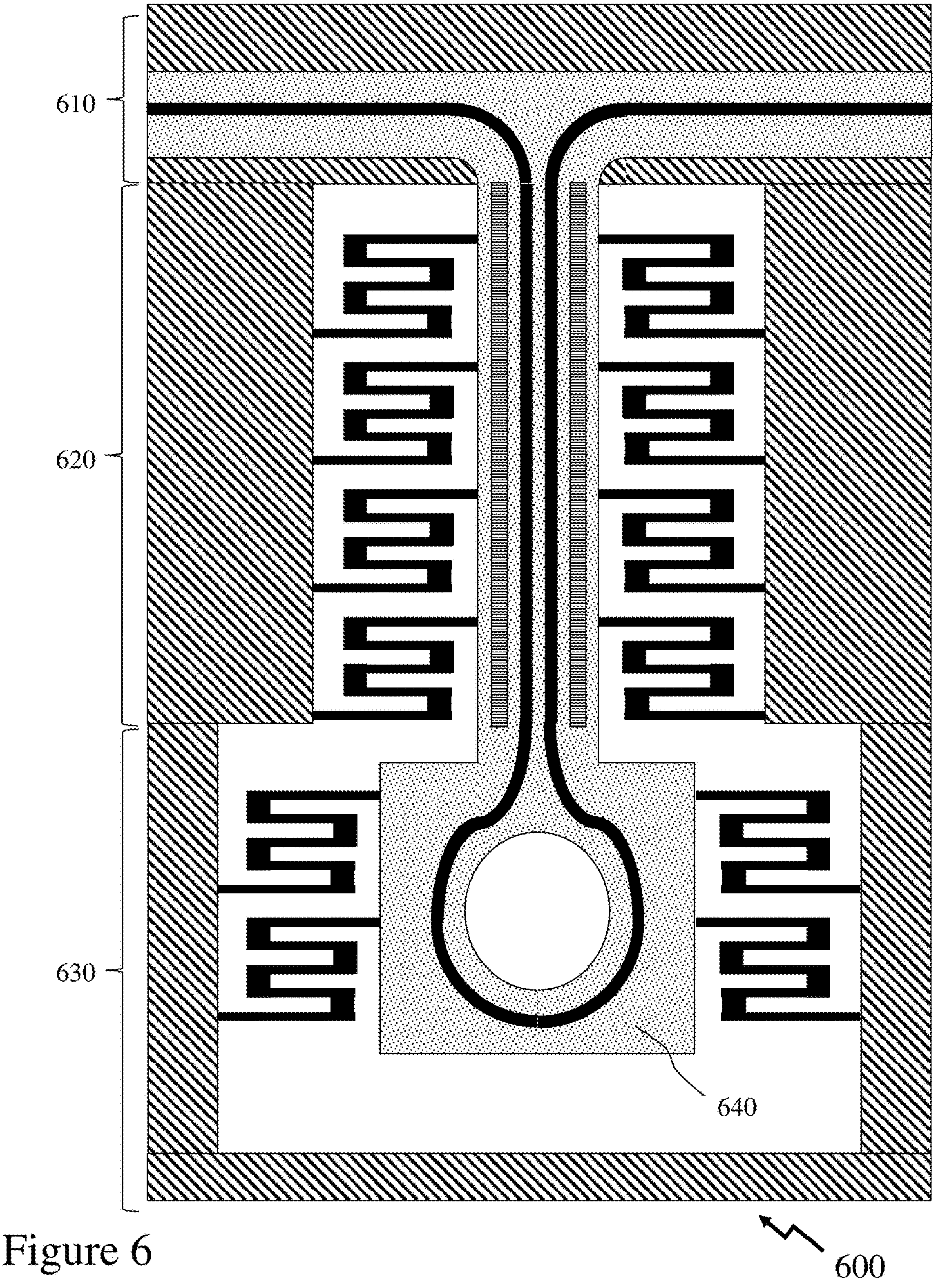
FIG. 6 depicts a thermo-optic phase shifter element coupled to an electrothermal MEMS according to embodiments of the invention employing a suspended beam with spring anchored linkages to non-suspended portions of the optical device employing the phase shifter element.

Referring to FIG. 6 there is depicted a thermo-optic phase shifter (TOPS) 600A according to embodiments of the invention where suspended beam with the phase shifter element employs spring linkages to non-suspended portions of the optical device. As depicted the TOPS 600 comprises a first portion 610, a second portion 620 and a third portion 630. The first portion is a non-suspended waveguide portion supporting an input waveguide and output waveguide which are coupled to the pair of waveguides on the second portion 620. The second portion 620 comprising a central suspended waveguide portion with the pair of waveguides disposed between, and coupled to via springs, a pair of non-suspended portions. Accordingly, operation of the heater(s) results in longitudinal expansion of the suspended waveguide portion. Disposed at the end of the second portion 620 is third portion 630 which is another suspended waveguide portion 640 having a waveguide looping so that it couples from one waveguide on the suspended waveguide portion of the second portion 620 to the other waveguide on the suspended waveguide portion of the second portion 620 so that light is coupled from the input to the output on the first portion 610 with a phase shift induced by the thermo-optic effects imparted by the heater(s).

Figure 7A:
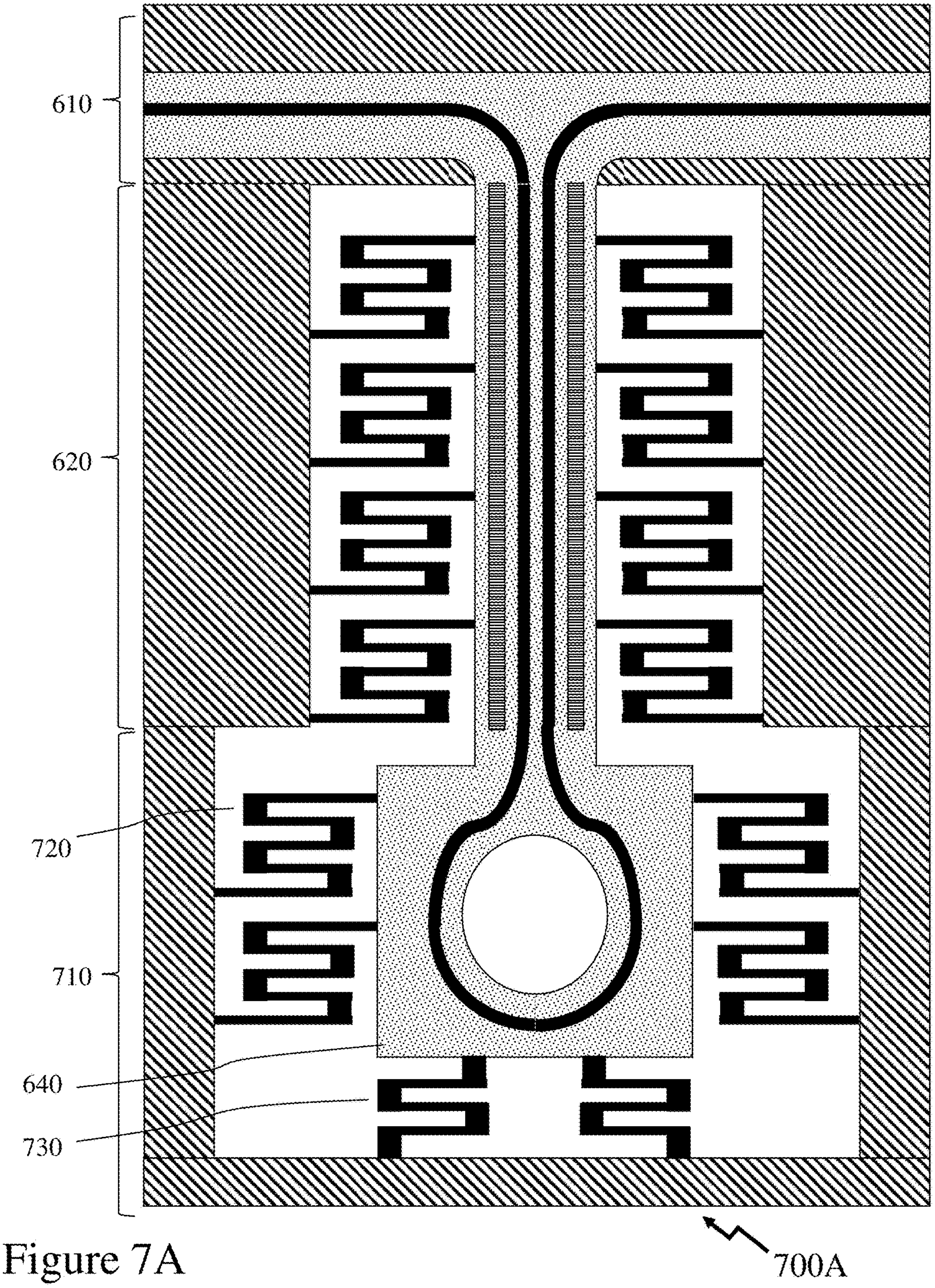
FIGS. 7A to 7D depict thermo-optic phase shifter elements coupled to an electrothermal MEMS according to embodiments of the invention employing a suspended beam with spring anchored linkages to non-suspended portions of the optical device employing the phase shifter element.

FIG. 7A depicts a thermo-optic phase shifter element 700A according to embodiments of the invention employing a suspended beam with spring linkages to non-suspended portions of the optical device employing the phase shifter element. The structure depicted in FIG. 7 is structurally similar to that depicted in FIG. 6 except that a further set of springs (or single spring) are coupled from the end of the third suspended waveguide portion 640 to a non-suspended portion of the device with the springs axis of extension being aligned with that of the extension of the second portion 620. Optionally, non-spring linkages such as depicted in FIG. 5 may also be added.

Figure 7B:
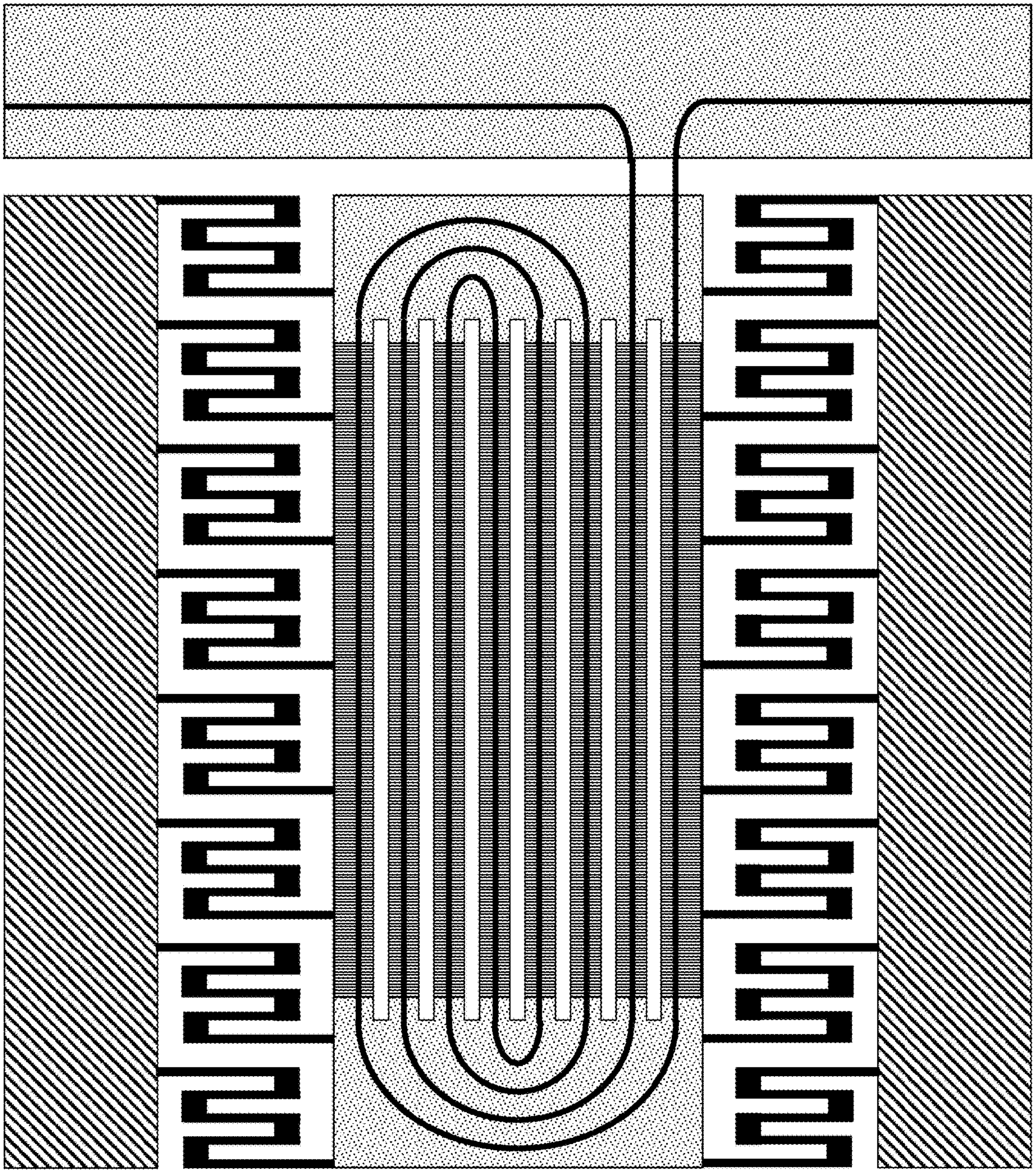
Figure 7C:
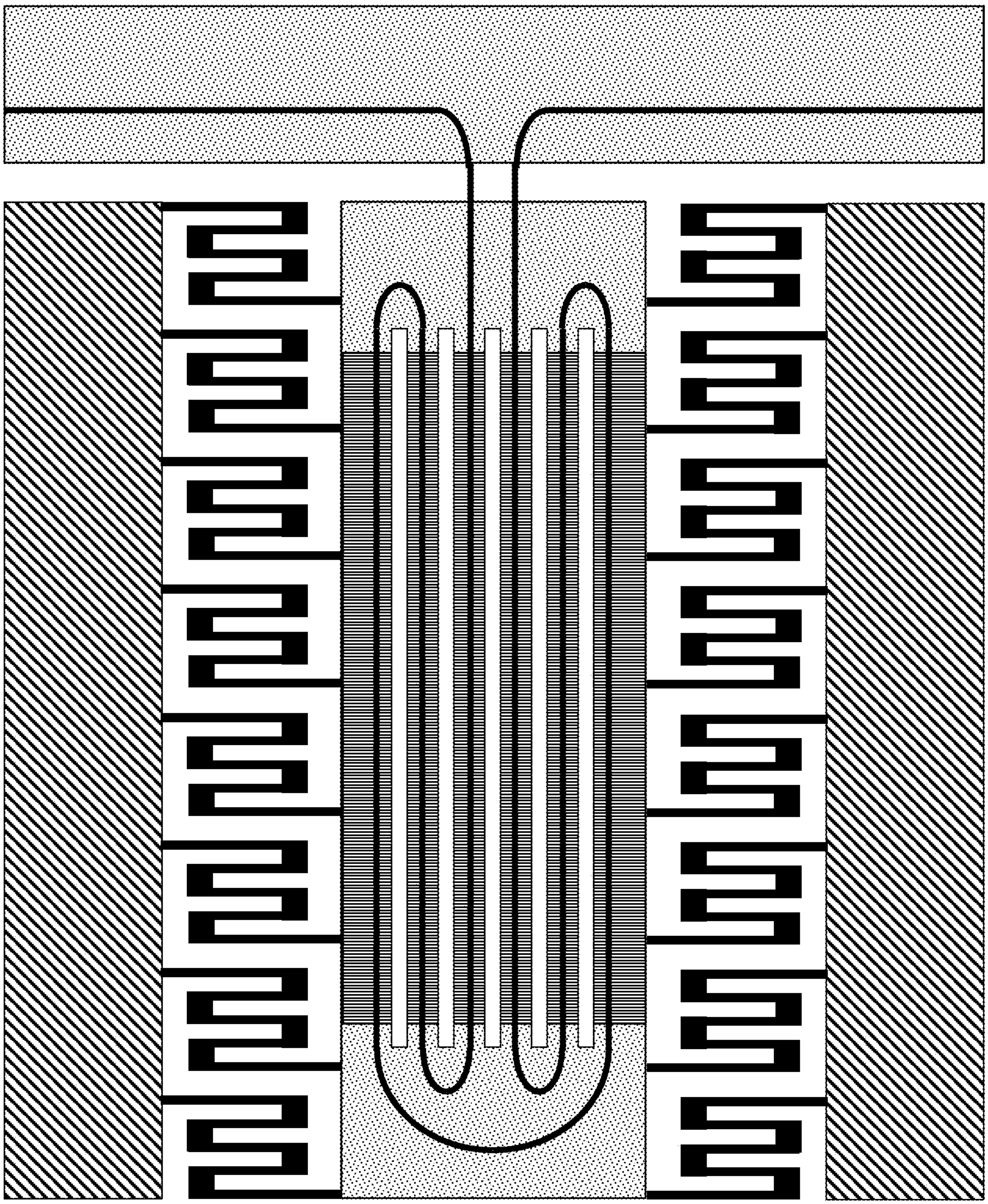

FIGS. 7B and 7C depict further variants 700B and 700C where the number of "traverses" of the suspended waveguide portion made by the optical waveguide are increased to increase the effective path length. In FIG. 7B the "looped"

waveguide is disposed to one side of the input/output waveguides whilst in FIG. 7C it is disposed either side of these waveguides.

Figure 7D:
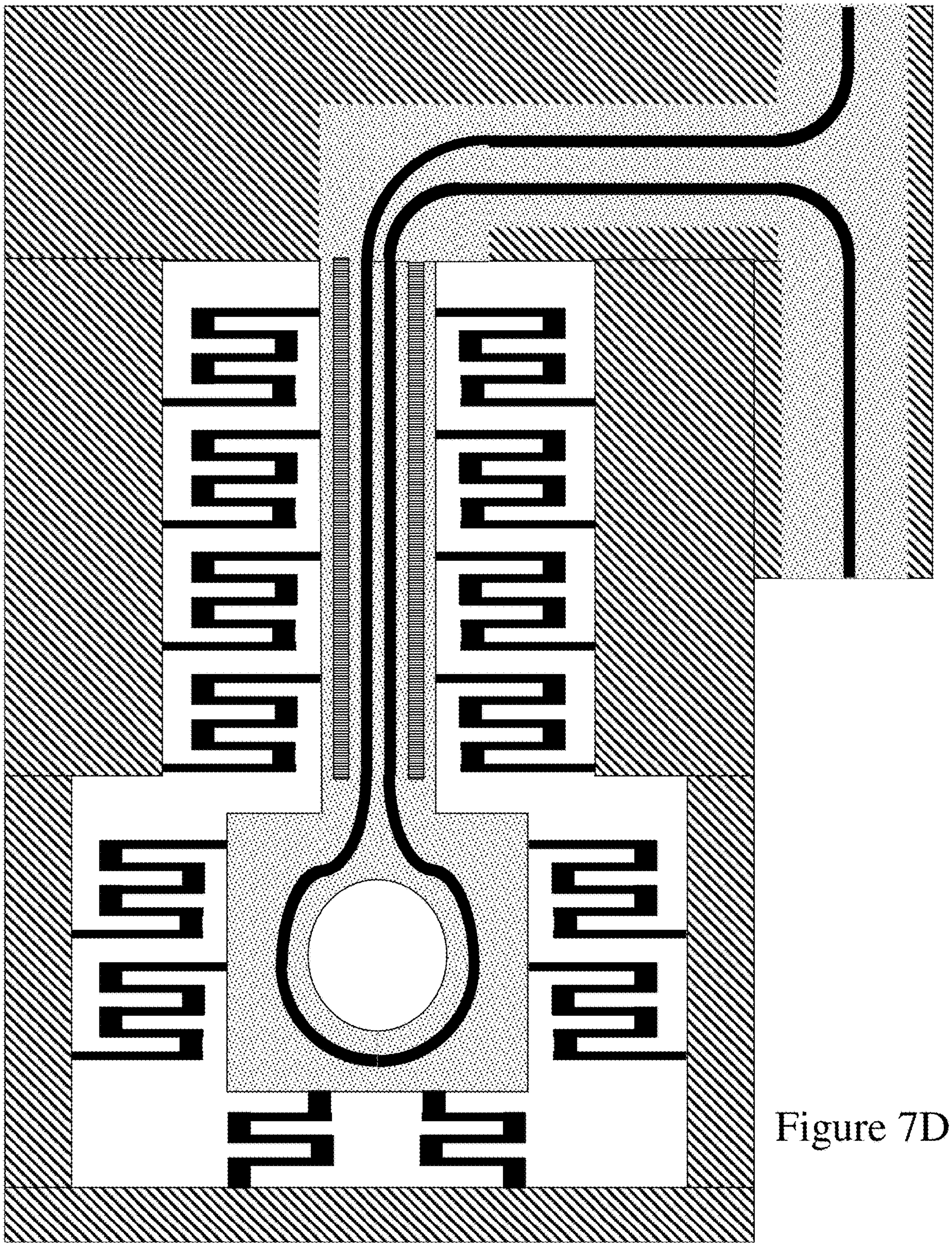

Whilst FIGS. 7A to 7C depict suspended portions upon which the phase shifter element is implemented that extends perpendicular to an axis of the non-suspended portion having input and output waveguides coupled to the phase shifter element it would be evident that other orientations and geometries may be employed without departing from the scope of the invention. For example FIG. 7D depicts a geometry where the phase shifter element is substantially parallel to the axis of the of the non-suspended portion having the input and output waveguides. Further, whilst FIG. 7A depicts an elongated beam in a clamped-free (i.e. the clamped end being that rigidly attached to the substrate via the non-suspended portion and the free end being that linked via springs to the substrate via the non-suspended portion and FIGS. 7B and 7C other rectangular geometries it would also be evident that the suspended waveguide portion (i.e. a beam with waveguide disposed atop it or a beam from a waveguide) may have other geometries including, but not limited to, for example a spiral.

Accordingly, the inventors have established novel designs for a phase shifter. For example, they have determined that should one arm of an MZI be suspended by springs rather than with fixed anchors, such springs would allow the volumetric expansion stemming from coefficient of thermal expansion (CTE) to elongate the arm of the MZI suspended by the springs in relation to the other arm of the MZI. The inventors have determined that rather than merely allowing the residual energy from the thermal heater serving the primary purpose of increasing the refractive index through the impact of temperature on polarizability to sink to the substrate, the sinking through springs in the silicon dioxide cladding on the same suspended arm of the MZI, would result in an enhancement of the total phase shift possible within an MZI, at a fixed level of power consumption. The inventors had thus devised a manner to achieve the same level of phase shifting at an overall lower level of power consumption, by allowing a thermo-optic phase shifter to physically elongate one arm of an MZI in relation to the other arm of the MZI, and thus slow down the photons both by way of increasing the refractive index of one arm in relation to the other arm as well as physically increasing the length of one arm in relation to the other arm.

Within a typical design implemented by the inventors for prototypes approximately 90% of the overall phase shift is due to the thermo-optic polarizability effect with the remainder (approximately 10%) being due to the physical elongation of the path using springs rather than anchors suspending one arm of the MZI.

The resulting mechanically enhanced thermo-optic MZI 2×2 cell is more power efficient than one based only on a thermo-optic phase shifter without mechanical contribution to the 180-degree phase shift.

Figure 39:
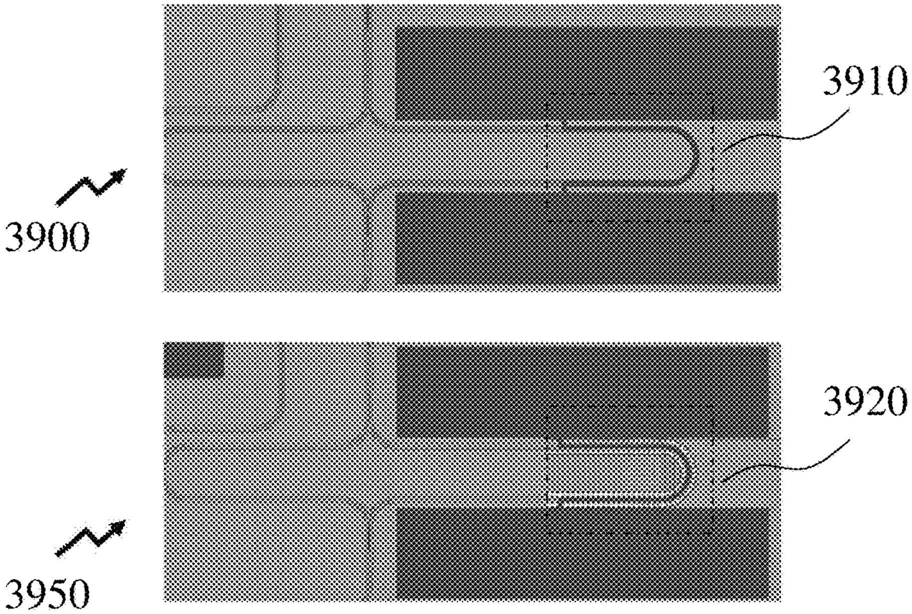
FIG. 39 depicts schematics of implemented thermo-optic phase shifters with and without a suspended beam according to an embodiment of the invention.

FIG. 39 depicts first and second Schematics 3900 and 3950 of implemented thermo-optic phase shifters with and without a suspended beam according to an embodiment of the invention. The region within the two implemented circuits that differs being Regions 3910 and 3920 which is not suspended in first Schematic 3900 and comprising a suspended beam in second Schematic 3950. The circuit implemented being a 1×2 MZI. The experimental results for the non-suspended design in first Schematic 3900 were an effective shift of the MZI by 1.5 GHz/W for TE and 1.8 GHz/W for TM. In contrast, the suspended design in second Schematic 3950 yielded an effective shift of the MZI of 25 GHz/W for TM. Accordingly, for TM the suspended beam design increased the phase shifting efficiency by approximately 1400%.

Figure 40:
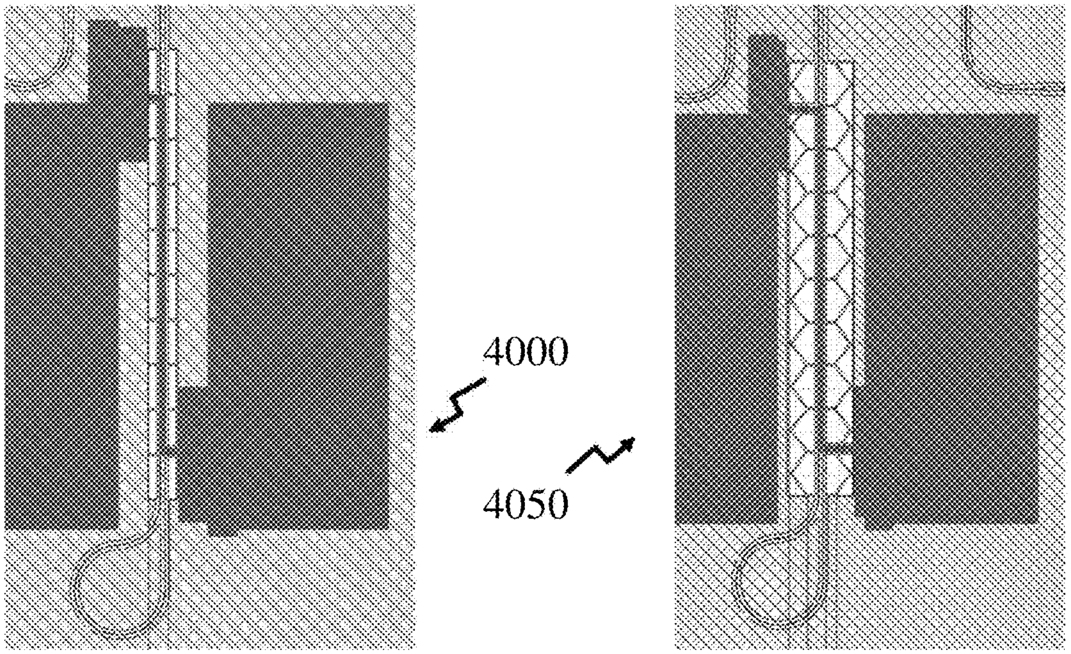
FIG. 40 depicts schematics of implemented thermo-optic phase shifters with suspended beams according to embodiments of the invention.

FIG. 40 depicts first and second Schematics 4000 and 4050 of implemented thermo-optic phase shifters with suspended beams according to embodiments of the invention. Within first Schematic 4000 the suspended beam with optical waveguide and heater is laterally suspended via 9 straight supports whereas in second Schematic 4050 it is laterally suspended by 9 beams that are coupled to the substrate via Y-joints so that each lateral suspension is attached at two points to the non-suspended portion of the device. The measured efficiencies for the MZI devices with the design of first Schematic 4000 being 47 GHz/W and 40 GHz/W for TE and TM respectively. The measured efficiencies for the MZI devices with the design of second Schematic 4050 being 65 GHz/W and 56 GHz/W for TE and TM respectively, i.e. approximately 40% increase in efficiency for both TE and TM polarisations respectively.

Figure 41:
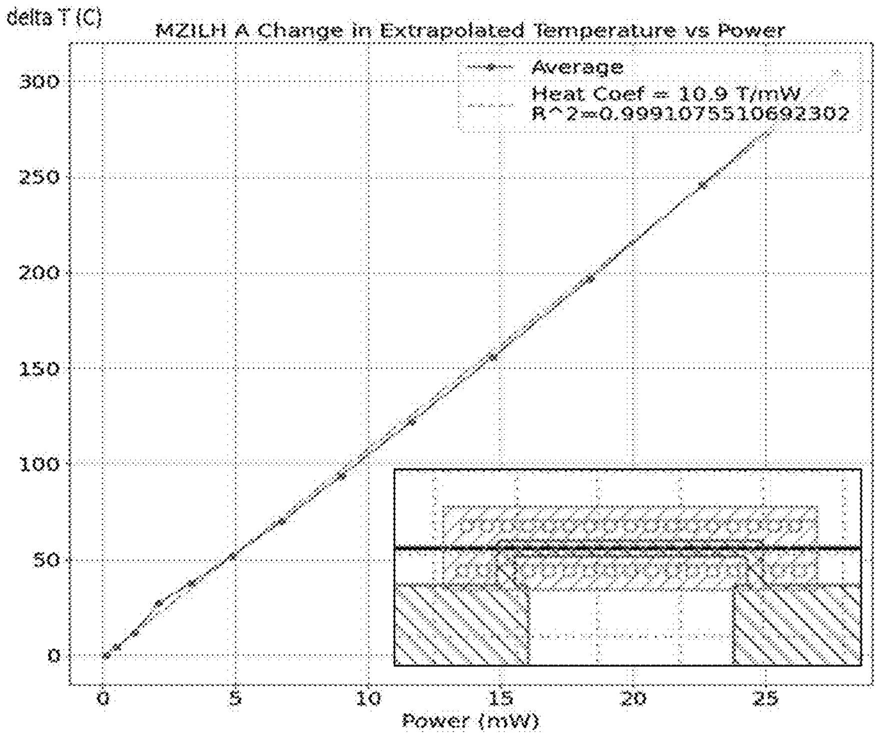
FIGS. 41 and 42 depict experimental results for thermo-optic phase shifters with suspended beams according to embodiments of the invention with inset schematics of the structures.
Figure 42:
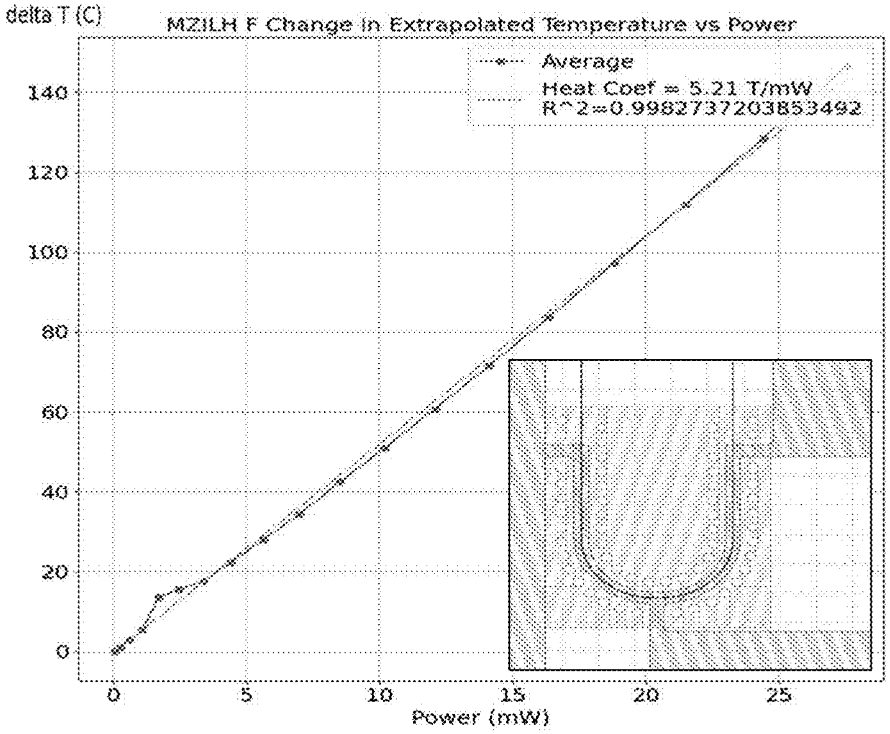

FIGS. 41 and 42 depict experimental results for thermo-optic phase shifters with suspended beams according to embodiments of the invention with inset schematics of the structures. FIG. 41 depicts a design wherein the phase shifting element is attached at either end to the substrate with a central suspended portion employing circular openings to suspend the waveguide with periodic attachment, such as depicted in FIG. 3B, albeit a single row either side of the waveguide, with a linear heating element disposed along part of the suspended beam. The measured temperature increase of the suspended beam was 10.9° C./mW such that a temperature increase of 100° C. for phase shifting was achieved with less than 10 mW electrical drive power.

In FIG. 42 there is depicted an alternate design wherein the suspended phase shifter element is a U-shaped design with a suspension again comprising a single row of openings either side of the waveguide such as depicted in FIG. 3B to suspend the waveguide with periodic attachment points. The heater element is similarly U-shaped with three contacts, one at each side of the U-shaped element and a third at the mid-point of the U-shaped element. The measured temperature increase of the suspended beam was 5.2° C./mW such that a temperature increase of 100° C. for phase shifting was achieved with less than 20 mW drive electrical power.

Figure 43:
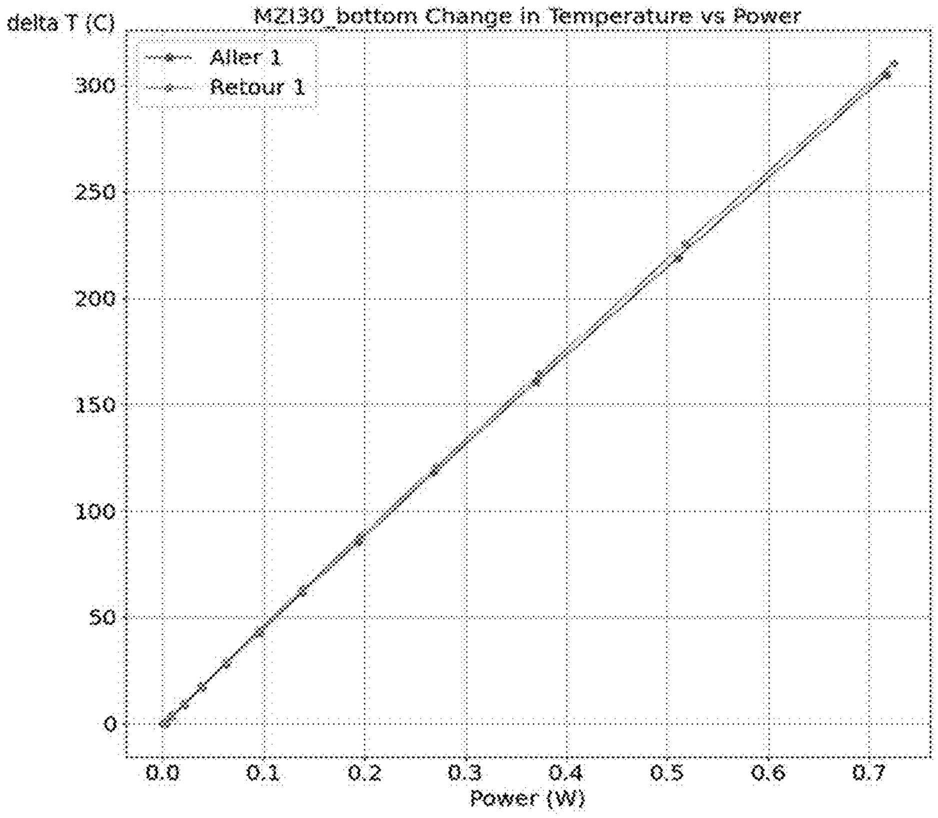
FIG. 43 depicts experimental results and structural schematic for a thermo-optic phase shifter without a suspended beam according to an embodiment of the invention.
Figure 43:
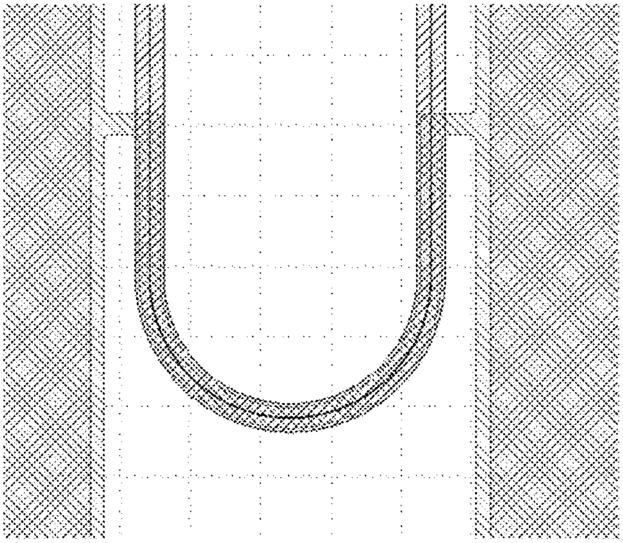

FIG. 43 depicts experimental results and structural schematic for a thermo-optic phase shifter without a suspended beam according to the same geometric design of the suspended beam according to an embodiment of the invention in FIG. 42. Accordingly, the measured temperature increase of the suspended beam was approximately 0.44° C./mW such that a temperature increase of 100° C. for phase shifting required approximately 220 mW. Accordingly, suspension of the thermo-optic phase shifter element results in approximately 1000% efficiency improvement, reducing the required drive power from approximately 2.2 mW/° C. to approximately 0.2 mW/° C.

Figure 44:
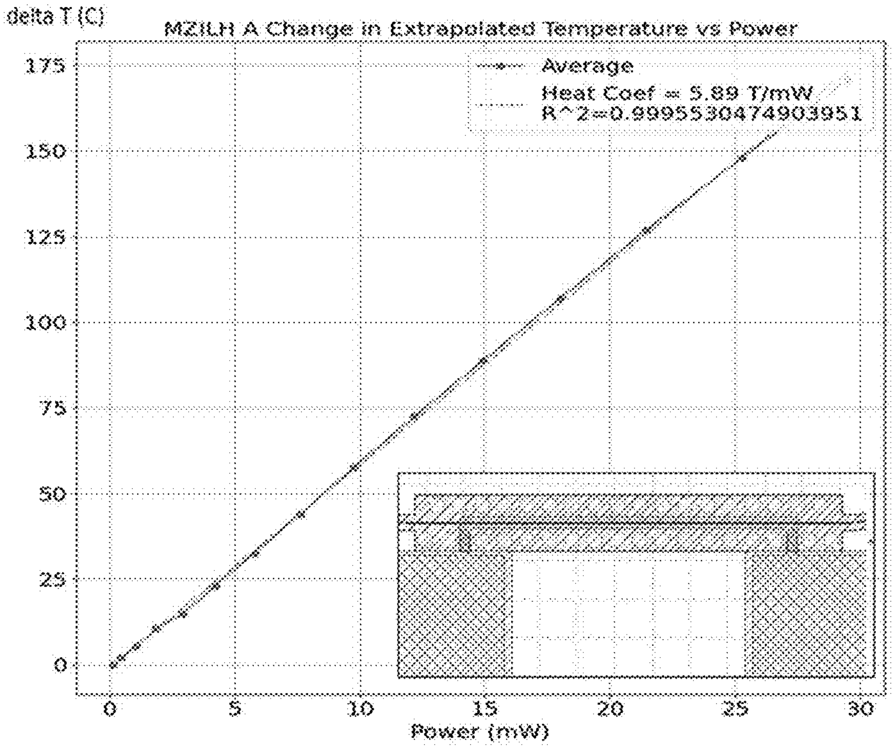
FIGS. 44 and 45 depict experimental results for thermo-optic phase shifters with suspended beams according to embodiments of the invention with inset schematics of the structures.
Figure 45:
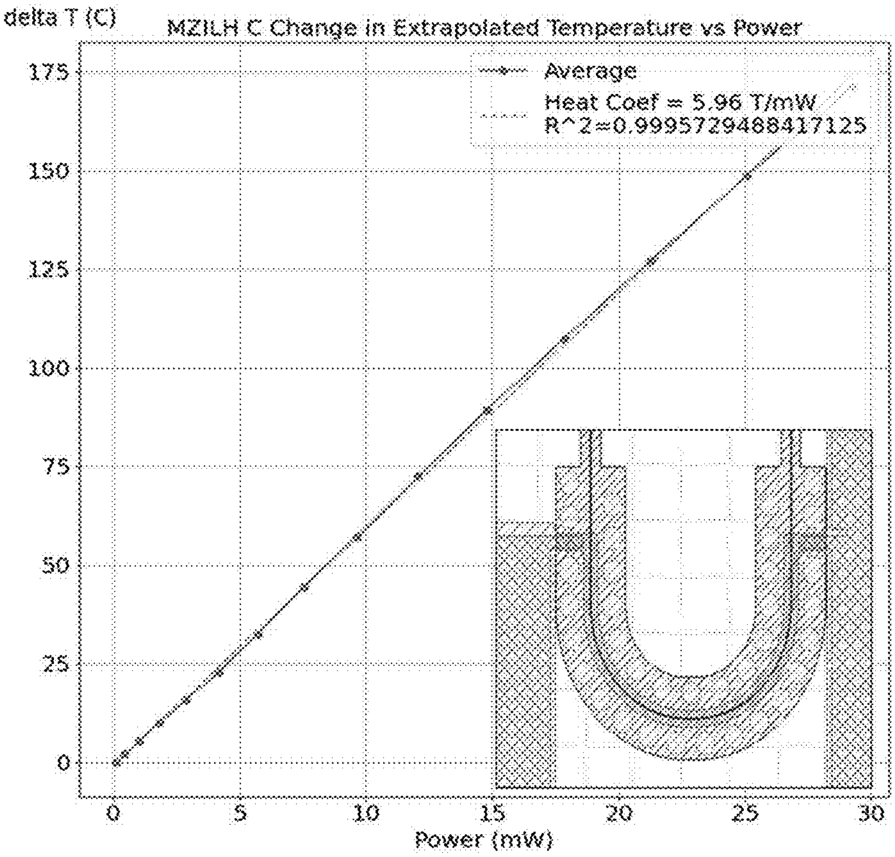

FIGS. 44 and 45 depict experimental results for thermo-optic phase shifters with suspended beams according to embodiments of the invention with inset schematics of the structures. FIG. 44 being a linear suspended beam similar to that depicted in FIG. 41 wherein the resulting measured temperature increase of the suspended beam was 5.9° C./mW. FIG. 45 being a U-shaped suspended beam similar to that depicted in FIG. 42 wherein the additional layers of the optical waveguide stack (other than the core) now cover a smaller footprint. The resulting measured temperature increase of the suspended beam was 6.0° C./mW. Accordingly, relative to the 5.2° C./mW of the design of FIG. 42 the reduction in additional material from the waveguide stack has a smaller effect on the device's efficiency (increasing it from 5.2° C./mW to 6.0° C./mW) relative to the suspension of thermo-optic phase shift element increasing it from 0.44° C./mW to 5.2° C./mW or 6.0° C./mW.

Whilst within the embodiments of the invention described above the suspended beams are described and depicted with respect to thermos-optic phase shifting elements for optical circuits. However, within other embodiments of the invention the suspended beams with heaters may be employed within other MEMS devices such as thermally actuated MEMS actuators wherein the suspended beams do not include the additional layers of the optical waveguide(s) atop the suspended beam.

Within the embodiments of the invention described and depicted above the optical waveguide has been depicted as being centrally positioned with respect to the heater as are the upper cladding. However, it would be evident that the placement and design of the heater relative to the waveguide core discretely or in combination to the upper cladding etch may be offset in order to adjust the effective index change for the TE and TM polarizations within the polarization phase shifter.

Figure 38:
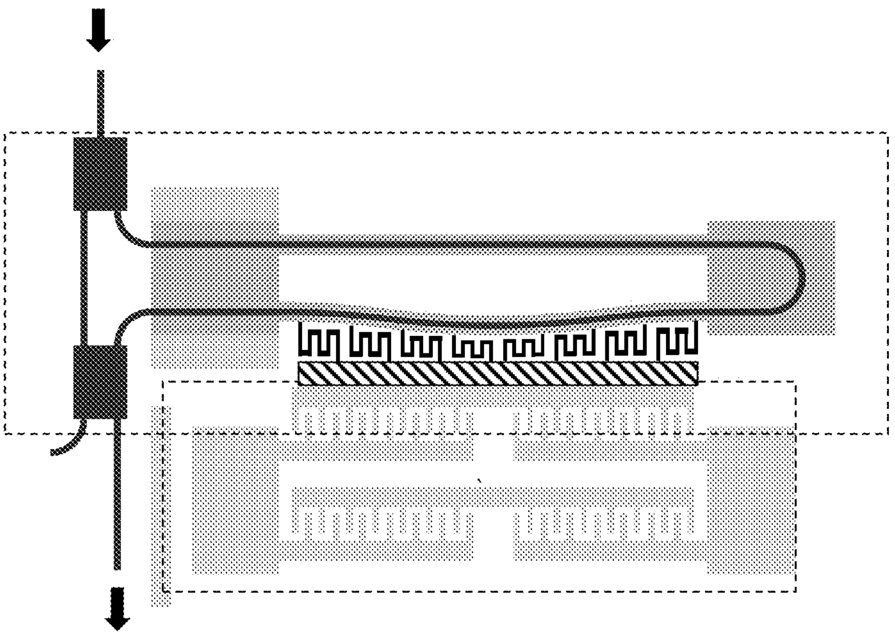
FIG. 38 depicts a phase shift element according to an embodiment of the invention combining a MEMS actuator with thermo-optic actuator.

It would be evident to one skilled in the art that aspects of phase shifters described and depicted below in Section C exploiting MEMS based actuation may be exploited within other embodiments of the invention in conjunction with those of thermo-optic phase shifters. An exemplary schematic of such a combination being depicted within FIG. 38 wherein the MEMS actuator is coupled to the suspended waveguide via springs such that the heater (not depicted for clarity) can provide thermo-optic phase shifting whilst the MEMS actuator can deform the waveguide. The shifting structure of the suspended waveguide being managed by the springs in both axis parallel to and perpendicular (but in the plane of the substate) to the MEMS.

C: Microelectromechanical Systems (Mems) Phase Shifter/ Delays Structures and Methods As noted above a variety of effects can be employed within optical waveguides according to the material system employed to induce optical phase shifts. For example, these may be via an electro-optic effect, a magneto-optic effect, or a thermo-optic effect. However, it is also possible to induce the optical phase shift without employing any characteristic of the material system the waveguide is formed from apart from a direct mechanical length change.

Accordingly, as will become evident with respect to embodiments of the invention as described and depicted in respect of FIGS. 8A to 38 that the inventors have established phase shifter elements exploiting MEMS actuators allowing them to be actuated electrostatically, for example, with low-power consumption. Accordingly, the inventors combine MEMS actuators, such as parallel plate or comb actuators, to stretch portions of suspended integrated optics waveguides, thereby creating changes both in their effective index and length to impart optical phase shifts on optical signals propagating within the optical waveguide(s) on beams engaged by the MEMS actuators. The resulting integrated optics micro-electro-mechanical-systems (IO-MEMS) phase shifters can serve to effect a change in optical path sufficient to result in optical phase shifts up to 360 degrees (2π radians). Such IO-MEMS phase shifter elements can be integrated as will be evident from the following embodiments of the invention on suspended waveguide portions or portions of integrated optics circuit, for example, traveling wave resonators or interferometers, such as using on one or both arms of balanced Mach-Zehnder Interferometers (MZI). The resulting IOMEMS-enabled phase shifting devices, e.g. an MZI implemented with either 1×2 or 2×2 couplers on either the input or the output forming an MZI switch unitary cell, have inherent phase tuning capability and can be implemented discretely or nested as part of a tree structure, optical cross-connect etc. enabling extinction ratio tuning, wavelength-dependent routing or even broadband switching for example.

Figure 8A:
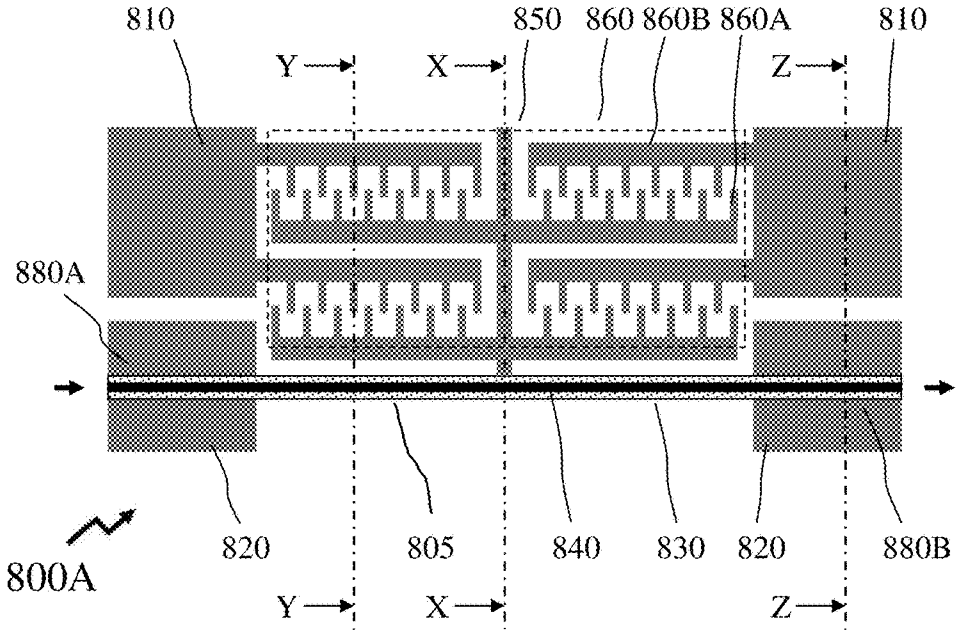
FIGS. 8A and 8B depict an electrostatic MEMS actuated phase shifter according to an embodiment of the invention in an initial non-deflected state.
Figure 8B:
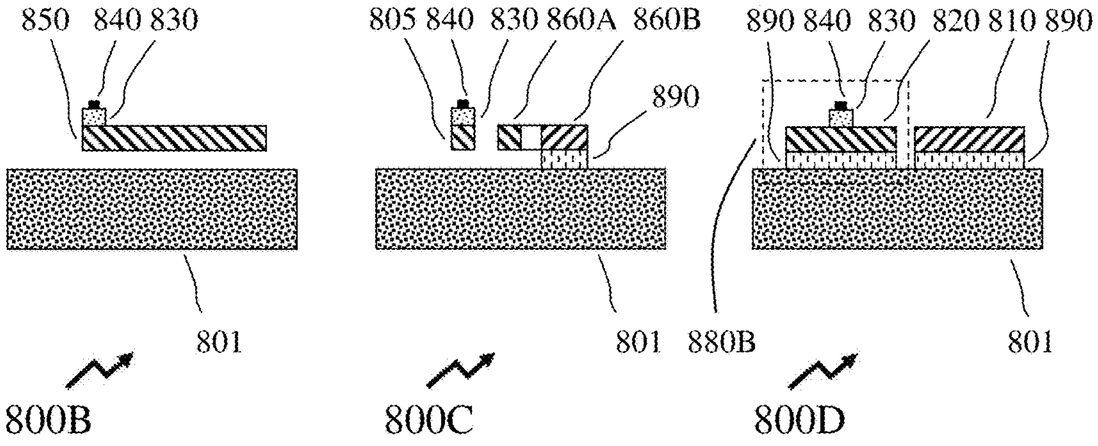

Referring to FIGS. 8A and 8B there are depicted a plan image 800A and first to third cross-sectional images 800B to 800D respectively of a MEMS actuated phase shifter according to an embodiment of the invention in an initial non-deflected state. Accordingly, considering initially plan image 800A an optical waveguide comprising an input non-suspended portion 880A upon a waveguide anchor 820 is coupled to an output non-suspended portion 880B upon the waveguide anchor 820 via a suspended waveguide comprising cladding 830 and core 840. Coupled to the cladding 830 is an arm 850 of a MEMS comb actuator 860 which comprises moving elements 860A and fixed elements 860B which are mechanically connected to anchors 810. In this structure electrostatic attraction/repulsion by application of potential difference between the moving elements 860A and fixed elements 860B results in movement of the moving elements 860A relative to the fixed elements 860B and therein motion of the arm 850 which is mechanically connected to the moving elements 860A.

Referring to first to third cross-sectional images 800B to 800D respectively, these depict cross-sections X-X, Y-Y and Z-Z through the IO-MEMS device according to an embodiment of the invention as depicted in plan image 800A in FIG. 8A. Accordingly, first cross-sectional image 800B representing cross-section X-X is through the IO-MEMS device where the arm 850 joins the cladding 830. As evident in first cross-section image 800B the arm 850, cladding 830 and core 840 are disposed above a substrate 801. The arm 850 as depicted extending under the cladding 830 and the core 840. Next, in second cross-sectional image 800C representing cross-section Y-Y the cladding 830 and core 840 are upon a beam 805 formed from the same mechanical layer of the device as that of the arm 850 and MEMS 860. Also depicted are the moving element 860A and fixed element 860B of the MEMS 860. The fixed element 860B being attached to the substrate via layer 890. For ease of depiction second cross-sectional image 800C depicts only one repeat of the moving element 860A/fixed element 860B of the MEMS 860 whereas in plan image 800A in FIG. 8A the MEMS 860 is depicted with a pair of moving elements 860A and pair of fixed elements 860B. Third cross-sectional image 800D representing cross-section Z-Z denotes a cross-section through output non-suspended portion 880B and anchor 810. Accordingly, the anchor 810 is mechanically coupled to the substrate 801 via layer 890 as is the output non-suspended portion 880B comprising waveguide anchor 820, cladding 830 and core 840.

Optionally, the fixed element 860B may also be suspended and connected to anchor 810 rather than being attached to the substrate via layer 890.

Within the embodiment of the invention described and depicted in FIG. 8A and as will be described and depicted with respect to FIGS. 8B to 38 respectively then the material system depicted is:

silicon nitride for the core 840;

silicon oxide ($SiO_2$) for the cladding 830;

silicon for the beam 850, moving elements 860A, fixed elements 860B, waveguide anchors 820 and anchors 810; and silicon dioxide for the layer 890.

However, it would be evident that other waveguide material systems may be employed in conjunction with silicon based MEMS or other MEMS material systems. For example, the optical waveguide comprising core 840 and cladding 830 may be a core 840 embedded within cladding 830. Optionally, the beam 805 may be omitted within other embodiments of the invention. Optionally, the beam 805 may be formed from an additional layer disposed atop the mechanical material for the beam 850, moving elements 860A, fixed elements 860B, waveguide anchors 820 and anchors 810. It would be evident other materials may be employed for layer 890.

Figure 9A:
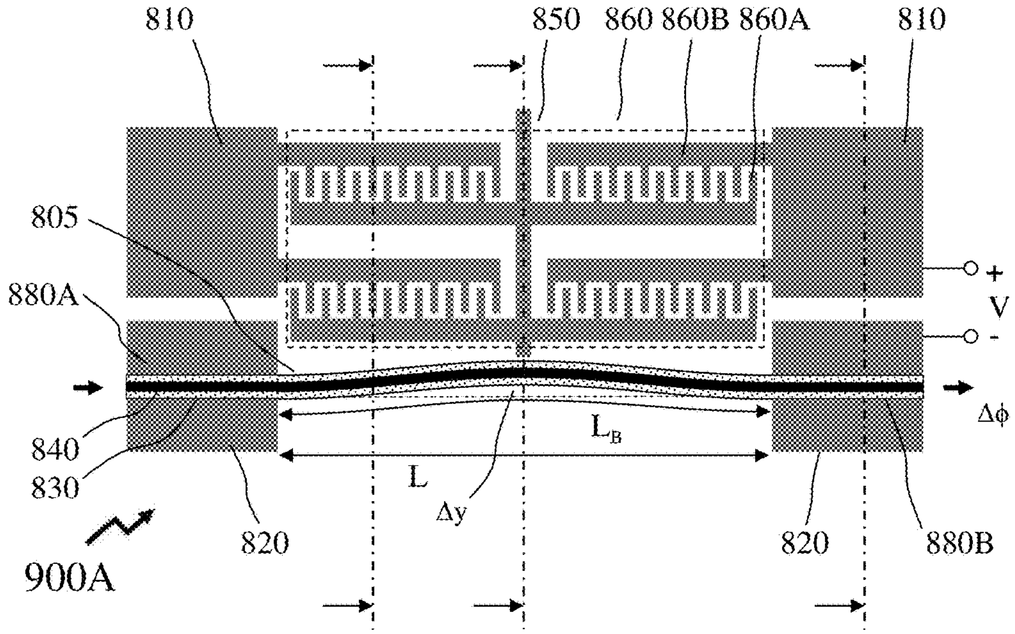
FIGS. 9A and 9B depict the electrostatic MEMS actuated phased shifted according to the embodiment of the invention depicted in FIGS. 8A and 8B in a deflected state.
Figure 9B:
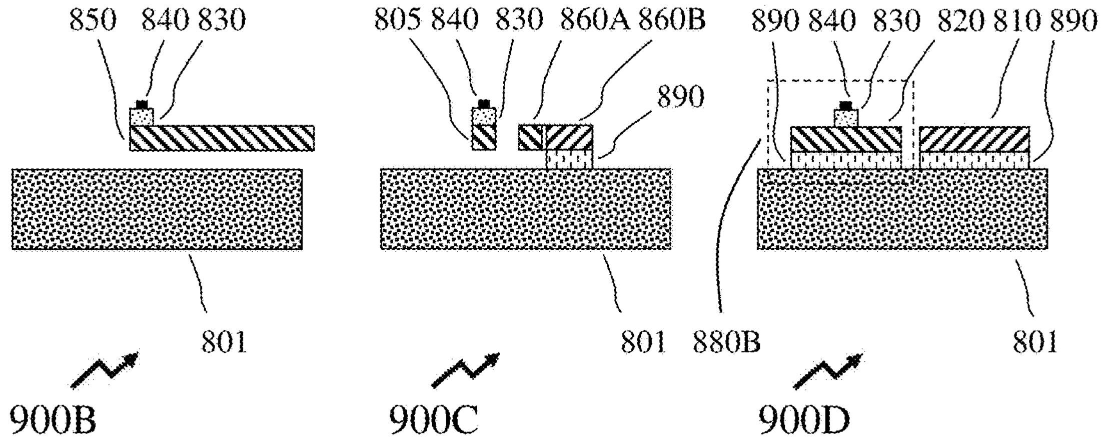

Now referring to FIGS. 9A and 9B there are depicted a plan image 900A and first to third cross-sectional images 900B to 900D respectively of a MEMS actuated phase shifter according to an embodiment of the invention in a deflected state. Accordingly, considering initially plan image 900A the optical waveguide comprising the input non-suspended portion 880A upon waveguide anchor 820 is coupled to the output non-suspended portion 880B upon the waveguide anchor 820 via the suspended waveguide comprising cladding 830 and core 840. Coupled to the cladding 830 is arm 850 of the MEMS comb actuator 860 which comprises moving elements 860A and fixed elements 860B wherein electrostatic attraction/repulsion by application of potential difference between the moving elements 860A and fixed elements 860B has resulted in movement of the moving elements 860A relative to the fixed elements 860B and therein motion of the arm 850 which is mechanically connected to the moving elements 860A. The fixed elements 860B of the MEMS 860 being mechanically connected to anchors 810. Accordingly, motion of the arm 850 results in distortion of the suspended waveguide comprising cladding 830 and core 840 by a defection Δy resulting over a portion of length $L_B$ of the optical waveguide where the overall separation between the anchors 820 is L.

Referring to first to third cross-sectional images 900B to 900D respectively these depict cross-sections X-X, Y-Y and Z-Z through the IO-MEMS device according to an embodiment of the invention as depicted in plan image 900A. Accordingly, first cross-sectional image 900B representing cross-section X-X is through the IO-MEMS device where the arm 850 joins the cladding 830. As evident in first cross-section image 900B the arm 850, cladding 830 and core 840 are disposed above the substrate 801 and have been displaced relative to the non-deflected state depicted in second cross-section 800B of FIG. 8B by movement of the arm 850 which is depicted extending under the cladding 830 and the core 840. Next, in second cross-sectional image 900C representing cross-section Y-Y the cladding 830 and core 840 are upon the beam 805 formed from the same mechanical layer of the device as that of the arm 850 and MEMS 860. Also depicted are the moving element 860A and fixed element 860B of the MEMS 860. The fixed element 860B being attached to the substrate via layer 890. The cladding 830 and core 840 upon the beam 805 have been displaced by actuation of the MEMS 860 as evident by the movement of the moving elements 860A relative to the fixed elements 860B. Third cross-sectional image 900D representing cross-section Z-Z denotes a cross-section through output non-suspended portion 880B and anchor 810 wherein the anchor 810 is mechanically coupled to the substrate 801 via layer 890 as is the output non-suspended portion 880B comprising waveguide anchor 820, cladding 830 and core 840.

Optionally, the fixed element 860B may also be suspended and connected to anchor 810 rather than being attached to the substrate via layer 890.

Accordingly, actuation of the MEMS 860 as depicted in FIGS. 9A and 9B relative to FIGS. 8A and 8B results in deformation of the cladding 830, core 840 and beam 805 and thereby $L_B$>L. Accordingly, the resulting change in length of the optical waveguide comprising cladding 830 and core 840 is $\Delta L = L_B - L$ which results in a phase shift for an optical signal of Δϕ as given by Equation (2) where $n_{eff}$ is the effective index of the optical waveguide and λ is the wavelength in vacuum of the optical signal within the optical waveguide.

$$\Delta\phi = (2\pi n_{eff}\Delta L/\lambda) \quad (2)$$

The beam displacement Δy, i.e. deflection of the optical waveguide at the center of the MEMS phase shifter as depicted in FIGS. 8A to 9B respectively is given by Equation (3) where F is the force of the electrostatic actuator and k is the spring stiffness of the beam (for example beam 805, cladding 830 and core 840 as depicted in FIGS. 8A to 9B respectively). The stiffness for a fixed-fixed beam (i.e. anchored at either end) for a point force at the center of the beam is given by Equation (4A) whilst for a distributed force the stiffness is given by Equation (4B). In each of Equations (4A) and (4B) E is the Young's modulus of the beam, I the beam's second moment of inertia and L the length of the beam. Accordingly, as evident from Equation (3) the displacement is proportional to the applied force and inversely proportional to the stiffness of the beam.

For a comb electrostatic actuator the force per unit length of the comb is given by Equation (5) whilst for a parallel plate electrostatic actuator the force per unit length of the parallel plates is given by Equation (6) where $\varepsilon_0$ is the vacuum permittivity, $\varepsilon_r$ the relative permittivity, U the applied voltage, h the height of the conductive part of the actuator, m the width of an actuator finger, g the gap between fingers and H the gap between parallel plates.

$$\Delta y = F/k \quad (3)$$

$$k = (192 \cdot E \cdot I)/(L^3) \quad (4A)$$

-continued $$k=(384\cdot E\cdot I)/(L^3) \quad (4B)$$

$$f_C=\frac{\varepsilon_0\varepsilon_r U^2 h}{2(m+g)g} \quad (5)$$

$$f_P=\frac{\varepsilon_0\varepsilon_r U^2 h}{2H^2} \quad (6)$$

$$y(x)=\Delta y\frac{4}{L^3}(-4x^3+3Lx^2)\text{ for }0\le x\le(L/2) \quad (7)$$

$$y(x)=\Delta y\frac{16}{L^4}(x^4-2Lx^3+L^2x^2)\text{ for }0\le x\le L \quad (8)$$

If we now consider the beam deflection for a point force then we obtain Equation (7) whilst for a distributed force we obtain the deflection given by Equation (8). In order to establish the length of the deformed beam either an exact length can be calculated or a simplified model employed based upon several approximations. The exact length is given by Equations (9) to (11) whereas the simplified model is given by Equations (12) to (16) wherein the beam is simplified to two straight lines each from the mid-point of the beam to its fixed end and the displacement is small.

$$L_B=L\int_0^1\sqrt{[Y'(X)]^2+1}\,dX \quad (9)$$

$$Y(X)=\frac{y(LX)}{L} \quad (10)$$

$$\Delta L=L\left(\int_0^1\sqrt{[Y'(X)]^2+1}\,dX-1\right) \quad (11)$$

$$\left(\frac{L_B}{2}\right)^2=\left(\frac{L}{2}\right)^2+(\Delta y)^2 \quad (12)$$

$$\Delta y=\frac{\sqrt{\Delta L(2L+\Delta L)}}{2} \quad (13)$$

$$\Delta L=\sqrt{(L^2)+(2\Delta y)^2}-L \quad (14)$$

-continued $$\Delta y\cong\sqrt{\frac{L\cdot\Delta L}{2}} \quad (15)$$

$$\Delta L\cong\frac{2(\Delta y)^2}{L} \quad (16)$$

Accordingly, referring to Table 1 there are presented the design and material parameters employed in performing the design simulations presented in Tables 2A to 2C respectively, for a phase shift of 7 (leading to a length increase of 0.530 μm). Accordingly, it is evident that with increasing beam length increasing beam displacement occurs at lower force such that a design tradeoff between force of the MEMS actuator, length of beam and maximum induced phase shift at maximum deflection exists.

TABLE 1

Simulation Mechanical and Material Parameters

| Parameter | Value | Unit |
|---|---|---|
| Optical Frequency | 187.65 | THz |
| Optical Wavelength | 1597.62 | nm |
| Effective Refractive Index | 1.5085 | |
| Beam Configuration | Fixed-Fixed Point Force at Center | |
| Beam Width (w) | 7.25 | μm |
| Beam Height ($h_{Si}$) | 59 | μm |
| Beam Height ($h_{SiO2}$) | 6.8 | μm |
| Youngs Modulus (Si) | 169 | GPa |
| Youngs Modulus ($SiO_2$) | 70 | GPa |
| Voltage applied | 170 | V |
| Gap between fingers (comb drive actuator) | 4 | μm |
| Finger width (comb drive actuator) | 4 | μm |
| Stopper to fixed plate distance (parallel plate actuator) | 2 | μm |
| Relative permittivity ($\varepsilon_r$) | 1 | |

TABLE 2A

Simulated Results for Beam Lengths 200 μm to 800 μm

| Beam Length (L) μm | 200 | 400 | 600 | 800 |
|---|---|---|---|---|
| Beam Displacement (Δy) μm | 6.64918 | 9.39892 | 11.5095 | 13.2889 |
| Force (F) mN | 52.94240 | 9.35457 | 3.39412 | 1.65328 |
| Comb Drive Length ($L_{COMB}$) μm | 224432 | 39655.7 | 14388.3 | 7008.54 |
| Parallel Plate Length ($L_p$) μm | 101109 | 28931.1 | 14269.7 | 8726.02 |

TABLE 2B

Simulated Results for Beam Lengths 1000 μm to 1600 μm

| Beam Length (L) μm | 1000 | 1200 | 1400 | 1600 |
|---|---|---|---|---|
| Beam Displacement (Δy) μm | 14.8568 | 16.2743 | 17.5778 | 18.7912 |
| Force (F) mN | 0.94635 | 0.59997 | 0.40804 | 0.29222 |
| Comb Drive Length ($L_{COMB}$) μm | 4011.73 | 2543.11 | 1729.77 | 1238.8 |
| Parallel Plate Length ($L_p$) μm | 5987.95 | 4415.0 | 3418.72 | 2743.03 |

TABLE 2C

Simulated Results for Beam Lengths 1800 μm and 2000 μm

| Beam Length (L) μm | 1800 | 2000 |
|---|---|---|
| Beam Displacement (Δy) μm | 19.9308 | 21.0087 |
| Force (F) mN | 0.21769 | 0.16723 |
| Comb Drive Length ($L_{COMB}$) μm | 922.81 | 709.11 |
| Parallel Plate Length ($L_p$) μm | 2260.99 | 1903.44 |

Figure 9C:
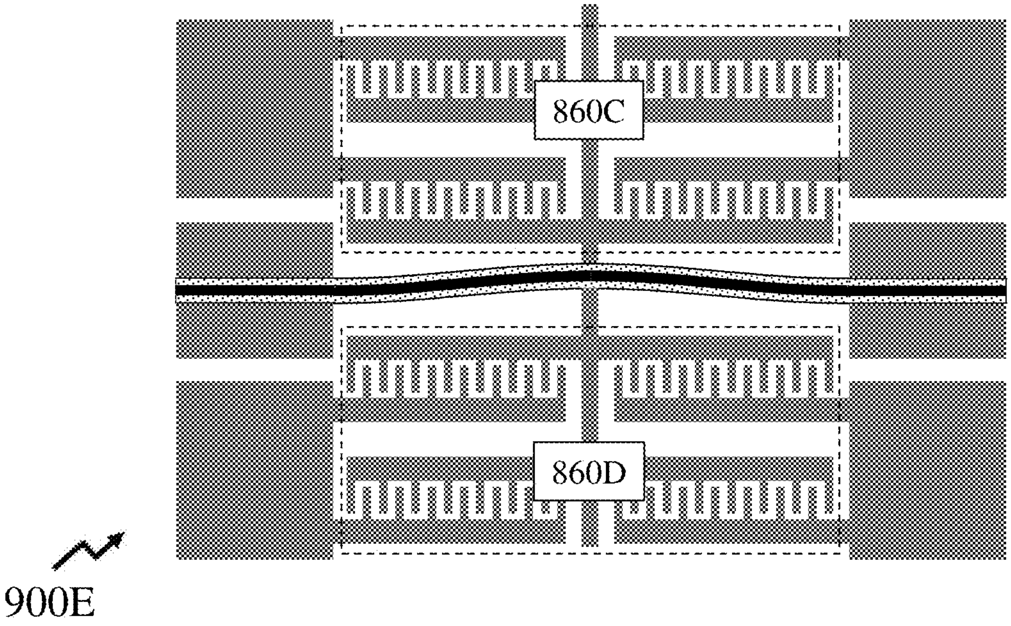
FIGS. 9C and 9D depict the electrostatic MEMS actuated phased shifters according to the embodiment of the invention.
Figure 9D:
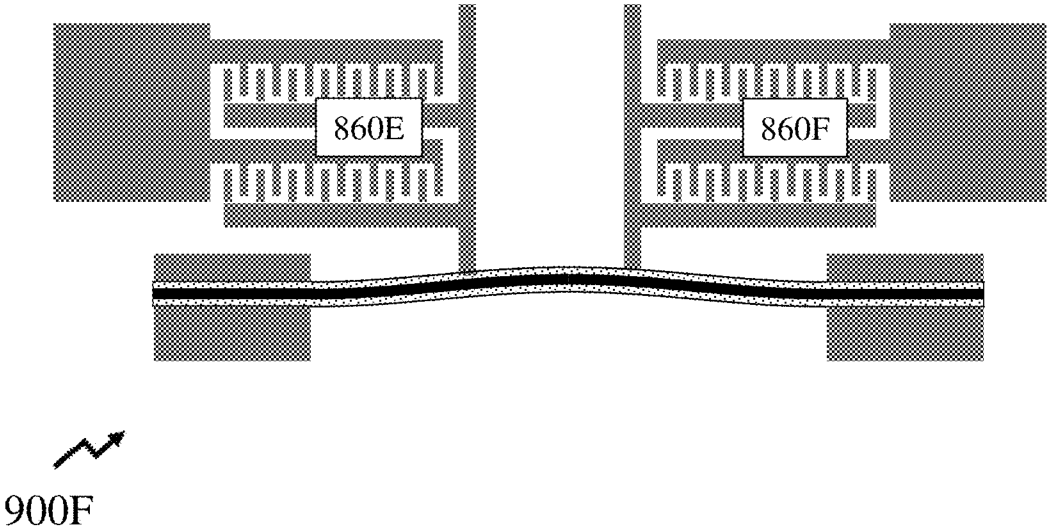

FIGS. 9C and 9D depict MEMS actuated phased shifters according to embodiments of the invention. Within FIG. 9C in schematic 900E first and second MEMS actuators 860C and 860D are depicted disposed on either side of the suspended waveguide portion. In FIG. 9D in schematic 900F first and second MEMS actuators 860E and 860F are depicted disposed on the same side of the suspended waveguide portion but at different locations along its length. It would be evident that within other embodiments multiple actuators may be employed along the length of a suspended waveguide portion to generate a serpentine effect increasing the overall induced phase shift over a longer distance but with reduced displacement.

Figure 10:
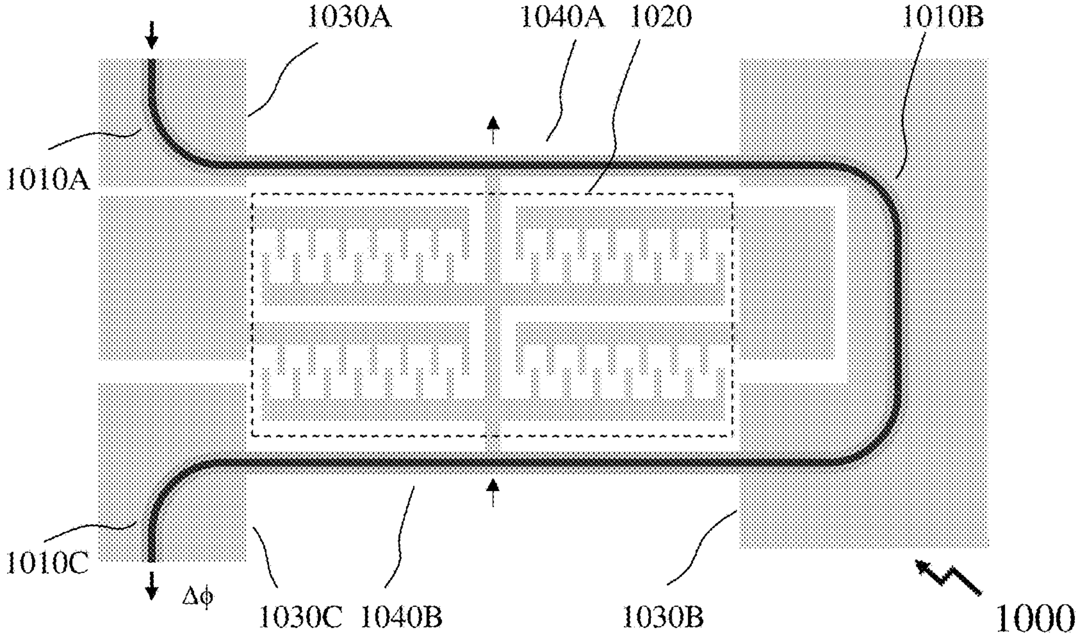
FIG. 10 depicts an electrostatic MEMS actuated phase shifter according to an embodiment of the invention.

FIG. 10 depicts a MEMS actuated phase shifter 1000 according to an embodiment of the invention wherein a MEMS actuator 1020 engages first and second suspended waveguides 1040A and 1040B on either side of the MEMS actuator 1020. The first suspended waveguide 1040A extending from an input waveguide 1010A upon a first non-suspended element (first anchor 1030A) to a first end of waveguide portion 1010B upon a second non-suspended element (second anchor 1030B). The second suspended waveguide 1040B extending from a second end of waveguide portion 1010B upon the second non-suspended element (second anchor 1030B) to an output waveguide 1010C upon a third non-suspended element (third anchor 1030C).

Figure 11:
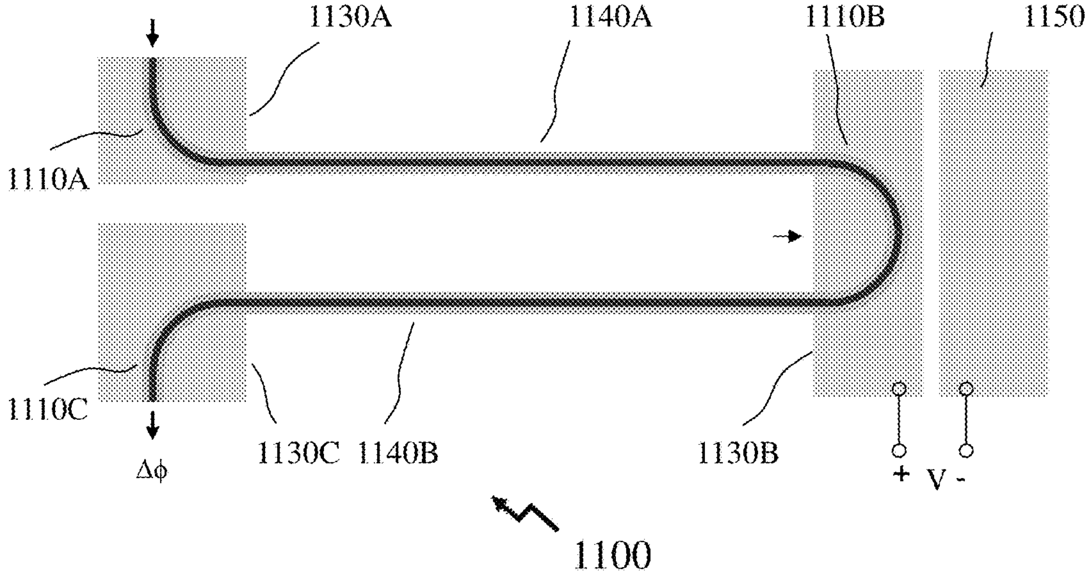
FIG. 11 depicts an electrostatic MEMS actuated phase shifter according to an embodiment of the invention.

FIG. 11 depicts a MEMS actuated phase shifter 1100 according to an embodiment of the invention. As depicted an electrostatic MEMS actuator 1150 engages a suspended platform 1130B which is coupled to first and second suspended waveguides 1140A and 1140B. The first suspended waveguide 1140A extending from an input waveguide 1110A upon a first non-suspended element (first anchor 1130A) to a first end of waveguide portion 1110B upon the suspended platform 1130B. The second suspended waveguide 1140B extending from a second end of waveguide portion 1110B upon the suspended platform 1130B to an output waveguide 1110C upon a second non-suspended element (second anchor 1130C). Accordingly, motion of the suspended platform 1130B under action of the electrostatic MEMS actuator 1150 applies a force axially along the length of the first and second suspended waveguides 1140A and 1140B thereby increasing or decreasing their length according to the motion of the suspended platform 1130B and therein inducing an optical phase shift on the optical signals propagating from the input waveguide 1110A to the output waveguide 1110C. It would be evident that the MEMS actuated phase shifter 1100 may be combined with other embodiments of the invention such as MEMS actuated phase shifter 1000 for example.

Figure 12:
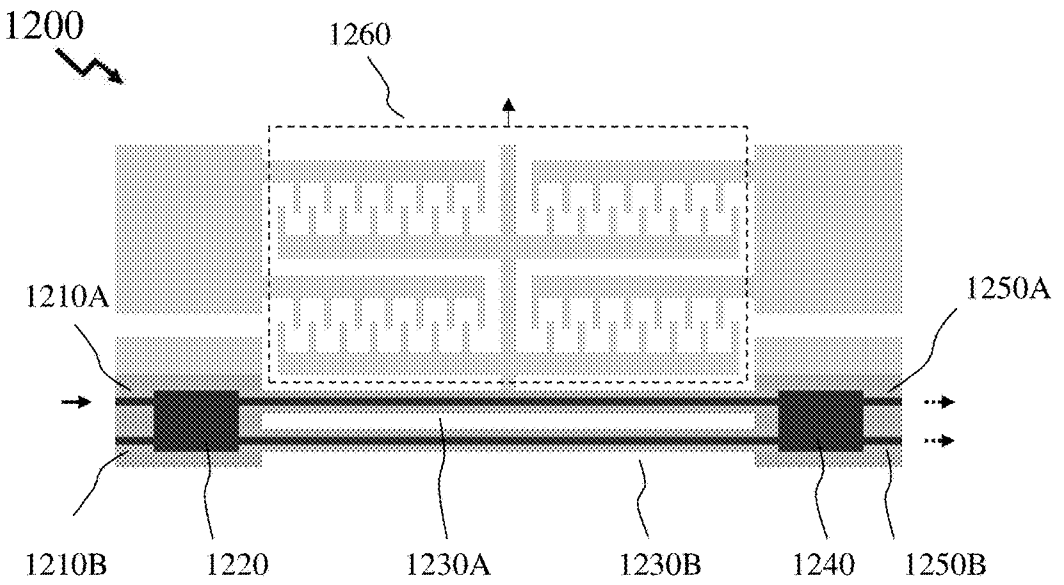
FIG. 12 depicts a Mach-Zehnder based interferometer/optical switch exploiting an electrostatic MEMS actuated phase shifter according to an embodiment of the invention.

Referring to FIG. 12 there is depicted a 2×2 Mach-Zehnder interferometer (MZI) 1200 exploiting a MEMS actuated phase shifter according to an embodiment of the invention. As depicted at an input of the 2×2 MZI 1200, an input 2×2 coupler 1220 couples optical signals from first and second input waveguides 1210A and 1210B to the third and fourth waveguides 1230A and 1230B upon parallel suspended waveguide portions. These then couple to output 2×2 coupler 1240 and therein to first and second output waveguides 1250A and 1250B. Where the input 2×2 coupler 1220 and output 2×2 coupler 1240 are 3 dB couplers (e.g. directional couplers or MMIs) then optical signals coupled into the first input waveguide 1210A are coupled to the first and second output waveguides 1250A and 1250B in dependence upon the phase shift between the pair of parallel third and fourth waveguides 1230A and 1230B respectively. Accordingly, the 2×2 MZI 1200 can function as a switch routing the optical signals coupled into the first input waveguide 1210A to either the first output waveguide 1250A or the second output waveguide 1250B with the inverse action for optical signals on the second input waveguide 1210B. The phase shift between the third and fourth waveguides 1230A and 1230B being induced by MEMS actuator 1260. It would be evident that the input 2×2 coupler 1220 can be replaced with a 1×2 coupler and/or the output 2×2 coupler 1240 can be replaced with a 2×1 coupler.

Figure 13:
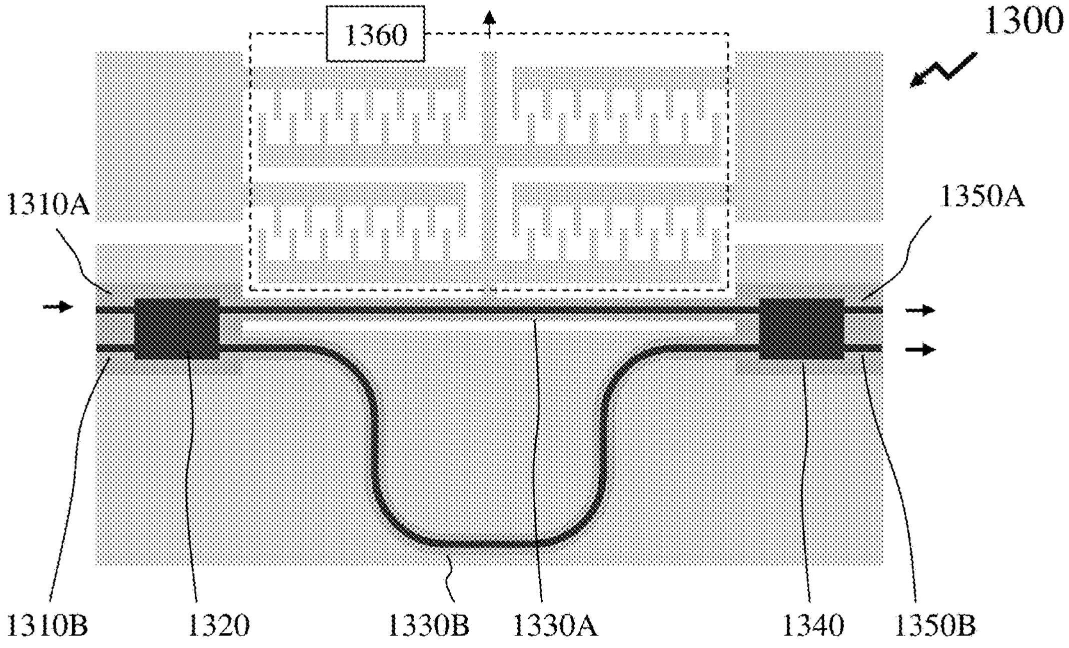
FIG. 13 depicts a Mach-Zehnder based interferometer optical switch exploiting an electrostatic MEMS actuated phase shifter according to an embodiment of the invention.

Referring to FIG. 13 there is depicted a 2×2 Mach-Zehnder interferometer (MZI) 1300 exploiting a MEMS actuated phase shifter according to an embodiment of the invention. As depicted at an input of the 2×2 MZI 1300, an input 2×2 coupler 1320 couples optical signals from first and second input waveguides 1310A and 1310B to the second and third waveguides 1330A and 1330B which are upon suspended waveguide portion 1330A and non-suspended waveguide portion 1330B respectively. These then couple to output 2×2 coupler 1340 and therein to first and second output waveguides 1350A and 1350B. Where the input 2×2 coupler 1320 and output 2×2 coupler 1340 are 3 dB couplers (e.g. directional couplers or MMIs) then optical signals coupled into the first input waveguide 1310A are coupled to the first and second output waveguides 1350A and 1350B in dependence upon the phase shift between the pair of parallel second and third waveguides 1330A and 1330B respectively. Accordingly, the 2×2 MZI 1300 can function as a switch routing the optical signals coupled into the first input waveguide 1310A to either the first output waveguide 1350A or the second output waveguide 1350B with the inverse action for optical signals on the second input waveguide 1310B. The phase shift between the second and third waveguides 1330A and 1330B being induced by MEMS actuator 1360. It would be evident that the input 2×2 coupler 1320 can be replaced with a 1×2 coupler and/or the output 2×2 coupler 1340 can be replaced with a 2×1 coupler. In contrast to 2×2 MZI 1200 in FIG. 12 only one arm of the MZI is upon a suspended waveguide portion.

FIG. 12 depicts a balanced MZI and FIG. 13 depicts an unbalanced MZI. These MZI devices may be employed as an optical switch, amplitude modulator or tunable optical filter. Further, the phase shifter may be employed discretely as an optical phase shifter or time delay in systems.

Figure 14:
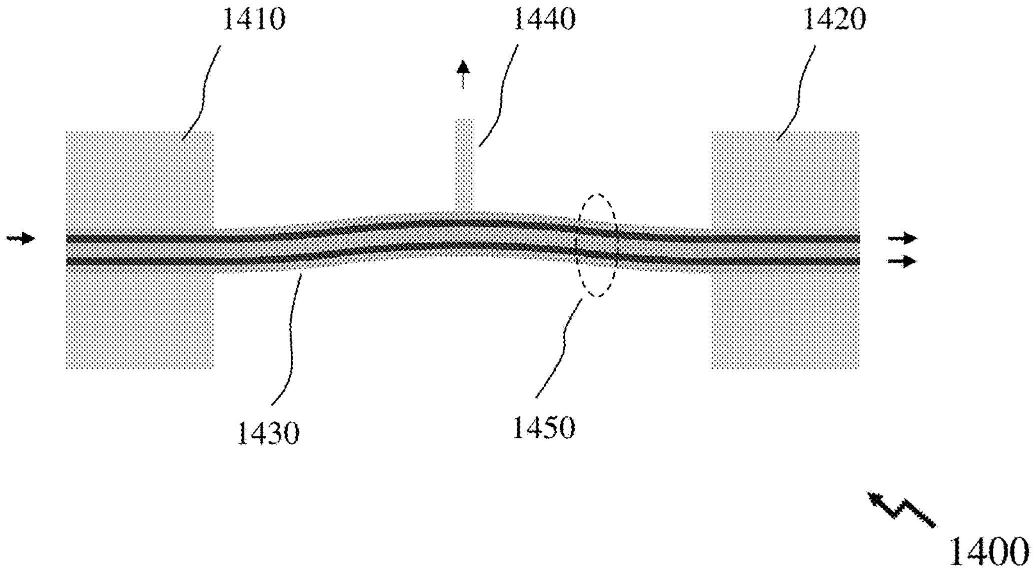
FIG. 14 depicts a MEMS actuated tunable directional coupler according to an embodiment of the invention.

Now referring to FIG. 14 there is depicted a MEMS actuated tunable directional coupler 1400 according to an embodiment of the invention. Accordingly, a pair of waveguides 1450 run along a suspended waveguide portion 1430 from a first anchor 1410 to a second anchor 1420. The suspended waveguide portion 1430 being coupled to a MEMS actuator (not depicted for clarity) via an arm 1440. Accordingly, as the suspended waveguide portion 1430 is deflected by the MEMS actuator via the arm 1440 then the waveguide spacing of the pair of waveguides 1450 is varied resulting in an adjustment in the coupling of optical signals between the pair of waveguides 1450. As the coupling strength between a pair of waveguides is exponentially dependent upon the distance between the waveguides then small adjustments in effective spacing can result in significant adjustments of coupling.

Within other embodiments of the invention the second anchor 1420 may be moved under action of a MEMS actuator (not depicted for clarity) so that the suspended waveguide portion is stretched/compressed rather than being "bent." It would be evident to one of skill in the art that whilst the above description describes the coupling between the optical waveguides as being dependent upon the gap between the waveguides that the coupling is dependent upon other factors including, but not limited to, changes in optical mode through refractive index changes, e.g. stress induced, the optical mode within the waveguide, which is different between a straight waveguide and a curved or "bent" waveguide, and the length over which the optical waveguides are coupled.

Figure 15:
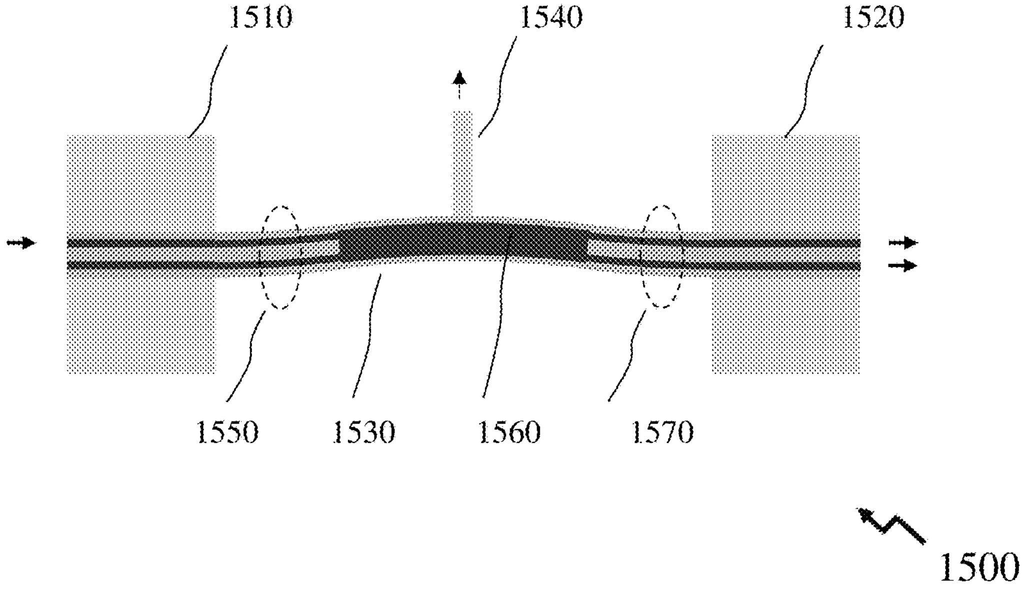
FIG. 15 depicts a MEMS actuated tunable multimode interferometer according to an embodiment of the invention.

Now referring to FIG. 15 there is depicted a MEMS actuated tunable MMI 1500 according to an embodiment of the invention. Accordingly, a pair of input waveguides 1550 run along a suspended waveguide portion 1530 from a first anchor 1510 to an MMI 1560 formed upon the suspended waveguide portion 1530. From the MMI 1560 a pair of output waveguides 1570 run along the suspended waveguide portion 1530 to a second anchor 1520. The suspended waveguide portion 1530 being coupled to a MEMS actuator (not depicted for clarity) via an arm 1540. Accordingly, as the suspended waveguide portion 1530 is deflected by the MEMS actuator via the arm 1540 then the properties of the MMI 1560 are adjusted, (e.g. splitting ratio, phase shift, beam imaging etc.) so that the result is coupling of the optical signals upon the pair of input waveguides 1550 to the pair of output waveguides 1570 is varied in dependence upon the deflection induced by the MEMS actuator. Within other embodiments of the invention the number of input waveguides 1550 and number of output waveguides 1570 may be varied. In each instance, the number may be 1,2,3, . . . etc. For example, a single input waveguide 1550 may couple to 3 output waveguides 1570 via the MMI 1560

Optionally, the second anchor 1520 may be moved under action of a MEMS actuator (not depicted for clarity) so that the suspended waveguide portion is stretched/compressed rather than being "bent." Optionally, within other embodiments of the invention multiple MMIs may be implemented upon the suspended waveguide portion with each MMI acting upon different subsets of the plurality of optical waveguides upon the suspended waveguide portion 1530.

Figure 16:
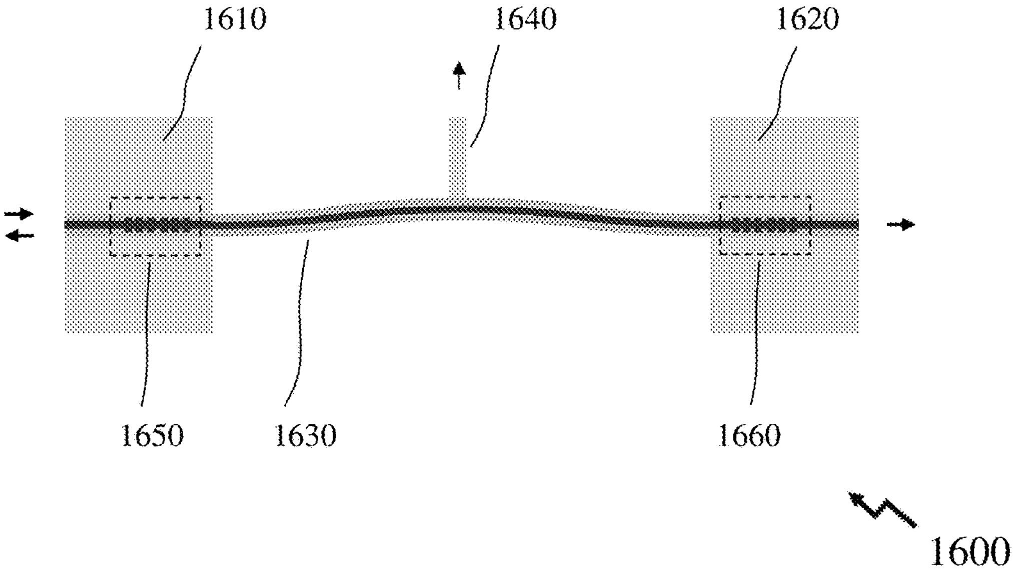
FIG. 16 depicts a MEMS actuated tunable resonator according to an embodiment of the invention.

Referring to FIG. 16 there is depicted a MEMS actuated tunable resonator 1600 according to an embodiment of the invention wherein a suspended waveguide portion 1630 is disposed between a first grating 1650 upon a first anchor 1610 and a second grating 1660 upon a second anchor 1620. The suspended waveguide portion 1630 being coupled via an arm 1640 a MEMS actuator (not shown for clarity). Accordingly, the first grating 1650 and second grating 1660 provide a Fabry-Perot cavity for optical signals propagating within the waveguide upon the suspended waveguide portion 1630 wherein the wavelength performance of the Fabry-Perot cavity is determined by the phase shift of optical signals propagating within the Fabry-Perot cavity. Accordingly, deflection of the suspended waveguide portion 1630 under actuation of the MEMS actuator via arm 1640 results in this phase shift being varied and accordingly the optical properties of the Fabry-Perot cavity varying, e.g. transmission wavelength of signal(s) passed, reflection wavelength of signal(s) reflected.

Figure 17:
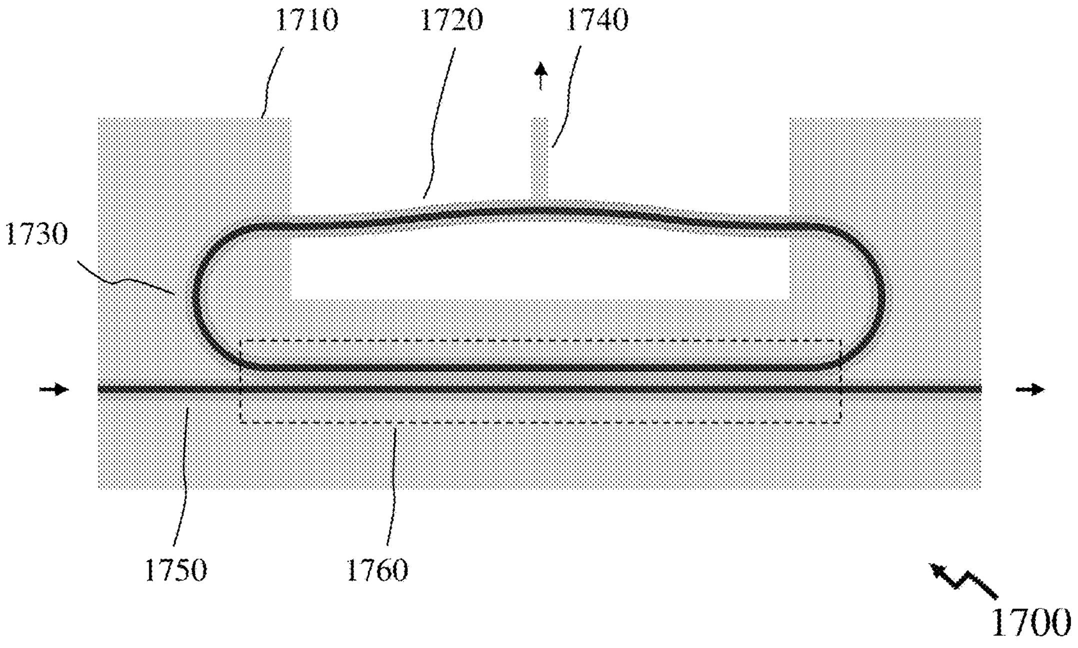
FIG. 17 depicts a MEMS actuated tunable ring resonator according to an embodiment of the invention.

Now referring to FIG. 17 there is depicted a MEMS actuated tunable ring resonator 1700 according to an embodiment of the invention. As depicted a first waveguide 1750 couples to a second waveguide 1730 in a coupling region 1760 upon a non-suspended portion 1710. The second waveguide 1730 being a ring waveguide such that optical signals coupled into it at the end of the coupler region 1760 are coupled back to the start of the coupler region 1760. Such a ring resonator 1700 can provide a high finesse and hence very narrow wavelength passband(s). The characteristics of the ring resonator 1700 are determined in part by the phase shift within the second waveguide 1730 so that, for example, the central wavelength of the ring resonator can be varied by adjusting the phase of the optical signals propagating within the second waveguide. Accordingly, as depicted a portion of the second waveguide 1730 is a suspended waveguide portion 1720 coupled to a MEMS actuator (not shown for clarity) via an arm 1740. Accordingly, the ring resonator 1700 can be tuned through deflection of the suspended waveguide portion 1720 by the MEMS actuator.

Figure 18:
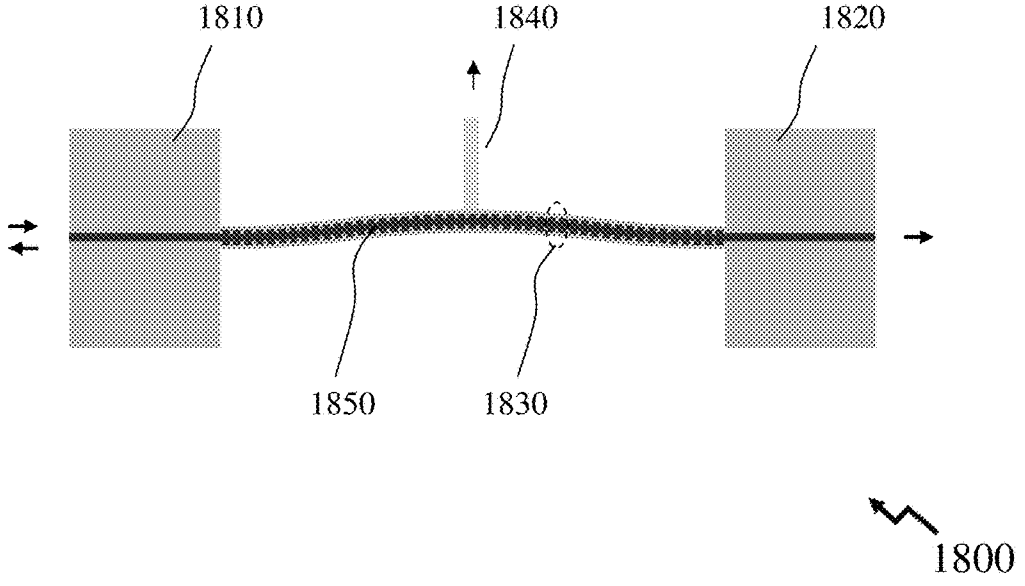
FIG. 18 depicts a MEMS actuated tunable Bragg grating element according to an embodiment of the invention.

Referring to FIG. 18 there is depicted a MEMS actuated tunable Bragg grating element 1800 according to an embodiment of the invention. As depicted a grating 1850 within a waveguide upon a suspended waveguide portion 1830 is coupled to input and output waveguides upon input and output anchors 1810 and 1820 respectively. The suspended waveguide portion 1830 being coupled to a MEMS actuator (not shown for clarity) via an arm 1840. Accordingly, deflection of the suspended waveguide portion 1830 results in adjustment of the grating period of the grating 1850 such that the optical properties of the grating, e.g. passband, centre wavelength, etc. are adjusted in dependence upon the deflection induced within the suspended waveguide portion 1830 by the MEMS actuator.

Figure 19:
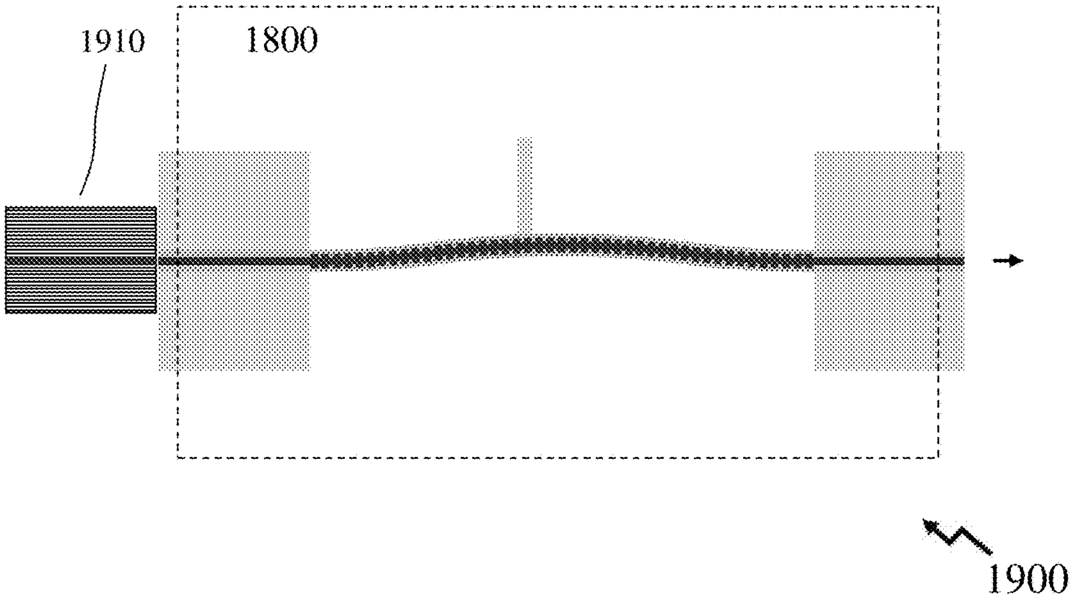
FIG. 19 depicts a MEMS actuated tunable external cavity laser according to an embodiment of the invention.

Referring to FIG. 19 there is depicted an example of using a MEMS actuated tunable Bragg grating element 1800 within an external cavity laser (ECL) 1900 according to an embodiment of the invention. As depicted the ECL 1900 couples a reflective semiconductor optical amplifier (SOA) 1910 to the MEMS actuated tunable Bragg grating element 1800 such that the MEMS actuated tunable Bragg grating element 1800 acts as a tunable filter for the resonant cavity with the other facet of the reflective SOA disposed away from the MEMS actuated tunable Bragg grating element 1800.

Figure 20:
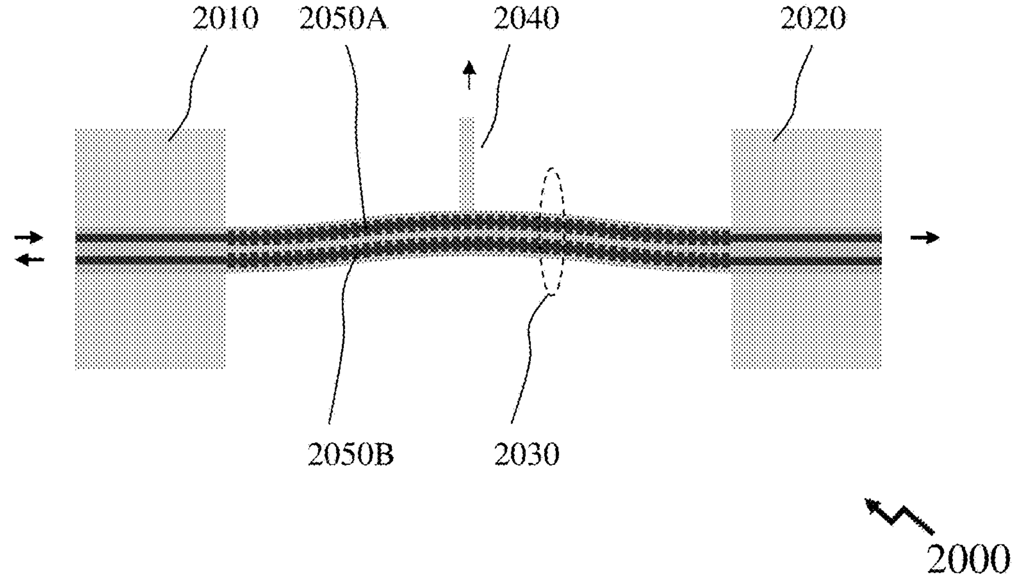
FIG. 20 depicts a MEMS actuated tunable contra-directional coupler according to an embodiment of the invention.

Now referring to FIG. 20 there is depicted a MEMS actuated tunable contra-directional coupler 2000 according to an embodiment of the invention. As depicted a pair of waveguides with gratings 2050A and 2050B run along a suspended waveguide portion 2030 between a pair of inputs upon a first non-suspended portion 2010 and a pair of outputs upon a second non-suspended portion 2020. Accordingly, the suspended waveguide portion 2030 is coupled to a MEMS actuator (not shown for clarity) via an arm 2040. In common with MEMS actuated tunable Bragg grating element 1800 the gratings 2050A and 2050B vary in optical characteristics as the suspended waveguide portion is deflected under action of the MEMS actuator so that the resulting reflected and transmitted optical signals from the MEMS actuated tunable contra-directional coupler 2000 vary in dependence upon the deflection of the suspended waveguide portion 2030.

Figure 21:
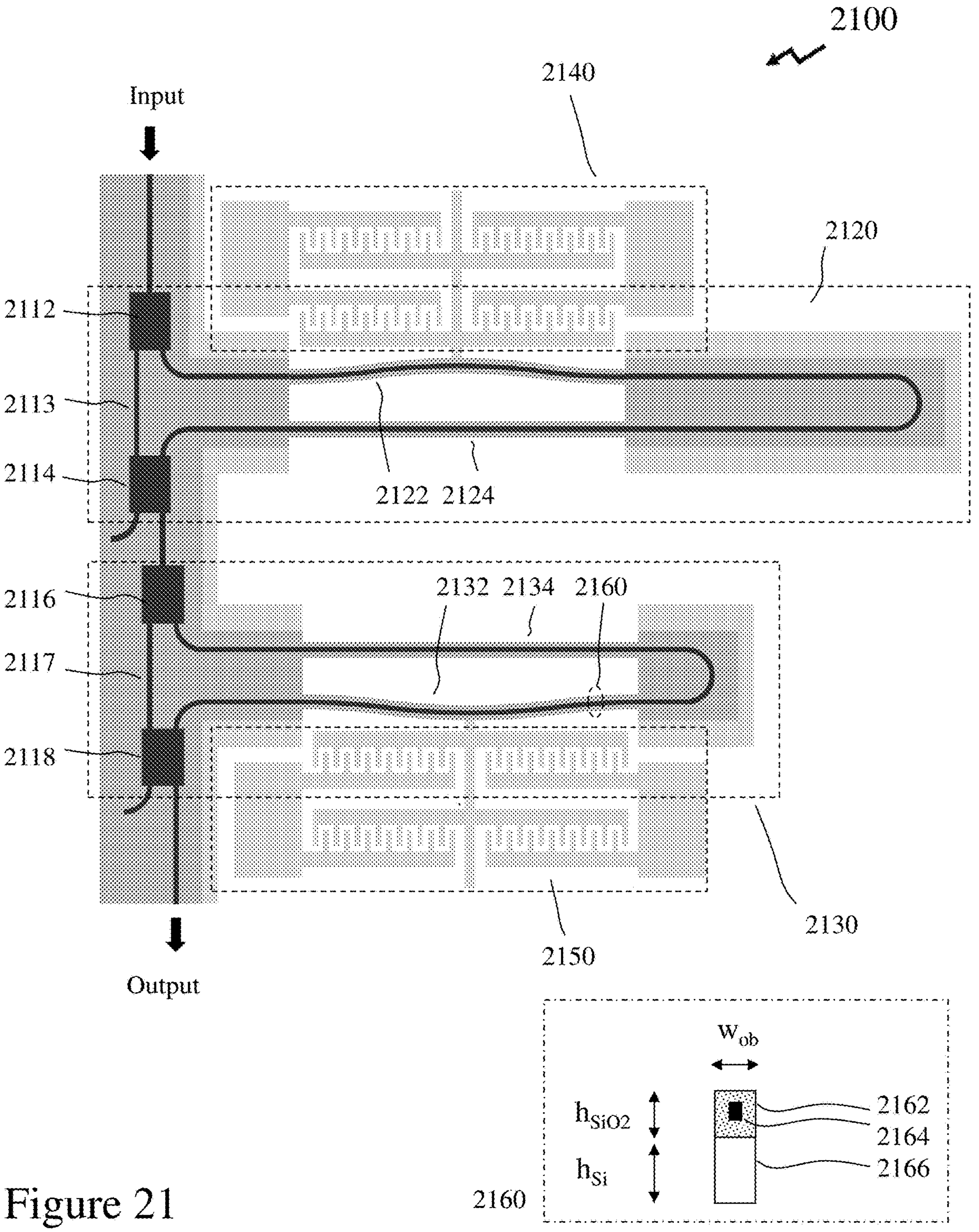
FIG. 21 depicts an electrostatic MEMS actuated tunable lattice filter according to an embodiment of the invention.

Referring to FIG. 21 there is depicted a MEMS actuated tunable lattice filter 2100 according to an embodiment of the invention. The MEMS actuated tunable lattice filter 2100 comprising a pair of MEMS actuated MZI wavelength filters, first MEMS MZI 2120 and second MEMS MZI 2130 according to an embodiment of the invention. As depicted first MEMS MZI 2120 comprises an input 1×2 coupler 2112, a first arm 2113, an output 2×2 coupler 2114 and a second arm employing suspended waveguide portions comprising a first movable portion 2122 and a second fixed portion 2124. The first movable portion 2122 being coupled to a first MEMS actuator 2140. Accordingly, the first movable portion 2122 of the second arm is a suspended waveguide portion such that the first MEMS actuator 2140 can deform the first movable portion 2122 yielding a phase shift in the optical signal propagating within the second arm relative to the first arm 2113.

Similarly, the second MEMS MZI 2130 comprises an input 1×2 coupler 2116, a first arm 2117, an output 2×2 coupler 2118 and a second arm employing suspended waveguide portions comprising a first movable portion 2132 and a second fixed portion 2134. The first movable portion 2132 being coupled to a second MEMS actuator 2150. Accordingly, the first movable portion 2132 of the second arm is a suspended waveguide portion such that the second MEMS actuator 2150 can deform the first movable portion 2132 yielding a phase shift in the optical signal propagating within the second arm relative to the first arm 2117. Insert 2160 depicts a cross-section through the suspended waveguide portion wherein the suspended waveguide portion comprises a waveguide core 2164 with cladding 2162 which are disposed atop a membrane 2166, such as silicon, which is attached at either end to non-suspended portions of the structure and the MEMS actuator.

Accordingly, in each of the first MEMS MZI 2120 and the second MEMS MZI 2130 adjustment of the phase shift between the second arm and the first arm between the input and output couplers can be adjusted by the respective MEMS actuator. As depicted the path length in the first MEMS MZI 2120 is longer than that of the second MEMS MZI 2130 such that the wavelength response of the first MEMS MZI 2120 and second MEMS MZI 2130 are different, e.g. the first MEMS MZI 2120 has a wavelength response half that of the second MEMS MZI 2130 such that first MEMS MZI 2120 may couple, for example, odd wavelengths (1,3, . . . ,N−1 where N is even) to the second MEMS MZI 2130 whilst the even wavelengths (2,4, . . . ,N) are coupled to another MEMS MZI which is not depicted for clarity but is coupled to the second output of the output 2×2 coupler. The second MEMS MZI 2130 then filters wavelengths 1, 5, . . . ,N−3, for example, to the output depicted whilst the other wavelengths 3, 7, . . . ,N−1 are routed to another port via the other output of the output 2×2 coupler of the second MEMS MZI 2130. Such an embodiment may be used in applications where the phase imbalance is set either once to remove manufacturing variations or periodically to reconfigure the device.

Whilst the first MEMS MZI 2120 and second MEMS MZI 2130 are depicted with a lateral MEMS actuator such as described and depicted with respect to FIG. 8A it would be evident that other configuration such as those described and depicted with respect to FIGS. 9C, 9D, and 10 may be employed or that alternative configurations such as described and depicted with respect to FIG. 11 may be employed.

Figure 22:
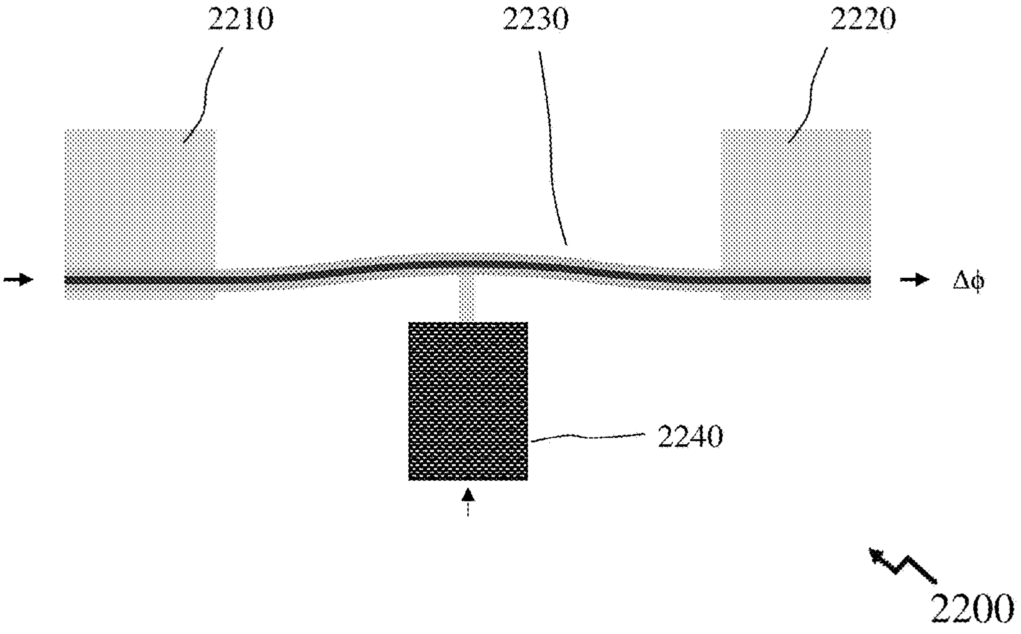
FIG. 22 depicts a depicts a MEMS actuated force/displacement sensor according to an embodiment of the invention.

Referring to FIG. 22 there is depicted a MEMS actuated force/displacement sensor 2200 according to an embodiment of the invention. As depicted a suspended waveguide portion 2230 is disposed between an input anchor 2210 and an output anchor 2220. A mass 2240 is coupled to the suspended waveguide portion 2230 via a beam. Accordingly, movement of the mass 2240 results in deflection of the suspended waveguide portion 2230 inducing an optical phase shift in the optical signals within the suspended waveguide portion 2230. Accordingly, where this MEMS actuated force/displacement sensor 2200 forms part of a phase detector, e.g. a MZI such as described and depicted in respect of FIGS. 12 and 13 respectively or resonators such as described and depicted in respect of FIGS. 16 and 17, then this motion can be detected. This motion may be used to determine a force applied to the mass 2240, a displacement of the mass 2240, etc.

Figure 23:
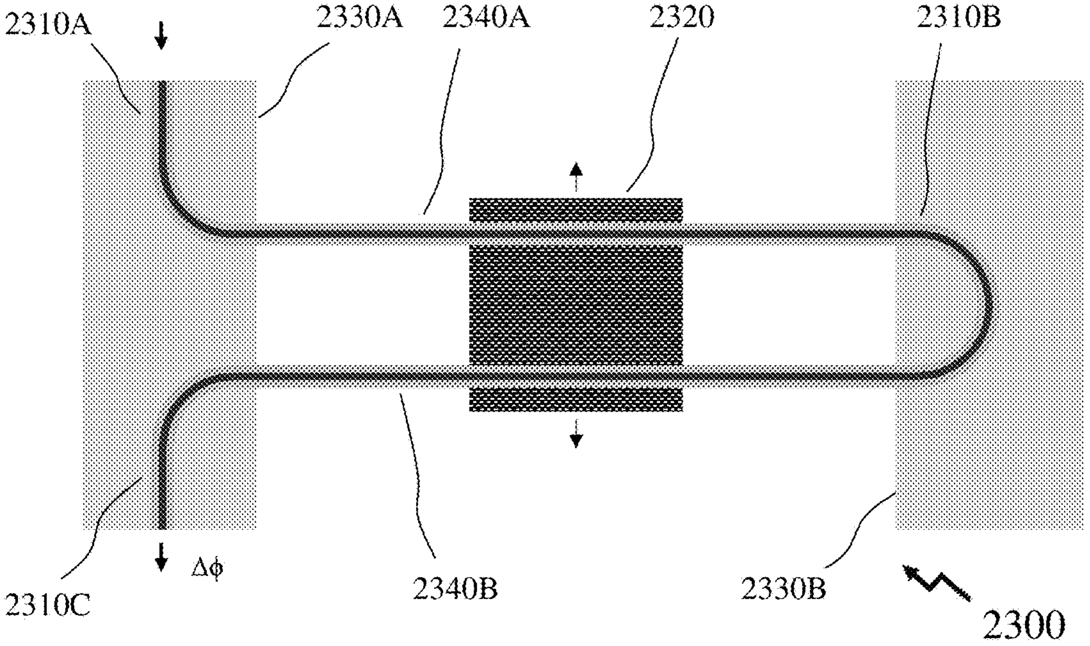
FIG. 23 depicts a MEMS actuated accelerometer according to an embodiment of the invention.

Now referring to FIG. 23 there is depicted a MEMS actuated accelerometer 2300 according to an embodiment of the invention. As depicted a first suspended waveguide portion 2340A is disposed between an input waveguide 2310A upon a first non-suspended portion 2330A and a waveguide 2310B upon a second non-suspended portion 2330B. A second suspended waveguide portion 2340B is disposed between an output waveguide 2310C upon the first non-suspended portion 2330A and the waveguide 2310B upon the second non-suspended portion 2330B. Each of the first and second suspended waveguide portions 2340A and 2340B being coupled to a proof mass 2320. Accordingly, movement of the proof mass 2320 results in deflection of the first and second suspended waveguide portions 2340A and 2340B inducing an optical phase shift in the optical signals within the first and second suspended waveguide portions 2340A and 2340B. Accordingly, where this MEMS actuated accelerometer 2300 forms part of a phase detector, e.g. a MZI such as described and depicted in respect of FIGS. 12 and 13 respectively or resonators such as described and depicted in respect of FIGS. 16 and 17, then this motion can be detected. Accordingly, movement of the proof mass 2320 can be used to determine a force applied to the proof mass 2320 and therein an acceleration applied to a system within which the MEMS actuated accelerometer 2300 is disposed.

It would be evident that two or more sensor elements such as described and depicted in respect of FIGS. 22 and 23 may be employed so that phase changes of more than 71 or 271 can be detected.

Figure 24:
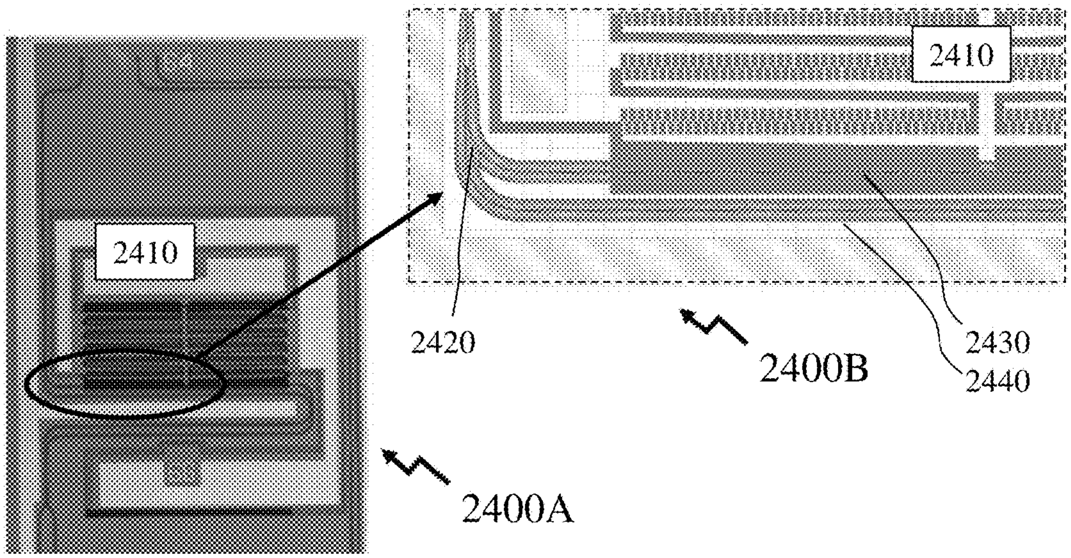
FIG. 24 depicts an optical photograph and design of a MEMS actuated Mach-Zehnder interferometer according to an embodiment of the invention.
Figure 25:
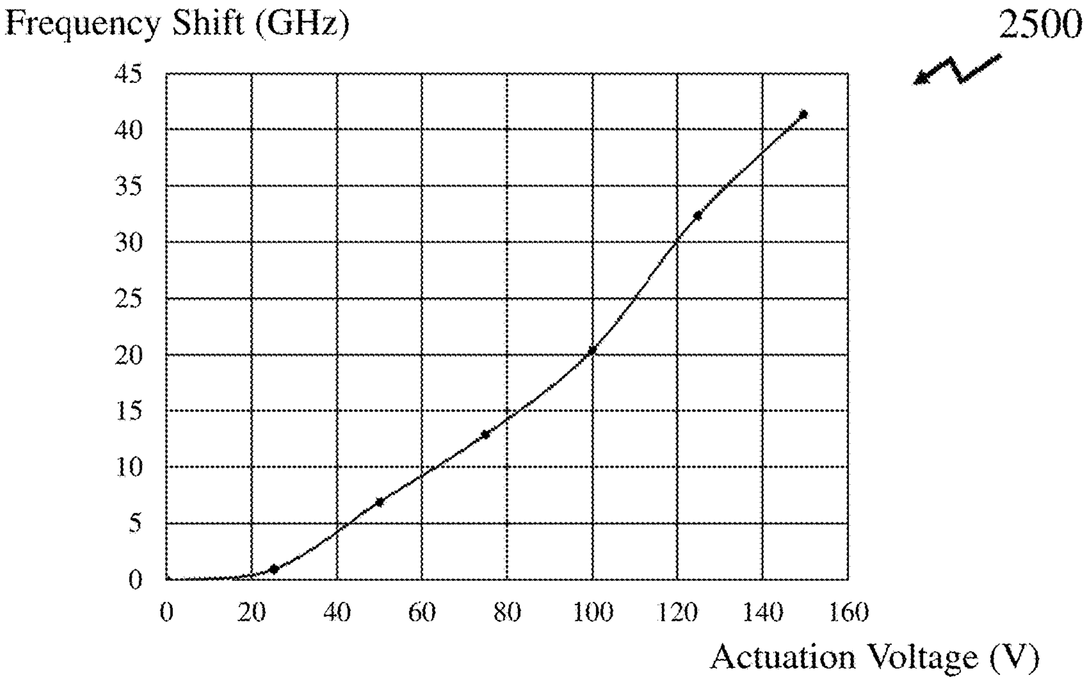
FIG. 25 depicts experimental results for the induced phase shift versus actuator voltage for the MEMS actuated Mach-Zehnder depicted in FIG. 24.

Referring to FIG. 24 there is depicted an optical micrograph 2400A and design 2400B of a MEMS actuated 1×2 MZI according to an embodiment of the invention. Accordingly, as depicted in optical micrograph 2400A a MEMS comb actuator 2410 was implemented. As depicted in design 2400B which shows part of the overall circuit depicted in optical micrograph 2400A the MEMS comb actuator 2410 was coupled to a suspended arm 2430 of the 1×2 MZI which ran in parallel to a non-suspended arm 2440. These being coupled to a multimode interferometer (MMI) 2420 at the input of the 1×2 MZI. Accordingly, with actuation the frequency shift of the peak transmission of the 1×2 MZI was measured as a function of actuation voltage as depicted in FIG. 25. Accordingly, at 150V the induced frequency shift was approximately 42 GHz. MMI 2420 may alternatively be a Y-junction, directional coupler or other power splitter element providing 50:50 power splitting to the two arms of the MZI.

Figure 26:
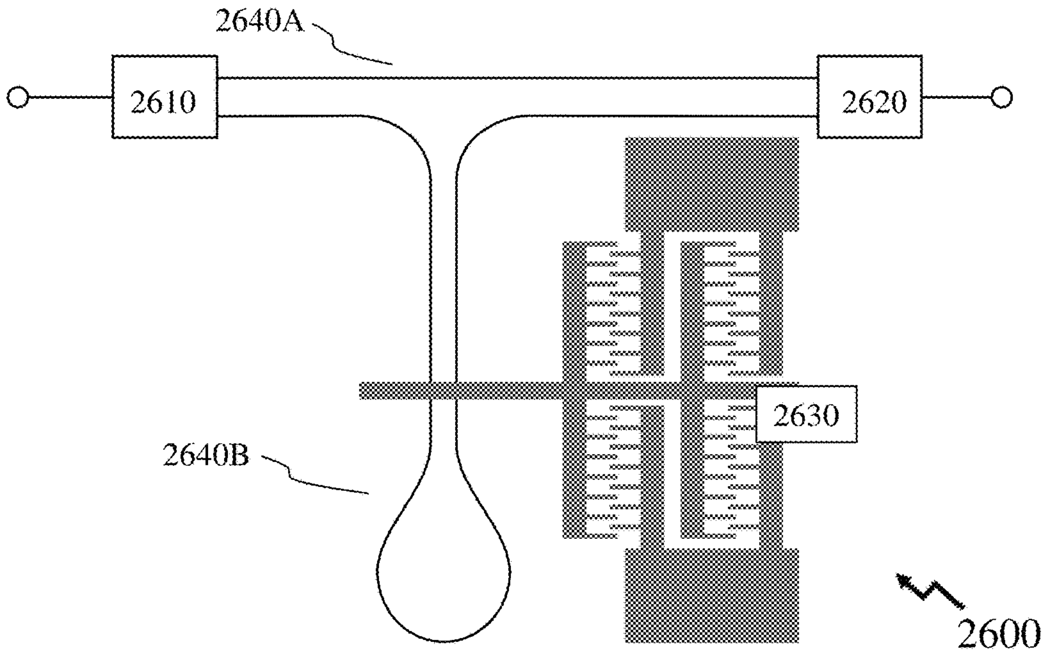
FIG. 26 depicts an electrostatic MEMS actuated dual phase shifter element for a 1×1 Mach-Zehnder interferometer based variable optical attenuator (VOA) according to an embodiment of the invention.

Referring to FIG. 26 there is depicted a MEMS actuated dual phase shifter element for a 1×1 Mach-Zehnder interferometer based variable optical attenuator (VOA) 2600 according to an embodiment of the invention. Accordingly, a MEMS actuator 2630 is coupled to a loop back waveguide 2640B disposed between an input 1×2 coupler 2610 and output 2×1 coupler 2620 together with the other arm 2640A of the 1×1 MZI VOA 2600. Accordingly, the MEMS actuator 2630 when actuated deflects the portion of the loop back waveguide 2640B which is suspended such as described and depicted above in respect of embodiments of the invention.

Accordingly, this actuation structure may be similar in structure as that depicted and described above in respect of FIG. 10 for example.

Figure 27:
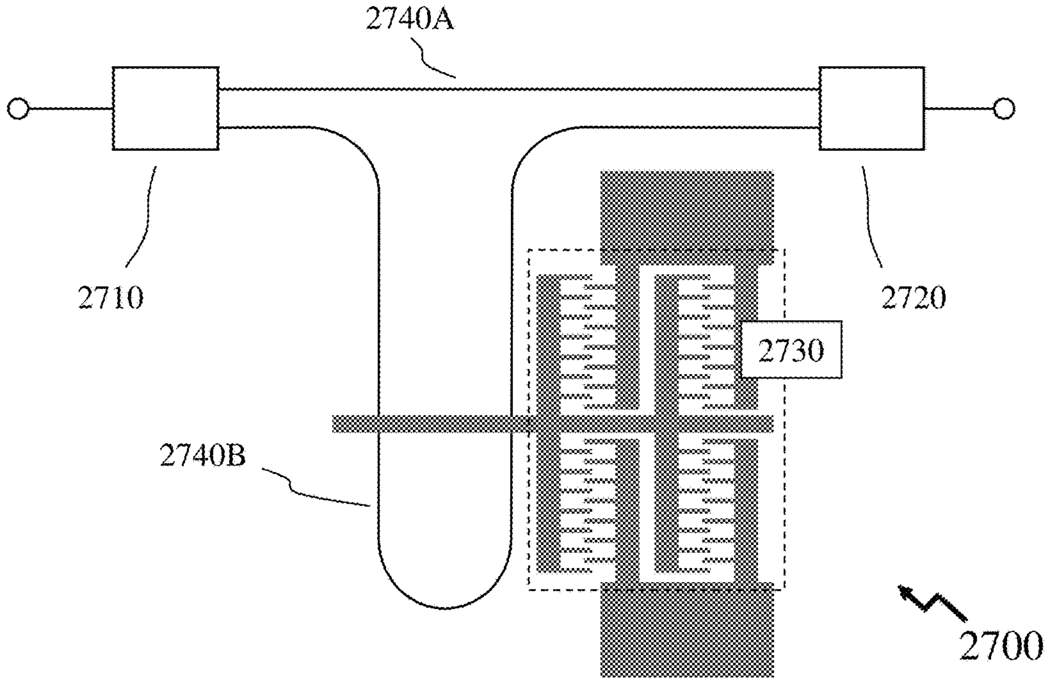
FIG. 27 depicts a MEMS actuated dual phase shifter element for a 1×1 Mach-Zehnder interferometer based variable optical attenuator (VOA) according to an embodiment of the invention.

Now referring to FIG. 27 there is depicted a MEMS actuated dual phase shifter element for a 1×1 Mach-Zehnder interferometer based variable optical attenuator (VOA) 2700 according to an embodiment of the invention. Accordingly, a MEMS actuator 2730 is coupled to a loop back waveguide 2740B disposed between an input 1×2 coupler 2710 and output 2×1 coupler 2720 together with the other arm 2740A of the 1×1 MZI VOA 2700. Accordingly, the MEMS actuator 2730 when actuated deflects the portion of the loop back waveguide 2740B which is suspended such as described and depicted above in respect of embodiments of the invention. Accordingly, this actuation structure may be similar in structure as that depicted and described above in respect of FIG. 10 for example.

Figure 28:
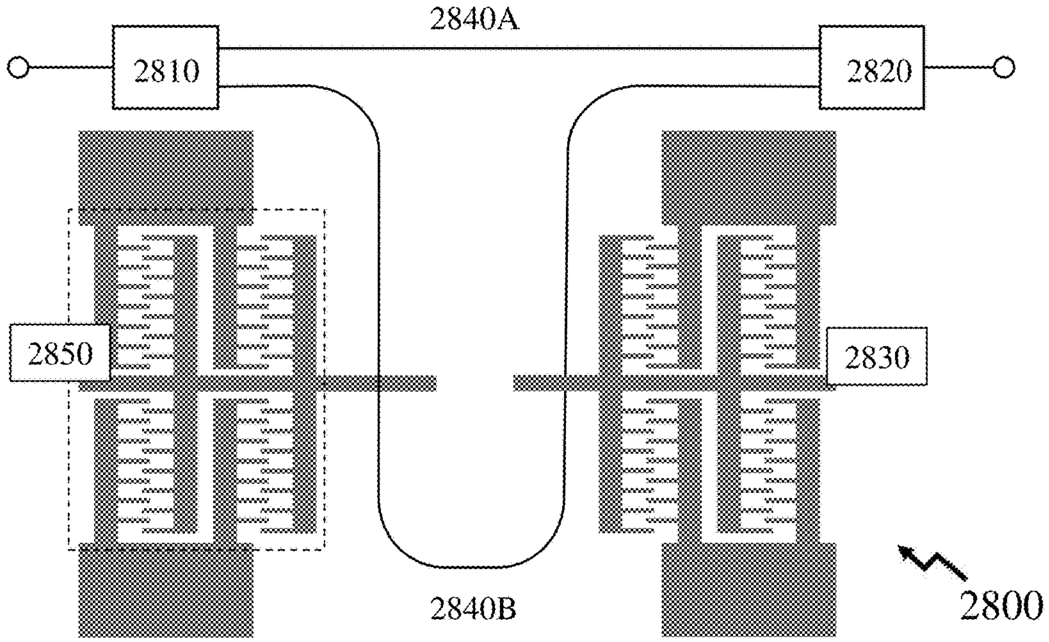
FIG. 28 depicts dual MEMS actuated phase shifter elements for a 1×1 Mach-Zehnder interferometer based variable optical attenuator (VOA) according to an embodiment of the invention.

Referring to FIG. 28 there are depicted dual MEMS actuated phase shifter elements for a 1×1 Mach-Zehnder interferometer based variable optical attenuator (VOA) 2800 according to an embodiment of the invention. As depicted a loop back arm 2840B and arm 2840A are disposed between an input 1×2 coupler 2810 and output 2×1 coupler 2820 of the 1×1 MZI VOA 2800. First and second MEMS actuators 2850 and 2830 are coupled to suspended waveguide portions of the loop back arm 2840B such that when actuated individually or concurrently they induce phase shifts within the loop back arm 2840B and establish the state of the 1×1 MZI VOA 2800.

Figure 29:
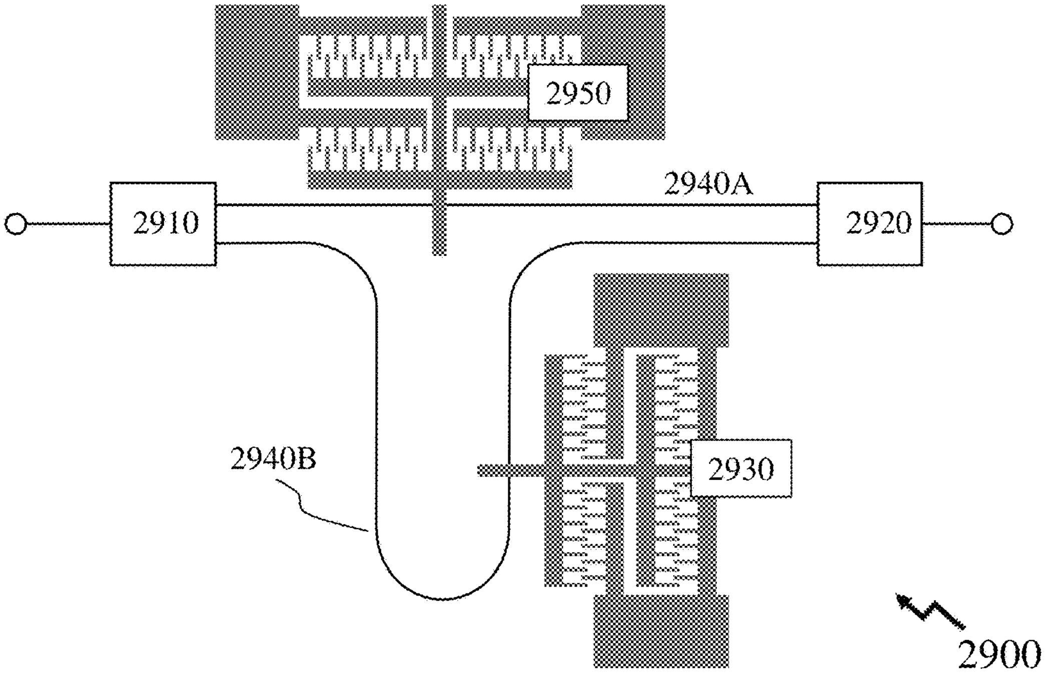
FIG. 29 depicts dual MEMS actuated phase shifter elements for a 1×1 Mach-Zehnder interferometer based variable optical attenuator (VOA) according to an embodiment of the invention.

Now referring to FIG. 29 there are depicted dual MEMS actuated phase shifter elements for a 1×1 Mach-Zehnder interferometer based variable optical attenuator (VOA) 2900 according to an embodiment of the invention. As depicted a loop back arm 2940B and arm 2940A are disposed between an input 1×2 coupler 2910 and output 2×1 coupler 2920 of the 1×1 MZI VOA 2900. First and second MEMS actuators 2930 and 2950 are coupled to suspended waveguide portions of the arm 2940A and loop back arm 2940B. Accordingly, each of the first and second MEMS actuators 2930 and 2950 induce phase shifts in their respective arm of the 1×1 MZI VOA 2900 such that, for example, with an initial static bias between the arms the 1×1 MZI VOA 2900 can be driven into the "ON" state with one of the first and second MEMS actuators 2930 and 2950 and into the "OFF" state with the other of the first and second MEMS actuators 2930 and 2950 rather than requiring a single MEMS actuator to induce the total phase shift required to transition the 1×1 MZI VOA 2900 from "ON" to "OFF" or vice-versa.

Figure 30:
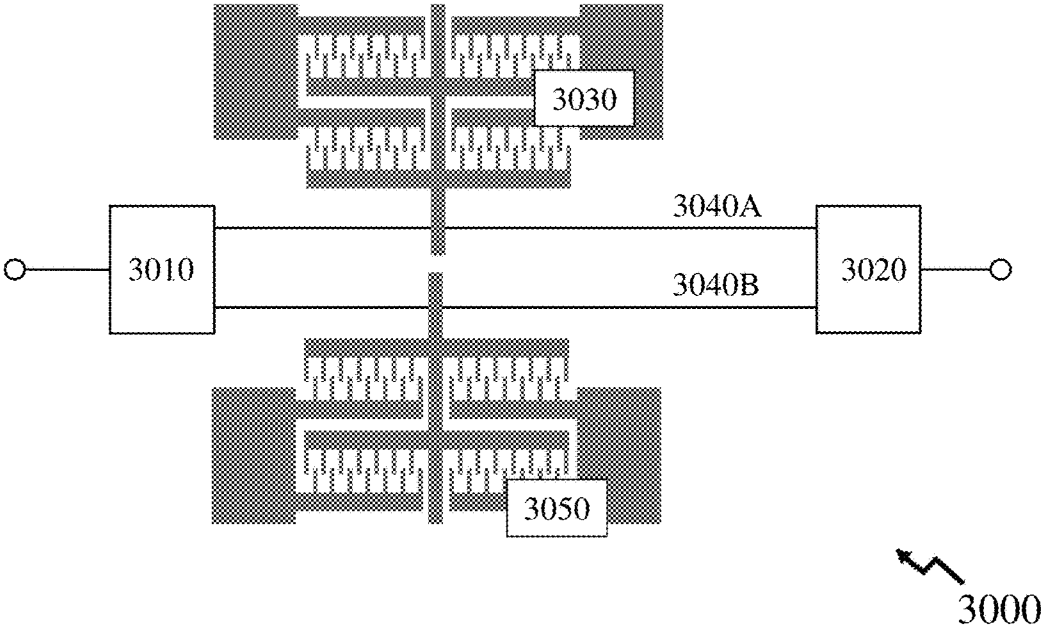
FIG. 30 depicts dual MEMS actuated phase shifter elements for a 1×1 Mach-Zehnder interferometer based variable optical attenuator (VOA) according to an embodiment of the invention.

Referring to FIG. 30 there are depicted dual MEMS actuated phase shifter elements for a 1×1 Mach-Zehnder interferometer based variable optical attenuator (VOA) 3000 according to an embodiment of the invention. As depicted first and second arms 3040A and 3040B are disposed between an input 1×2 coupler 3010 and output 2×1 coupler 3020 of the 1×1 MZI VOA 3000. First and second MEMS actuators 3030 and 3050 are coupled to suspended waveguide portions of the first arm 3040A and second arm 3040B respectively. Accordingly, each of the first and second MEMS actuators 3030 and 3050 induce phase shifts into their respective arms of the lxi MZI VOA 3000 such that, for example, with an initial static bias between the arms, the lxi MZI VOA 3000 can be driven into the "ON" state with one of the first and second MEMS actuators 3030 and 3050 and into the "OFF" state with the other of the first and second MEMS actuators 3030 and 3050 rather than requiring a single MEMS actuator to induce the total phase shift required to transition the 1×1 MZI VOA 3000 from "ON" to "OFF" or vice-versa.

Whilst the embodiments of the invention described and depicted in respect of FIGS. 26 to 30 have been 1×1 MZI VOA structures it would be evident to one of skilled in the art that the same structures may be employed to provide phase tuning of 1×2 MZI optical switches/wavelength filters, 2×2 MZI optical switches/wavelength filters, and 2×1 MZI optical switches/wavelength filters.

Figure 31:
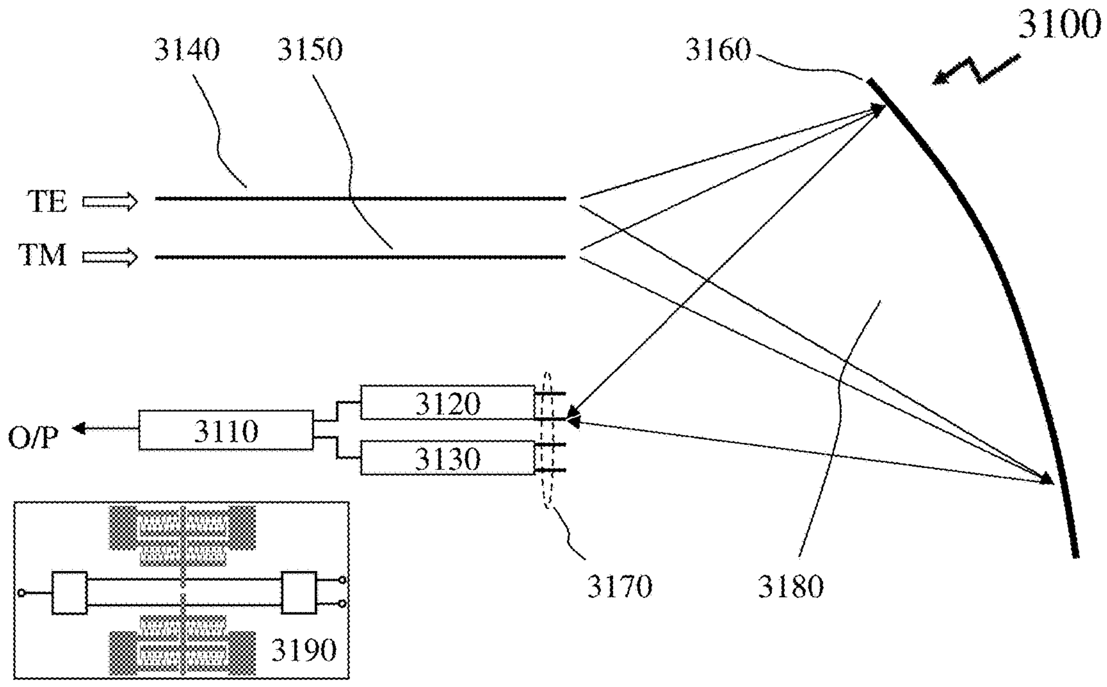
FIG. 31 depicts a polarization diverse tunable filter exploiting MEMS actuated phase shifter elements within a lattice based switch in conjunction with a grating according to an embodiment of the invention.

Now referring to FIG. 31 there is depicted a polarization diverse tunable filter 3100 exploiting MEMS actuated phase shifter elements within a lattice filter-based switch in conjunction with a grating structure according to an embodiment of the invention. As depicted first and second waveguides 3140 and 3150 carrying respectively TE and TM polarization optical signals are coupled to a grating 3160 and reflected such that their position at the focal plane of the grating 3160 is determined by their wavelength. The first and second waveguides 3140 and 3150 being positioned to compensate for polarization dependent wavelength offsets within the grating 3160 such that optical signals at the same wavelength are aligned at the same point on the focal plane of the grating from the first and second waveguides 3140 and 3150 for TE and TM polarizations respectively. The relative positions of the first and second waveguides 3140 and 3150 may vary according to the design of the grating 3160, material system, etc. and may even reverse in position.

Disposed at the focal plane of the grating 3160 are an array of waveguides 3170, only 4 are depicted here, which are coupled in pairs to first and second optical switches 3120 and 3130. The outputs of these first and second optical switches 3120 and 3130 respectively are coupled to a third optical switch 3110 and therein an output port of the polarization diverse tunable filter 3100. Accordingly, the first to third optical switches 3120, 3130 and 3110 select an optical waveguide of the array of waveguides and therein a wavelength range of the optical signals upon the first and second waveguides 3140 and 3150, e.g. a single channel of a DWDM stream, a single channel of a CWDM system, etc. Each of the first to third optical switches 3120, 3130 and 3110 being a 2×1 MZI 3190 employing MEMS actuated phase shifters such as described and depicted above in respect of embodiments of the invention. The Region 3180 between the grating 3160 and the ends of the first and second waveguides 3140 and 3150 together with the ends of the array of waveguides 3170 is a free propagation region, i.e. a 2D or planar waveguide.

Figure 32:
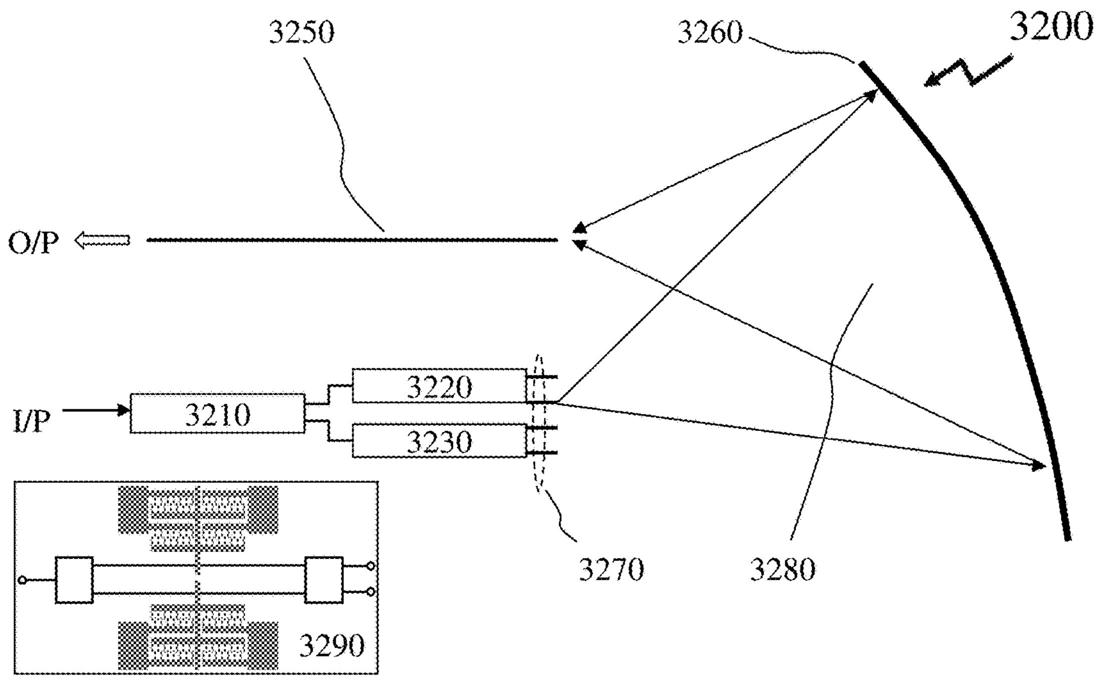
FIG. 32 depicts a tunable filter exploiting MEMS actuated phase shifter elements within a lattice based switch in conjunction with a grating according to an embodiment of the invention.

Referring to FIG. 32 there is depicted a tunable filter 3200 exploiting MEMS actuated phase shifter elements within a lattice filter-based switch in conjunction with a grating according to an embodiment of the invention. As depicted a lattice switch comprising first to third switches 3210 to 3230 couples an input signal to a waveguide of an array of waveguides 3270. The optical signals from the selected waveguide of the array of waveguides 3270 are coupled to the grating 3260 and therein reflected and coupled to the output waveguide 3250. As the wavelength of optical signals coupled to the output waveguide 3250 varies according to which waveguide of the array of waveguides 3270 is employed then the overall circuit acts as a tunable filter wherein programmable selection of the waveguide of the array of waveguides determines which wavelength(s) of the optical signals coupled to the input are passed to the output. Each of the first to third optical switches 3210 to 3230 being a 1×2 MZI 3290 employing MEMS actuated phase shifters such as described and depicted above in respect of embodiments of the invention. The Region 3280 between the grating 3260 and the end of the output waveguide 3250 together with the ends of the array of waveguides 3270 is a free propagation region, i.e. a 2D or planar waveguide.

Figure 33:
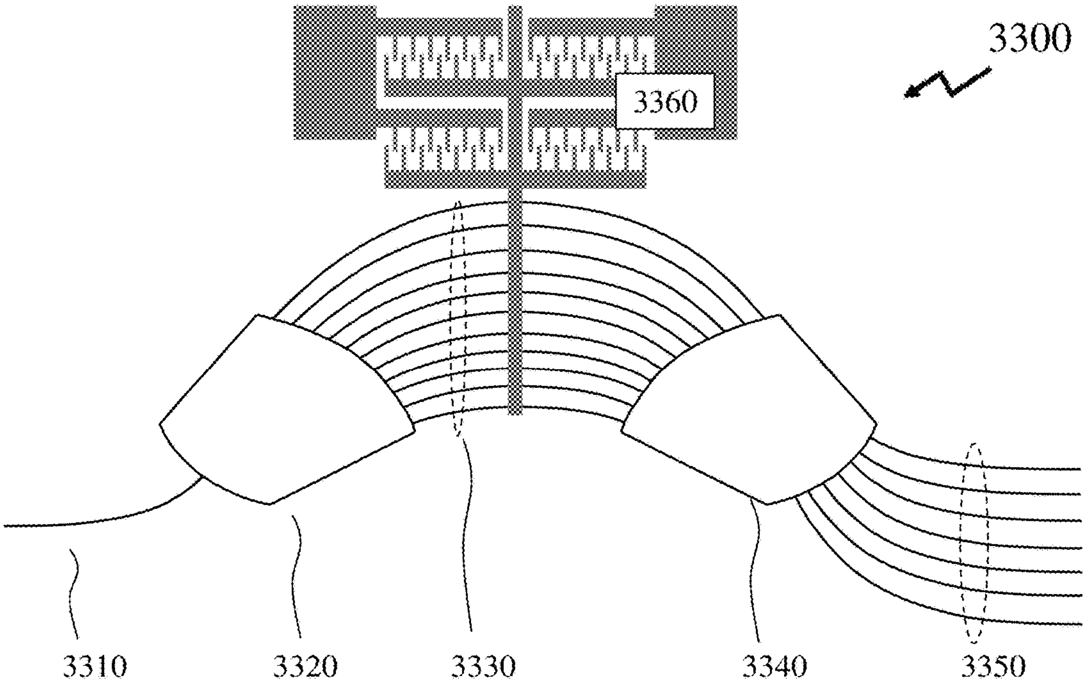
FIG. 33 depicts MEMS actuated phase shifters within an array waveguide grating according to an embodiment of the invention.

Now referring to FIG. 33 there are depicted MEMS actuated phase shifters within an array waveguide grating (AWG) 3300 according to an embodiment of the invention. As depicted the AWG comprises an input waveguide 3310 which couples to a first free propagating region (FPR, also known as a planar or 2D waveguide) 3320. Accordingly, the optical signals from the input waveguide 3310 form an optical wavefront which couples to the array of waveguides 3330 which start at the other end of the first FPR 3320 to the input waveguide 3310 and ends at the second FPR 3340. The multiple optical signals from the array of waveguides 3330 coupled to the second FPR 3340 combine according to accumulated phase shifts to a waveguide of an output array 3350 at the other end of the second FPR 3340. As the accumulated phase shifts vary with wavelength then different wavelengths have different combination positions such that different waveguides in the output array 3350 couple different wavelengths. However, in contrast to prior art AWGs the AWG 3300 incorporates a MEMS actuator 3360 which is coupled to the array of waveguides 3330 which are suspended waveguide elements such that actuation of the MEMS actuator 3360 results in deflection of each waveguide of the array of waveguides 3330 and a change in its phase shift relative to the other waveguides within the array of waveguides. Accordingly, as the length of each waveguide of the array of waveguides 3330 varies then the induced deflection and phase shift also varies. Accordingly, the MEMS actuator 3360 can be used to tune the AWG 3300 so that, for example, it is aligned to a specific grid, e.g. ITU 100 GHz or ITU 50 GHz for example and/or that the AWG has exactly a 100 GHz spacing or 50 GHz spacing.

Figure 34:
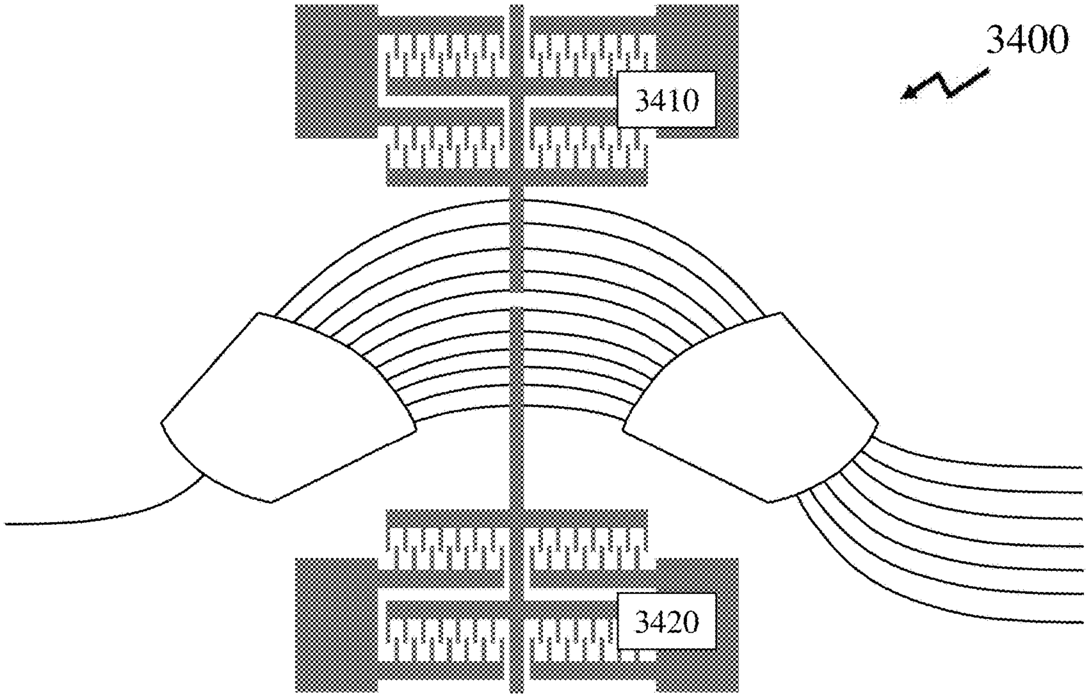
FIG. 34 depicts multiple MEMS actuated phase shifter structures within an array waveguide grating according to an embodiment of the invention.

Referring to FIG. 34 there are depicted multiple MEMS actuated phase shifter structures within an array waveguide grating 3400 according to an embodiment of the invention. Accordingly, in contrast to AWG 3300 in FIG. 33 the array of waveguides between the free propagation zones are now coupled to a pair of arms and therein to first and second MEMS actuators 3410 and 3420 respectively. The AWG 3400 may allow a large number of waveguides to be employed in the AWG 3400. Optionally, more MEMS actuators may be employed further sub-dividing the array of waveguides into small groups.

Figure 35:
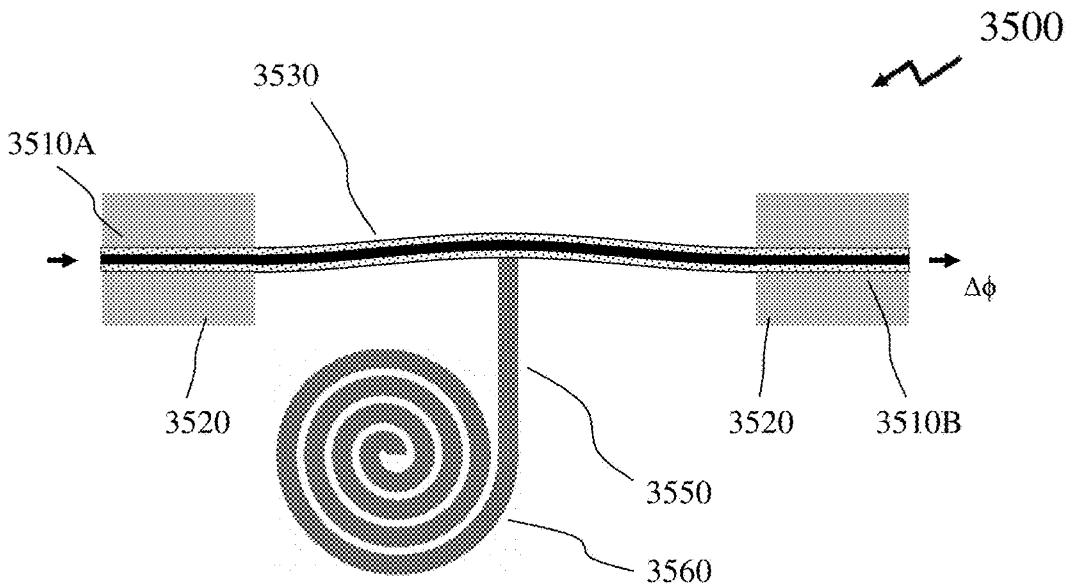
FIG. 35 depicts a thermally actuated suspended beam phase shifter according to an embodiment of the invention to provide athermal operation.

Referring to FIG. 35 there is depicted a thermally actuated suspended beam phase shifter 3500 according to an embodiment of the invention to provide athermal operation. As depicted a suspended waveguide portion 3530 is disposed between input and output waveguide portions 3510A and 3510B on non-suspended portions 3520. The suspended waveguide portion 3530 is coupled via arm 3550 to a MEMS actuator 3560. The MEMS actuator 3560 having a non-suspended portion attached to a substrate and a second suspended portion which adjusts in one or more dimensions as a result of temperature variations. Accordingly, a variation in temperature of the circuit comprising the phase shifter 3500 results in the MEMS actuator 3560 length varying and accordingly the deflection of the suspended waveguide portion 3530 varying in dependence upon the temperature. If the phase shift induced through the varying deflection of the suspended waveguide portion 3530 is of equal magnitude but opposite sign to the phase shift variations induced due to the temperature dependent refractive index, then the phase shifter 3500 can provide for thermal compensation of induced phase shift versus temperature and accordingly may form the basis of athermal waveguide elements such as MZIs etc.

Within another embodiment of the invention a side wall of the suspended waveguide portion 3530 may be metallized and no MEMS actuator 3560 implemented. In this embodiment the thermal expansion of the metallization results in a deflection of the suspended waveguide portion 3530 and can similarly form the basis of an athermal waveguide element.

Figure 36:
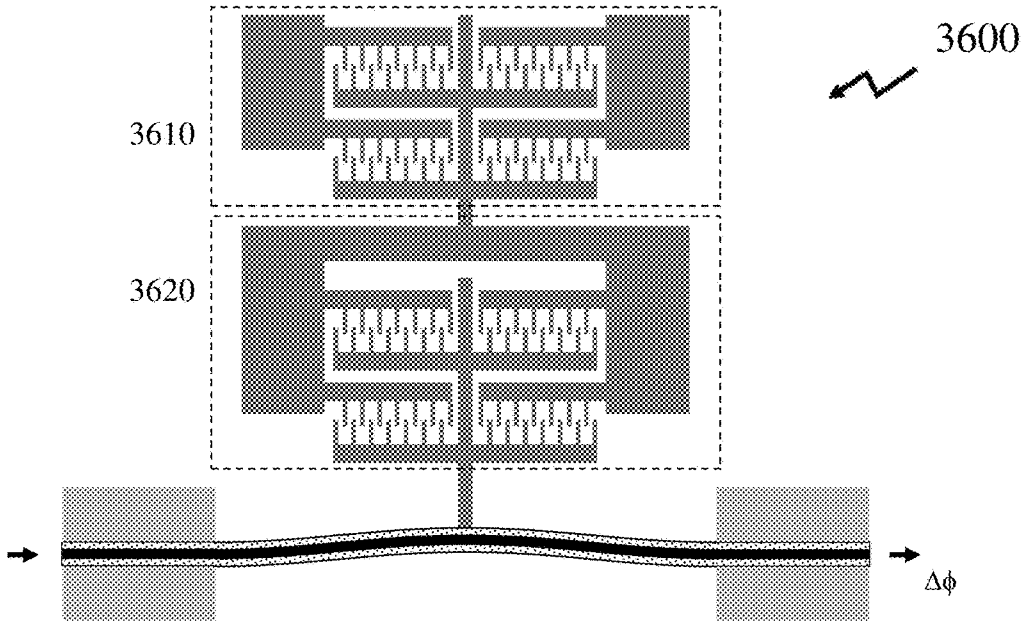
FIG. 36 depicts cascading MEMS actuators to increase deflection to the suspended beam of MEMS phase shifter according to an embodiment of the invention.

Now referring to FIG. 36 there is depicted a structure for cascading MEMS actuators, first and second MEMS actuators 3610 and 3620, such that the deflection achievable is increased over that from a single MEMS actuator. As depicted the second MEMS actuator 3620 moves in its entirety based upon the actuation of the first MEMS actuator 3610 and then the second MEMS actuator 3620 can be actuated.

Figure 37:
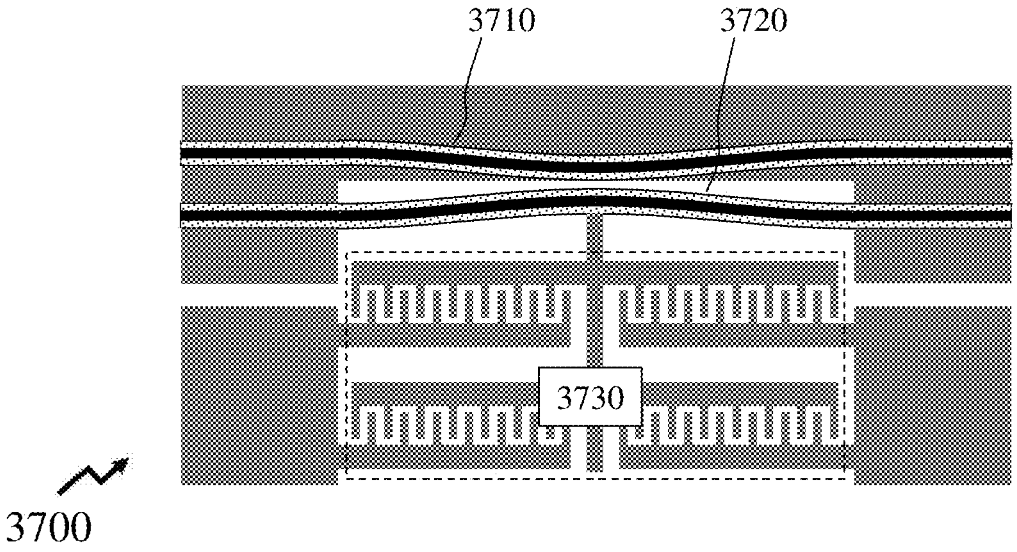
FIG. 37 depicts a MEMS actuator based tunable coupler according to an embodiment of the invention.

Referring to FIG. 37 there is depicted a MEMS actuator based tunable coupler 3700 according to an embodiment of the invention. As depicted the tunable coupler comprises a non-suspended waveguide 3710 and a suspended waveguide 3720. The suspended waveguide 3720 being coupled to a MEMS actuator 3730 via an arm such that actuation of the MEMS actuator 3730 results in deflection of the suspended waveguide 3720 with a varying separation from the non-suspended waveguide 3710 such that the coupling between the suspended waveguide 3720 and non-suspended waveguide 3710 is controlled via the MEMS actuator 3730.

Whilst the embodiments of the invention described and depicted above in respect of FIGS. 8A to 38 have been described and depicted with respect to linear electrostatic comb actuators it would be evident that other electrostatic actuators may be employed including, but not limited to, linear parallel plate actuators, rotational electrostatic comb actuators, rotational parallel plate actuators, and MEMS based inch-worm drives.

Further, whilst embodiments of the invention have been described with respect to electrostatic actuation it would be evident that other actuation means/mechanisms may be employed within other embodiments of the invention including, but not limited to, piezoelectric, magnetic and thermal.

Embodiments of the invention may further incorporate other MEMS elements allowing additional functionality or features to be implemented. For example, MEMS elements may grip or lock the MEMS actuator such that long term actuation of the actuator is not required. For example, a gripping structure may be actuated to allow the actuator to move and then once set to the desired point the gripping structure de-actuated to re-grip. Alternatively, a tooth or teeth on the MEMS actuator may be selectively engaged with other teeth upon a locking actuator so that the locking actuator is engaged to separate its teeth from those on the actuator, the actuator adjusted, and then the locking actuator de-actuated to relock its teeth with those on the actuator.

Within the embodiments of the invention described above the optical waveguides have been described as exploiting a silicon nitride core upon a silicon dioxide $SiO_2$ cladding, i.e. a SiN—$SiO_2$ waveguide structure. However, it would be evident that embodiments of the invention may also be employed in conjunction with other waveguide materials systems. These may include, but not be limited to:

- a silicon nitride core with silicon oxide upper and lower cladding, a $SiO_2$— $Si_3N_4$— $SiO_2$ waveguide structure;
- a silicon core and silicon nitride lower cladding, a Si—$Si_3N_4$ waveguide structure;

a silicon core and silicon nitride upper and lower claddings, a $Si_3N_4$— Si—$Si_3N_4$ waveguide structure;

a silicon core with silicon oxide lower claddings, a Si—$SiO_2$ waveguide;

a silicon core with silicon oxide upper and lower claddings, a SOI waveguide, e.g. $SiO_2$—Si—$SiO_2$;

a doped silica core relative to undoped cladding, a $SiO_2$—doped_$SiO_2$—$SiO_2$, e.g. germanium doped (Ge) yielding $SiO_2$— Ge:$SiO_2$— $SiO_2$;

a silicon core and silicon oxynitride upper and lower claddings, a $SiO_XN_Y$—Si—$SiO_XN_Y$ waveguide structure;

silicon oxynitride core with silicon oxide upper and lower claddings, a $SiO_2$— $SiO_XN_Y$—$SiO_2$ waveguide structure;

polymer-on-silicon; and doped silicon waveguides.

Additionally, whilst within the embodiments of the invention described above the waveguide structures are described with respect to silicon photonics, it would be evident to one skilled in the art that the embodiments of the invention may be employed in a variety of waveguide coupling structures coupling onto and/or from waveguides employing material systems that include, but not limited to, $SiO_2$—$Si_3N_4$—$SiO_2$; $SiO_2$— Ge:$SiO_2$—$SiO_2$; Si—$SiO_2$; ion exchanged glass, ion implanted glass, polymeric waveguides, indium gallium arsenide phosphide (InGaAsP), InP, GaAs, III-V materials, II-VI materials, Si, SiGe, and single mode optical waveguides and multimode optical waveguides.

Any material system may be employed where a region of the optical waveguide may be suspended relative to fixed non-suspended ends and an actuator employed to deflect the suspended waveguide portion. Whilst the embodiments of the invention have been described and depicted with respect to silicon material system supporting monolithic integration of the optical waveguides and MEMS actuators it would be evident that other embodiments of the invention may employ discrete actuators or hybrid integration methodologies.

Within embodiments of the invention the suspended waveguide portion has been mechanically part of the arm. However, within other embodiments of the invention it would be evident that they may mechanically separate but engage upon one another.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A phase shifter element for an optical device comprising:

an optical waveguide comprising:

a first non-suspended portion; and a first suspended portion; and an actuator inducing a phase shift in optical signals propagating within the optical waveguide, wherein the optical waveguide further comprises a second non-suspended portion where the first suspended portion is disposed between the first non-suspended portion and the second suspended portion;

the actuator is a microelectromechanical systems (MEMS) actuator comprising:

a fixed portion;

a movable portion; and an arm mechanically coupled to the movable portion; wherein the arm is mechanically coupled to the first suspended portion of the optical waveguide; and actuation of the MEMS actuator results in movement of the movable portion and arm such that the first suspended portion of the optical waveguide is deflected.

2. The phase shifter element according to claim 1, wherein the optical waveguide further comprises:

a third non-suspended portion; and a second suspended portion disposed between the second non-suspended portion and the third suspended portion;

the MEMS actuator further comprises another arm mechanically coupled to the movable portion; and actuation of the MEMS actuator results in movement of the movable portion and other arm such that the second suspended portion of the optical waveguide is deflected.

3. The phase shifter element according to claim 1, further comprising a first optical coupler having an input port, a first output port coupled to the first non-suspended portion and a second output port coupled to a first end of another optical waveguide; and a second optical coupler having an output port, a first input port coupled to the second non-suspended portion and a second input port coupled to a second distal end of the another optical waveguide; wherein actuation of the MEMS actuator adjusts a phase bias of the phase shifter element.

4. The phase shifter element according to claim 3, wherein the other optical waveguide is a non-suspended waveguide.

5. The phase shifter element according to claim 3, wherein the other optical waveguide is a suspended waveguide.

6. The phase shifter element according to claim 1, wherein the first non-suspended portion incorporates a first Bragg grating;

a second non-suspended portion incorporates a second Bragg grating; and deflection of the first suspended portion of the optical waveguide adjusts an optical phase of a cavity formed by the first Bragg grating and the second Bragg grating.

7. The phase shifter element according to claim 1, further comprising a second optical waveguide; wherein the first non-suspended portion of the optical waveguide is optically coupled to the second non-suspended portion of the optical waveguide such that the optical waveguide forms a closed waveguide;

the second optical waveguide comprises a portion optically coupled to the optical waveguide between the first non-suspended portion of the optical waveguide and the second non-suspended portion of the optical waveguide; and deflection of the first suspended portion of the optical waveguide adjusts an optical phase of the closed waveguide and adjusts one or more resonant characteristics of a ring resonator comprising the optical waveguide and the second optical waveguide.

8. The phase shifter element according to claim 1, wherein the first suspended portion incorporates a Bragg grating; and deflection of the first suspended portion of the optical waveguide adjusts an optical characteristic of the Bragg grating.

9. The phase shifter element according to claim 1, wherein the first suspended portion comprises:

a first set of springs disposed along a first side of the body portion along the body portion disposed along the axis perpendicular to the axis of the first non-suspended portion further coupling the body portion to the substrate via the first set of springs;

a second set of springs disposed along a second side of the body portion distal the first side of the body portion along the body portion disposed along the axis perpendicular to the axis of the first non-suspended portion further coupling the body portion to the substrate via the second set of springs; and a third set of springs disposed at the second distal end of the body portion further coupling the body portion to the substrate via the third set of springs.

10. The phase shifter element according to claim 1, wherein the first suspended portion comprises:

a first set of springs disposed along a first side of the body portion along the body portion disposed along the axis perpendicular to the axis of the first non-suspended portion further coupling the body portion to the substrate via the first set of springs; and a second set of springs disposed along a second side of the body portion distal the first side of the body portion along the body portion disposed along the axis perpendicular to the axis of the first non-suspended portion further coupling the body portion to the substrate via the second set of springs; and disposed within the first set of springs and second set of springs are a set of linkages, each linkage further coupling the body portion to the substrate and limiting movement of the body portion in an axis parallel to the substrate and parallel to the axis of the first non-suspended portion.

11. A phase shifter element comprising:

a first optical waveguide comprising a first non-suspended portion, a second non-suspended portion and a first suspended portion disposed between the first non-suspended portion and the second suspended portion;

a second optical waveguide comprising a third non-suspended portion, a fourth non-suspended portion and a second suspended portion disposed between the first non-suspended portion and the second suspended portion;

a microelectromechanical systems (MEMS) actuator comprising a fixed portion, a movable portion, and an arm mechanically coupled to the movable portion; wherein the arm is mechanically coupled to the first suspended portion of the first optical waveguide and the second suspended portion of the second optical waveguide; and actuation of the MEMS actuator results in movement of the movable portion and arm such that the first suspended portion of the first optical waveguide and the second suspended portion of the second optical waveguide are each deflected.

12. The phase shifter element according to claim 11, wherein deflection of the first suspended portion of the first optical waveguide and the second suspended portion of the second optical waveguide adjusts a coupling of optical signals between the pair of optical waveguides.

13. The phase shifter element according to claim 11, wherein the first suspended portion of the first optical waveguide and the second suspended portion of the second optical waveguide are part of a common suspended structure;

the common suspended structure incorporates a multimode interferometer (MMI);

the first suspended portion of the first optical waveguide comprises a first section coupled to a first end of the MMI and a second portion coupled to a second distal end of the MMI;

the second suspended portion of the second optical waveguide comprises a first section coupled to a first end of the MMI and a second portion coupled to a second distal end of the MMI; and deflection of the common suspended structure adjusts operation of the MMI.

14. The phase shifter element according to claim 11, wherein the first suspended portion of the first optical waveguide and the second suspended portion of the second optical waveguide are part of a common suspended structure;

the first suspended portion of the first optical waveguide incorporates a first Bragg grating having first optical characteristics;

the second suspended portion of the second optical waveguide incorporates a second Bragg grating having the first optical characteristics;

deflection of the common suspended structure adjusts the first optical characteristics of the first Bragg grating and the second Bragg grating.

15. A phase shifter element comprising:

an optical waveguide comprising:

a first non-suspended portion;

a second non-suspended portion; and a first suspended portion disposed between the first non-suspended portion and the second suspended portion;

a mass; and an arm mechanically coupled to the mass and the suspended portion of the optical waveguide; wherein movement of the mass results in movement of the arm such that the first suspended portion of the optical waveguide is deflected in dependence upon the movement of the mass; and an optical phase of an optical signal coupled from the first non-suspended portion of the optical waveguide to the second non-suspended portion of the optical waveguide via the first suspended portion of the optical waveguide varies in dependence upon the deflection induced by the mass.

16. A phase shifter element comprising:

an input waveguide;

a plurality of output waveguides;

a plurality of waveguides;

a first free propagation zone coupled at a first end to the input waveguide and at a second distal end to a first end of each waveguide of the plurality of waveguides;

a second free propagation zone coupled at a first end to the plurality of output waveguides and at a second distal end to a second distal end of each waveguide of the plurality of waveguides;

one or more microelectromechanical systems (MEMS) actuators each comprising a fixed portion, a movable portion and an arm mechanically coupled to the movable portion; wherein the plurality of waveguides are suspended waveguides;

the arm of each MEMS actuator of the one or more MEMS actuators is mechanically coupled to a predetermined subset of the plurality of optical waveguides; and actuation of the each MEMS actuator of the one or more MEMS actuators results in movement of the movable portion and arm of that MEMS actuator of the one or more MEMS actuators such that predetermined subset of the plurality of optical waveguides mechanically coupled to the arm of that MEMS actuator of the one or more MEMS actuators are deflected.

17. A phase shifter element for an optical device comprising:

an optical waveguide comprising:

a first non-suspended portion; and a first suspended portion; and an actuator inducing a phase shift in optical signals propagating within the optical waveguide; wherein the actuator is one or more heaters;

the first non-suspended portion comprises an input waveguide and an output waveguide:

the first suspended portion comprises:

a body portion having an elongated geometry along an axis with a first end coupled to the first non-suspended portion and a second distal end free to move relative to the first non-suspended portion; and a waveguide disposed along a predetermined portion of the body having a first end coupled to the input waveguide and at a second distal end coupled to the output waveguide;

the first suspended portion extends away from the first non-suspended portion such that the phase shift induced is established in dependence upon an expansion of the first suspended portion and a variation in the polarizability of the waveguide where the expansion of the first suspended portion and the variation in the polarizability are dependent upon a power applied to the one or more heaters.

18. The phase shifter element according to claim 17, wherein the first suspended portion further comprises:

a first set of springs disposed along a first side of the body portion along the body portion disposed along the axis perpendicular to the axis of the first non-suspended portion further coupling the body portion to the substrate via the first set of springs; and a second set of springs disposed along a second side of the body portion distal the first side of the body portion along the body portion disposed along the axis perpendicular to the axis of the first non-suspended portion further coupling the body portion to the substrate via the second set of springs.

19. A phase shifter element for an optical device comprising:

an optical waveguide comprising:

a first non-suspended portion; and a first suspended portion; and an actuator inducing a phase shift in optical signals propagating within the optical waveguide; wherein the actuator is one or more heaters disposed along the length of the first suspended portion of the waveguide;

the first suspended portion of the waveguide is disposed upon a clamped-free beam; and the phase shift induced is established by the sum of a shift induced by an expansion of the first suspended portion and another shift induced by a variation in the polarizability of the waveguide;

the expansion of the first suspended portion and the variation in the polarizability are dependent upon a power applied to the one or more heaters; and the shift and another shift add to give the phase shift.

20. The phase shifter element according to claim 19, wherein the waveguide is formed from a silicon nitride core and a silicon dioxide cladding.

* * * * *